US012812254B2

(12) United States Patent
Yamagishi

(10) Patent No.: US 12,812,254 B2
(45) Date of Patent: Nov. 24, 2026

(54) DISPLAY CONTROL APPARATUS, DISPLAY CONTROL METHOD, AND IMAGE CAPTURE SYSTEM

(71) Applicant: CANON KABUSHIKI KAISHA, Tokyo (JP)

(72) Inventor: Masaharu Yamagishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/883,502

(22) Filed: Sep. 12, 2024

(65) Prior Publication Data

US 2025/0106514 A1 Mar. 27, 2025

(30) Foreign Application Priority Data

Sep. 27, 2023 (JP) ................................ 2023-166225

(51) Int. Cl.
*H04N 23/695* (2023.01)
*H04N 23/611* (2023.01)
(Continued)

(52) U.S. Cl.
CPC ......... *H04N 23/695* (2023.01); *H04N 23/611* (2023.01); *H04N 23/662* (2023.01); *H04N 23/69* (2023.01)

(58) Field of Classification Search
None
See application file for complete search history.

(56) References Cited

U.S. PATENT DOCUMENTS

2004/0189828 A1* 9/2004 DeWees ............... H04N 5/2624 348/E5.053
2006/0056056 A1 3/2006 Ahiska
(Continued)

FOREIGN PATENT DOCUMENTS

JP 2009267824 A 11/2009
JP 2012227839 A 11/2012
(Continued)

OTHER PUBLICATIONS

The above documents were cited in a British Search Report issued on Feb. 18, 2025, which is enclosed, that issued in the corresponding British Patent Application No. GB2413758.0.
(Continued)

*Primary Examiner* — Stefan Gadomski
(74) *Attorney, Agent, or Firm* — Cowan, Liebowitz & Latman, P.C.

(57) ABSTRACT

A display control apparatus used in an image capture system which includes a first and second image capture apparatuses is disclosed. In the image capture system, a subject that is a tracking target of the second image capture apparatus and an angle of view of the second image capture apparatus are controlled based on information related to the first image capture apparatus. The display control apparatus generates an image for display that is different from an image captured by the first image capture apparatus and an image captured by the second image capture apparatus and outputs the image for display. The display control apparatus generates, as the image for display, an image indicating the subject that is the tracking target of the second image capture apparatus and the angle of view of the second image capture apparatus.

16 Claims, 31 Drawing Sheets

(51) Int. Cl.
*H04N 23/661* (2023.01)
*H04N 23/69* (2023.01)

(56) References Cited

U.S. PATENT DOCUMENTS

| | | | | |
|---|---|---|---|---|
| 2010/0197218 | A1* | 8/2010 | Watanabe | H04M 11/025 455/3.05 |
| 2011/0128385 | A1 | 6/2011 | Bedros | |
| 2012/0268641 | A1* | 10/2012 | Kazama | H04N 23/45 348/E5.051 |
| 2015/0163409 | A1* | 6/2015 | Sakai | H04N 23/635 348/333.03 |
| 2015/0181120 | A1* | 6/2015 | Tsuchida | H04N 23/45 348/222.1 |
| 2015/0181135 | A1* | 6/2015 | Shimosato | H04N 23/61 348/239 |
| 2017/0223261 | A1* | 8/2017 | Shimizu | H04N 23/90 |
| 2018/0025518 | A1* | 1/2018 | Horie | G06T 11/60 348/144 |
| 2020/0059595 | A1 | 2/2020 | Ono | |
| 2021/0152731 | A1* | 5/2021 | Wakamatsu | H04N 23/61 |
| 2021/0233326 | A1* | 7/2021 | Li | G06T 7/74 |

FOREIGN PATENT DOCUMENTS

| | | | |
|---|---|---|---|
| JP | 2013247543 | A | 12/2013 |
| JP | 2014011721 | A | 1/2014 |
| JP | 2020025248 | A | 2/2020 |
| JP | 2023003656 | A | 1/2023 |
| KR | 20150052642 | A | 5/2015 |
| KR | 20180022568 | A | 3/2018 |
| KR | 20190055582 | A | 5/2019 |
| WO | 2012151777 | A1 | 11/2012 |
| WO | 2020189058 | A | 9/2020 |
| WO | 2021131325 | A | 7/2021 |

OTHER PUBLICATIONS

The above foreign patent documents were cited in the Jun. 6, 2025 Japanese Office Action, which is enclosed without an English Translation, that issued in Japanese Patent Application No. 2023-166225.

* cited by examiner

| ROLE | CONTROL OF SUB CAMERA | |
|---|---|---|
| | TRACKING TARGET SUBJECT | ZOOM |
| MAIN FOLLOW | SAME AS MAIN | IN PHASE WITH MAIN |
| MAIN COUNTER | SAME AS MAIN | ANTIPHASE TO MAIN |
| ASSIST FOLLOW | DIFFERENT FROM MAIN (LEFT SIDE) | IN PHASE WITH MAIN |
| ASSIST COUNTER | DIFFERENT FROM MAIN (LEFT SIDE) | ANTIPHASE TO MAIN |

CAPTURED IMAGE OF OVERHEAD CAMERA 300
(OVERHEAD CAMERA COORDINATE SYSTEM)

BIRD VIEW OF CAPTURED AREA 20
(PLANAR COORDINATE SYSTEM)

CAPTURED IMAGE OF OVERHEAD CAMERA 300

CAPTURED IMAGE OF OVERHEAD CAMERA 300
(AFTER COORDINATE TRANSFORMATION)

| ROLE | SUB CAMERA A | SUB CAMERA B |
|---|---|---|
| ASSIST FOLLOW | DIFFERENT SUBJECT TO THAT OF MAIN | DIFFERENT SUBJECT TO THAT OF MAIN |
| | LEFT PERSON AMONG 2 PEOPLE | RIGHT PERSON AMONG 2 PEOPLE |
| | FOCUS ON TRACKING TARGET SUBJECT | FOCUS ON TRACKING TARGET SUBJECT |

BEFORE SUBJECT MOVEMENT

AFTER SUBJECT MOVEMENT

| IDENTIFICATION ID | RECTANGLE INFORMATION (DETCT_POSI) | INDICATOR COLOR |
|---|---|---|
| ID1 | (xul1, yul1), (xdr1, ydr1) | RED |
| ID2 | (xul2, yul2), (xdr2, ydr2) | GREEN |
| ID3 | (xul3, yul3), (xdr3, ydr3) | BLUE |

OVERHEAD IMAGE

TRACKING TARGET SUBJECT OF MAIN CAMERA

TRACKING TARGET SUBJECT OF SUB CAMERA

CASE WHERE ANGLE OF VIEW IS WIDE-ANGLE

CASE WHERE ANGLE OF VIEW IS TELEPHOTO

DISPLAY CONTROL APPARATUS, DISPLAY CONTROL METHOD, AND IMAGE CAPTURE SYSTEM

BACKGROUND

Field of the Disclosure

This disclosure relates to a display control apparatus, a display control method, and an image capture system, and in particular to a technique to control a plurality of image capture apparatuses.

Description of the Related Art

Japanese Patent Laid-Open No. 2020-25248 describes an image capture system in which a plurality of cameras are classified as a main camera and a sub camera, and the sub camera is controlled so as to capture the same subject as the main camera. Also, the image capture system described in Japanese Patent Laid-Open No. 2020-25248 allows the capture direction and the angle of view of each camera to be checked on a remote control screen.

According to the image capture system described in Japanese Patent Laid-Open No. 2020-25248, image capture performed by the sub camera can be automatically controlled, and thus labor can be saved. However, in order to check the subjects captured by the respective cameras, it is necessary to operate the remote control screen to display the videos currently captured by the respective cameras.

SUMMARY

In view of this, an aspect of the present disclosure provides a display control apparatus and a display control method capable of presenting information for improving the convenience of an automatic image capture system that uses a plurality of cameras.

According to an aspect of the present disclosure, there is provided a display control apparatus used in an image capture system which includes a first image capture apparatus and a second image capture apparatus, wherein in the image capture system a subject that is a tracking target of the second image capture apparatus and an angle of view of the second image capture apparatus are controlled based on information related to the first image capture apparatus, the display control apparatus comprising: one or more processors that execute a program stored in a memory and thereby function as: a generation unit configured to generate an image for display that is different from an image captured by the first image capture apparatus and an image captured by the second image capture apparatus; and an output unit configured to output the image for display, wherein the generation unit generates, as the image for display, an image indicating the subject that is the tracking target of the second image capture apparatus and the angle of view of the second image capture apparatus.

According to another aspect of the present disclosure, there is provided an image capture system, comprising: a first image capture apparatus; a second image capture apparatus; a capture control apparatus that controls a subject that is a tracking target of the second image capture apparatus and an angle of view of the second image capture apparatus based on information related to the first image capture apparatus; and a display control apparatus, wherein the display control apparatus comprises: one or more processors that execute a program stored in a memory and thereby function as: a generation unit configured to generate an image for display that is different from an image captured by the first image capture apparatus and an image captured by the second image capture apparatus; and an output unit configured to output the image for display, wherein the generation unit generates, as the image for display, an image indicating the subject that is the tracking target of the second image capture apparatus and the angle of view of the second image capture apparatus.

According to a further aspect of the present disclosure, there is provided a display control method implemented in an image capture system which includes a first image capture apparatus and a second image capture apparatus, wherein in the image capture system a subject that is a tracking target of the second image capture apparatus and an angle of view of the second image capture apparatus are controlled based on information related to the first image capture apparatus, the display control method comprising: generating an image for display that is different from an image captured by the first image capture apparatus and an image captured by the second image capture apparatus; and outputting the image for display, wherein the generating includes generating, as the image for display, an image indicating the subject that is the tracking target of the second image capture apparatus and the angle of view of the second image capture apparatus.

According to another aspect of the present disclosure, there is provided a non-transitory computer-readable medium that stores a program having instructions, wherein the instructions cause, when executed by one or more processors in an image capture system, the one or more processors to perform a display control method, wherein in the image capture system a subject that is a tracking target of a second image capture apparatus and an angle of view of the second image capture apparatus are controlled based on information related to a first image capture apparatus, the display control method comprising: generating an image for display that is different from an image captured by the first image capture apparatus and an image captured by the second image capture apparatus; and outputting the image for display, wherein the generating includes generating, as the image for display, an image indicating the subject that is the tracking target of the second image capture apparatus and the angle of view of the second image capture apparatus.

Further features of the present disclosure will become apparent from the following description of embodiments (with reference to the attached drawings).

DESCRIPTION OF THE EMBODIMENTS

Figure 1:
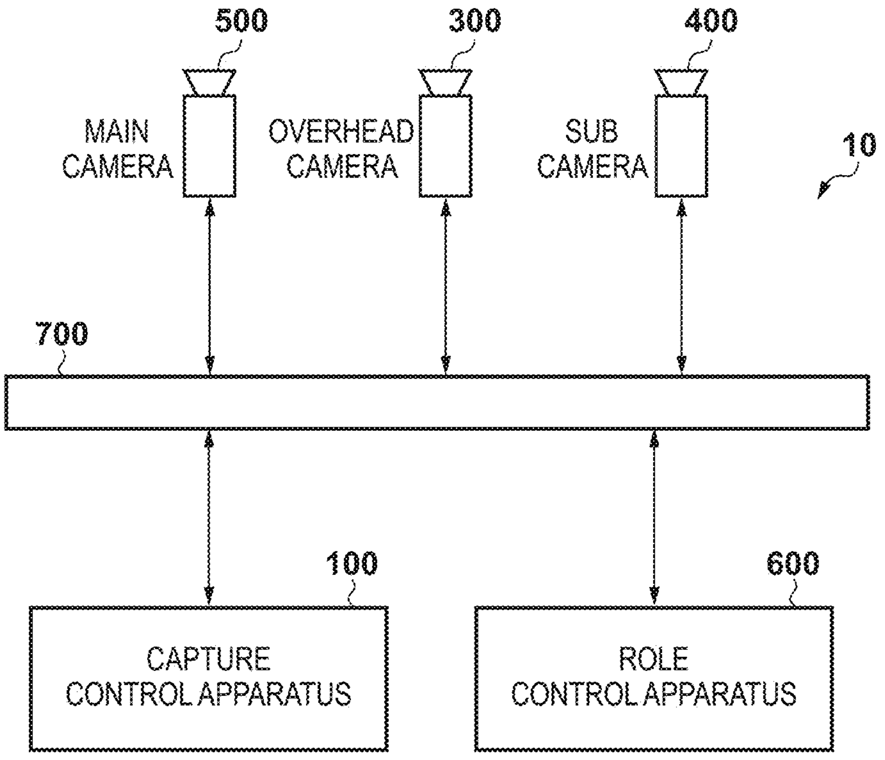
FIG. 1 is a schematic diagram of an image capture system according to a first embodiment.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment (Overview of Multi-Camera Image Capture System)

FIG. 1 is a schematic diagram showing an exemplary configuration of a multi-camera image capture system 10 (hereinafter simply referred to as an image capture system) according to the present embodiment. The image capture system 10 includes a plurality of cameras 300, 400, and 500, a capture control apparatus 100, and a role control apparatus 600. The plurality of cameras 300, 400, and 500, the capture control apparatus 100, and the role control apparatus 600 are connected in such a manner that they can perform communication via a communication network 700.

The communication network 700 conforms with a known wired or wireless communication standard, such as the IEEE 802.3 series and the IEEE 802.11 series. Furthermore, each of the plurality of cameras 300, 400, and 500, the capture control apparatus 100, and the role control apparatus 600 include a communication interface that conforms with the standard of the communication network 700.

Among the plurality of cameras 300, 400, and 500, the camera 300 captures an entirety of a predetermined captured area. The captured area is set as, for example, an area in which subjects to be captured can exist in a studio. Therefore, all of the subjects inside the captured area are captured in a video of the camera 300.

The purpose of the camera 300 is to capture images for detecting subjects to be captured that exist inside the captured area. Therefore, the capture direction and the angle of view of the camera 300 are determined in accordance with the position and the captured area of the camera 300, and are basically fixed during image capture. In addition, in order to capture a pan focus image of the captured area, a focusing distance of the camera 300 can also be basically fixed. Furthermore, it is desirable that the camera 300 captures the entirety of the captured area without an object outside the captured area hiding the captured area. For this reason, here, the camera 300 is placed at a position where an overhead view of the entirety of the captured area is attained. Hereinafter, the camera 300 will be referred to as an overhead camera for distinction from other cameras 400 and 500 whose capture directions and angles of view are not basically fixed during image capture. However, the position of placement of the camera 300 is not limited to a position where an overhead view of the captured area is attained. The operations of the overhead camera 300 can be controlled from the capture control apparatus 100.

The cameras 400 and 500 are, for example, PTZ cameras, and the operations thereof, including the capture directions (pan and tilt angles) and angles of view (zooming), can be controlled from an external apparatus. It is assumed here that a user of the image capture system controls the operations of the camera 500, and the capture control apparatus 100 controls the operations of the camera 400. As the capture control apparatus 100 controls the operations of the camera 400 based on the state of the camera 500, the camera 500 and the camera 400 will be hereinafter referred to as a main camera and a sub camera, respectively. Although only one sub camera 400 is shown for ease of explanation and understanding, a plurality of sub cameras may be provided. Note that the user may directly operate the main camera 500. Also, the cameras 400 and 500 may be configured in such a manner that the capture directions (pan and tilt angles) thereof can be controlled by attaching camera bodies to camera platforms. Furthermore, the cameras 400 and 500 may be configured in such a manner that exchangeable lenses capable of zooming are mounted on the camera bodies.

It is assumed here that an operator is present for the role control apparatus 600 in the present embodiment. Furthermore, an operator (user) may be present also for the capture control apparatus 100, but this operator is not indispensable. The operator of the role control apparatus 600 may be a user of the capture control apparatus 100. A photographer is not necessary for the overhead camera 300 and the sub camera 400 because image capture thereof is controlled by the capture control apparatus 100. It is assumed that an operator or a photographer is present for the main camera 500. Due to the foregoing configuration in which some apparatuses do not require an operator or a photographer, labor can be saved.

Although the illustration of FIG. 1 indicates that all signals are communicated via the communication network 700, for example, video signals and control signals may be communicated using different methods. For example, each of the plurality of cameras 300, 400, and 500 may supply video signals directly to the capture control apparatus 100 via a cable. The cameras 300, 400, and 500 and the capture control apparatus 100 include communication circuits corresponding to the standard of video signals. The standard of video signals is, for example, the serial digital interface (SDI) standard, the high-definition multimedia interface (HDMI)® standard, or the like, but is not limited thereto.

The capture control apparatus 100 detects subjects from video signals received from the overhead camera 300. The capture control apparatus 100 determines the capture direction and the angle of view of the sub camera based on the result of detection of the subjects, the state of the main camera 500, and the role set for the sub camera. The capture control apparatus 100 transmits a control command including the determined capture direction and angle of view to the sub camera 400. Changing the role setting can change the method of determining the capture direction and the angle of view of the sub camera 400, thereby increasing the degree of freedom in controlling the operations of the sub camera 400.

(Exemplary Functional Configuration of Each Apparatus)

Figure 2:
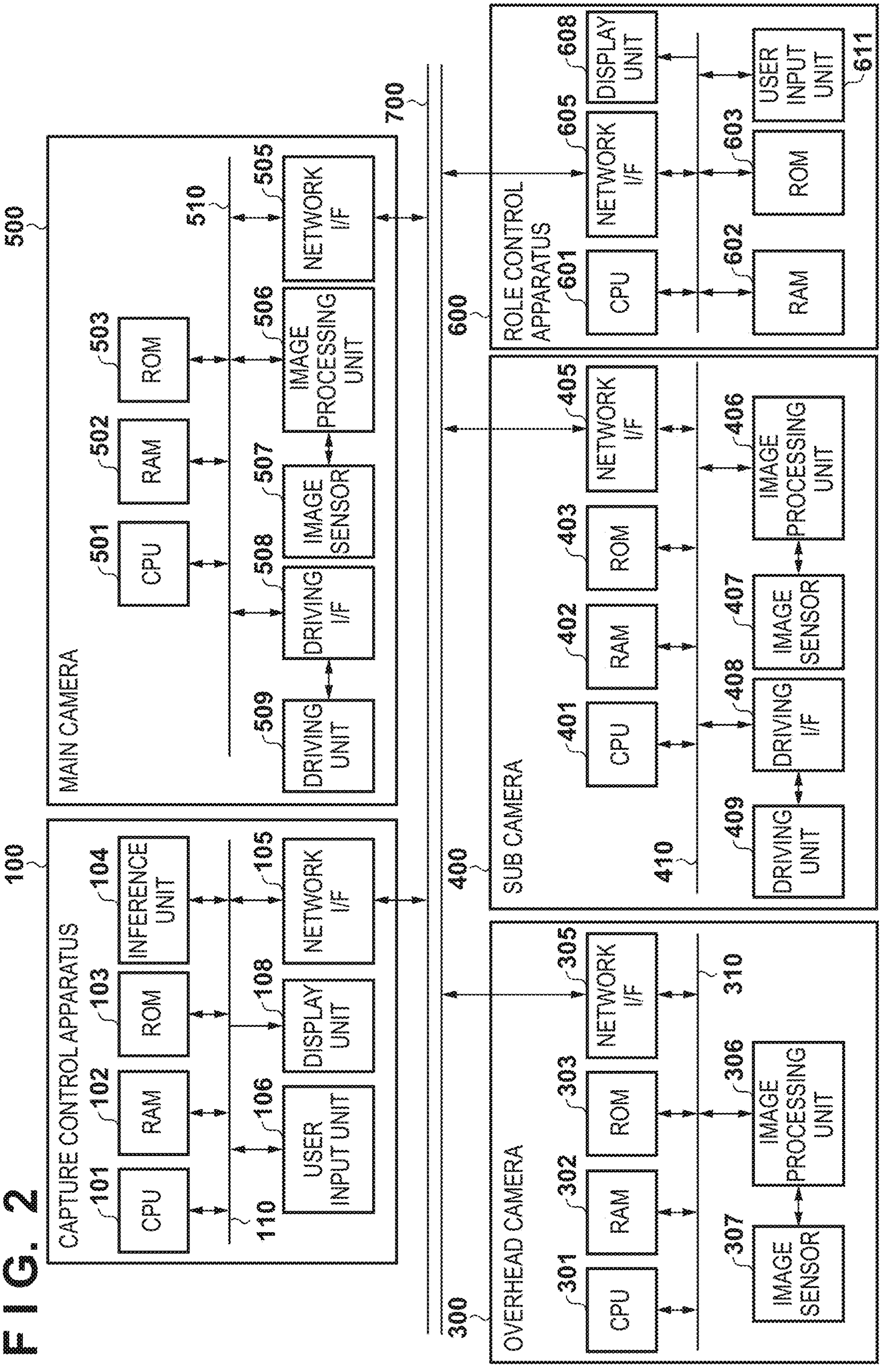
FIG. 2 is a block diagram showing an exemplary functional configuration of each apparatus in the image capture system according to the first embodiment.

FIG. 2 is a block diagram showing an exemplary functional configuration of each device that composes a multi-camera image capture system 10 shown in FIG. 1. Note that the constituents represented as functional blocks in the figure can be realized by an integrated circuit, such as an ASIC and an FPGA, a discrete circuit, or a combination of a memory and a processor that executes a program stored in the memory. Also, one functional block may be realized by a plurality of integrated circuit packages, or a plurality of functional blocks may be realized by one integrated circuit package. Furthermore, the same functional block may be implemented as different constituents depending on the operating environment, required capabilities, and so on.

(Capture Control Apparatus 100)

First, an exemplary functional configuration of the capture control apparatus 100 will be described. The capture control apparatus 100 may be, for example, a general-purpose computer device, such as a personal computer and a workstation. The capture control apparatus 100 is configured in such a manner that a CPU 101, a RAM 102, a ROM 103, an inference unit 104, a network interface (I/F) 105, a user input unit 106, and a display unit 108 are connected to one another via an internal bus 110.

The CPU 101 is a microprocessor capable of executing programmed instructions. The CPU 101 realizes the functions of the capture control apparatus 100, which will be described later, by reading a program stored in the ROM 103 into the RAM 102 and executing the program, for example. The CPU 101 can realize the functions of the capture control apparatus 100 by, for example, executing a capture control application that operates on base software (OS).

The RAM 102 is used to load the program executed by the CPU 101, and to temporarily store data that is processed by the CPU 101, data that is currently processed, and so forth. Also, a part of the RAM 102 may be used as a video memory for the display unit 108.

The ROM 103 is a nonvolatile rewritable memory, and stores the program (OS and application) executed by the CPU 101, user data, and so forth.

The inference unit 104 executes processing for detecting subject regions using a machine learning model with respect to a video of the overhead camera 300. The inference unit 104 can be implemented using a hardware circuit that can execute computation of the machine learning model at high speed, such as a graphics processing unit (GPU) and a neural network processing unit (NPU), for example. Alternatively, the inference unit 104 may be implemented using a reconfigurable logic circuit, such as a field-programmable gate array (FPGA). The CPU 101 may realize the functions of the inference unit 104 by executing the program.

The machine learning model may be a convolutional neural network (CNN) that has been trained in accordance with the type of subjects to be detected. It is assumed here that the inference unit 104 detects human body regions or human face regions as subject regions from an input image. Also, it is assumed that the inference unit 104 outputs, for each detected subject region, the position and the size of a rectangular region in which the subject region is inscribed, and a detection reliability degree. Note that processing for detecting different types of subject regions may be executed with respect to the same input image using a plurality of types of machine learning models. Note that the inference unit 104 may execute processing for detecting subject regions using a known method that does not use a machine learning model. The inference unit 104 can detect subject regions using, for example, a method that uses local feature amounts, such as SIFT and SURF, a method that uses pattern matching, or the like.

The network I/F 105 is an interface for connecting the capture control apparatus 100 to the communication network 700. The capture control apparatus 100 (CPU 101) can communicate with external apparatuses in the communication network 700, such as the overhead camera 300, the sub camera 400, the main camera 500, and the role control apparatus 600, via the network I/F 105. Note that the capture control apparatus 100 may communicate with external apparatuses via another non-illustrated communication interface (a USB, Bluetooth®, or the like).

In order to communicate with each apparatus (the overhead camera 300, the sub camera 400, the main camera 500, and the role control apparatus 600) in the communication network 700, the CPU 101 obtains a network address of each apparatus at an arbitrary timing, and stores the same into the RAM 102. Furthermore, the CPU 101 also obtains information of each apparatus (the type, model name, and the like of the apparatus) at an arbitrary timing (e.g., at the time of first communication), and stores the same into the RAM 102. It is assumed that, as described above, the CPU 101 is aware of at least identification information and the types of apparatuses with respect to the overhead camera 300, the sub camera 400, the main camera 500, and the role control apparatus 600. Note that the user may be allowed to give any name to each individual apparatus.

The user input unit 106 is an input device, such as a mouse, a keyboard, and a touch panel. The capture control apparatus 100 accepts a user instruction via the user input unit 106.

The display unit 108 is a display apparatus, such as a liquid crystal display (LCD). The display unit 108 displays a GUI screen provided by the OS, the capture control application, or the like.

(Overhead Camera 300)

Next, an exemplary functional configuration of the overhead camera 300 will be described.

A CPU 301 is a microprocessor capable of executing programmed instructions. The CPU 301 controls the operations of each functional block and realizes the functions of the overhead camera 300, which will be described later, by reading a program stored in a ROM 303 into a RAM 302 and executing the program, for example.

The RAM 302 is used to load the program executed by the CPU 301, and to temporarily store data that is processed by the CPU 301, data that is currently processed, and so forth. Furthermore, the RAM 302 may be used as a buffer for video signals obtained through image capture.

The ROM 308 is a nonvolatile rewritable memory. The ROM 308 stores the program executed by the CPU 301, setting values of the overhead camera 300, user data, and so forth. Note that the ROM 308 can also be used as a recording destination of video signals. The ROM 308 may include a built-in memory and an attachable/removable memory card.

An image sensor 307 includes an image capture optical system and an image sensor. The image sensor may be a known CCD or CMOS color image sensor that includes, for example, color filters based on the primary-color Bayer arrangement. The image sensor includes a pixel array in which a plurality of pixels are two-dimensionally arrayed, and peripheral circuits for reading out signals from each pixel. Each pixel accumulates charges corresponding to the amount of incident light by way of photoelectric conversion. Signals with a voltage corresponding to the amount of charges accumulated in an exposure period are read out from each pixel; as a result, a group of pixel signals (analog image signals) representing a subject image formed on an image plane is obtained.

An image processing unit 306 applies predetermined signal processing and image processing to the analog image signals output from the image sensor 307, thereby generating signals and image data that suit an intended use, and obtaining and/or generating various types of information.

The processing applied by the image processing unit 306 can include, for example, preprocessing, color interpolation processing, correction processing, detection processing, data editing processing, evaluation value calculation processing, special effects processing, and so forth.

The preprocessing can include A/D conversion, signal amplification, reference level adjustment, defective pixel correction, and so forth.

The color interpolation processing is processing which is executed in a case where the image sensor 307 includes color filters, and in which the values of color components that are not included in the individual pieces of pixel data that compose image data are interpolated. The color interpolation processing is also called demosaicing processing.

The correction processing can include such processing as white balance adjustment, tone correction, correction of image deterioration caused by optical aberration of the image capture optical system (image recovery), correction of the influence of vignetting of the image capture optical system, and color correction.

The data editing processing can include such processing as cutout of a region (cropping), composition, scaling, encoding and decoding, and generation of header information (generation of a data file). The data editing processing also includes generation of video signals to be output to the outside, and video data to be recorded into the ROM 308.

The evaluation value calculation processing can include such processing as generation of signals and evaluation values used in automatic focus detection (AF), and generation of evaluation values used in automatic exposure control (AE). The CPU 301 executes AF and AE.

The special effects processing can include such processing as addition of blur effects, alteration of shades of colors, relighting, and so forth.

Note that these are examples of processing that can be applied by the image processing unit 306, and are not intended to limit processing applied by the image processing unit 306.

The image processing unit 306 outputs information and data that have been obtained or generated to the CPU 301, the RAM 302, and the like in accordance with an intended use.

Note that the types and settings of processing applied by the image processing unit 306 can be controlled by transmitting commands from the capture control apparatus 100 to the overhead camera 300.

A network I/F 305 is an interface for connecting the overhead camera 300 to the communication network 700. The overhead camera 300 (CPU 301) can communicate with external apparatuses in the communication network 700, such as the capture control apparatus 100, the sub camera 400, the main camera 500, and the role control apparatus 600, via the network I/F 305. Note that the overhead camera 300 may communicate with external apparatuses via another non-illustrated communication interface (a USB, Bluetooth, or the like).

(Sub Camera 400)

Next, an exemplary functional configuration of the sub camera 400 will be described. It is assumed that the functional blocks of the sub camera 400 and the overhead camera 300 with the same name have the same functions, and a description thereof is omitted.

As described above, the sub camera 400 is a PTZ camera, and its capture direction and angle of view can be controlled from outside. For this reason, the sub camera 400 includes a driving unit 409 capable of performing pan and tilt operations and a zoom operation, and a driving I/F 408. The driving I/F 408 is a communication interface between the driving unit 409 and a CPU 401.

The driving unit 409 includes a pan/tilt mechanism by which the sub camera 400 is supported so that it can be panned and tilted, a zoom mechanism that changes the angle of view of the image capture optical system, a motor that drives these mechanisms, and the like. Enlargement and reduction of images performed by an image processing unit 406 may be used in the zoom mechanism. The driving unit 409 drives the motor in accordance with instructions received from the CPU 401 via the driving I/F 408, and adjusts the optical axis direction and the angle of view of the image capture optical system.

(Main Camera 500)

Next, an exemplary functional configuration of the main camera 500 will be described. It is assumed that the functional blocks of the main camera 500 and the sub camera 400 with the same name have the same functions, and a description thereof is omitted. The main camera 500 is operated by a user. It is assumed here that the user remotely operates the main camera 500 by transmitting commands via the communication network 700. However, for example, in a case where the main camera 500 is not a PTZ camera, the user may directly operate the main camera 500.

The capture control apparatus 100 (CPU 101) can obtain information of the capture directions and the angles of view of the sub camera 400 and the main camera 500 from the sub camera 400 and the main camera 500 via a network I/F 505. Note that the capture directions may be the pan and tilt angles of the driving units 409 and 509 based on a predetermined reference direction of 0°. The reference direction may be a direction directly facing the captured area.

(Role Control Apparatus 600)

Next, an exemplary functional configuration of the role control apparatus 600 will be described.

A CPU 601 is a microprocessor capable of executing programmed instructions. The CPU 601 controls the operations of each functional block and realizes the functions of the role control apparatus 600 by reading a role setting program stored in a ROM 603 into a RAM 602 and executing the role setting program, for example.

The RAM 602 is used to load the program executed by the CPU 601, and to temporarily store data that is processed by the CPU 601, data that is currently processed, and so forth. Also, a part of the RAM 602 may be used as a video memory for a display unit 608.

The ROM 603 is a nonvolatile rewritable memory, and stores the program executed by the CPU 601, setting values of the role control apparatus 600, user data, and so forth.

A user input unit 611 is an input device, such as a button, a dial, a joystick, and a touch panel, for example. The role control apparatus 600 accepts a user instruction related to the role setting on the sub camera 400 via the user input unit 611.

A network I/F 605 is an interface for connecting the role control apparatus 600 to the communication network 700. The role control apparatus 600 (CPU 601) can communicate with external apparatuses in the communication network 700, such as the overhead camera 300, the sub camera 400, the main camera 500, and the capture control apparatus 100, via the network I/F 605. Note that the role control apparatus 600 may communicate with external apparatuses via another non-illustrated communication interface (a USB, Bluetooth, or the like).

The display unit 608 is a display apparatus, such as a liquid crystal display (LCD). The display unit 608 displays a GUI screen provided by an OS, a role setting application, or the like.

The role control apparatus 600 stores role setting information into the ROM 603, for example. The role setting information is information in which identification information of the sub camera 400 and information indicating a role that has been set are associated with each other. The CPU 601 displays a role setting screen on the display unit 608 by executing the role setting application. The role setting screen displays, for example, identification information (a network address, a name set by the user, and the like) of the sub camera 400 and the name of the role that is currently set in association with each other. An initial value of the role that is currently set may be a default role that has been set in advance. The user can change the current role displayed in association with a desired sub camera 400 by operating the user input unit 611.

Upon detection of a user operation that indicates the end of a setting operation, such as an operation on an OK button included in the role setting screen, the CPU 601 updates the role setting information stored in the ROM 103 in accordance with the content of the role setting screen.

Upon receiving a role obtainment command via the network I/F 605, the CPU 601 reads out the role setting information stored in the ROM 103, and transmits the role setting information to the transmission source of the role obtainment command.

Note that although FIG. 1 and FIG. 2 show the role control apparatus 600 as an independent apparatus, for example, the capture control application executed on the capture control apparatus 100 may provide functions similar to the functions of the role control apparatus 600. Furthermore, a role may be set directly on the sub camera 400, and the capture control apparatus 100 may obtain the role assigned to the sub camera 400 from the sub camera 400.

How to use information obtained from the main camera 500 in controlling the operations of the sub camera 400 is determined in advance in relation to a role that can be set on the sub camera 400. It is assumed here that information of the main camera is used in controlling a tracking target subject and a zoom operation of the sub camera 400 as one example.

Figures 4, 5:
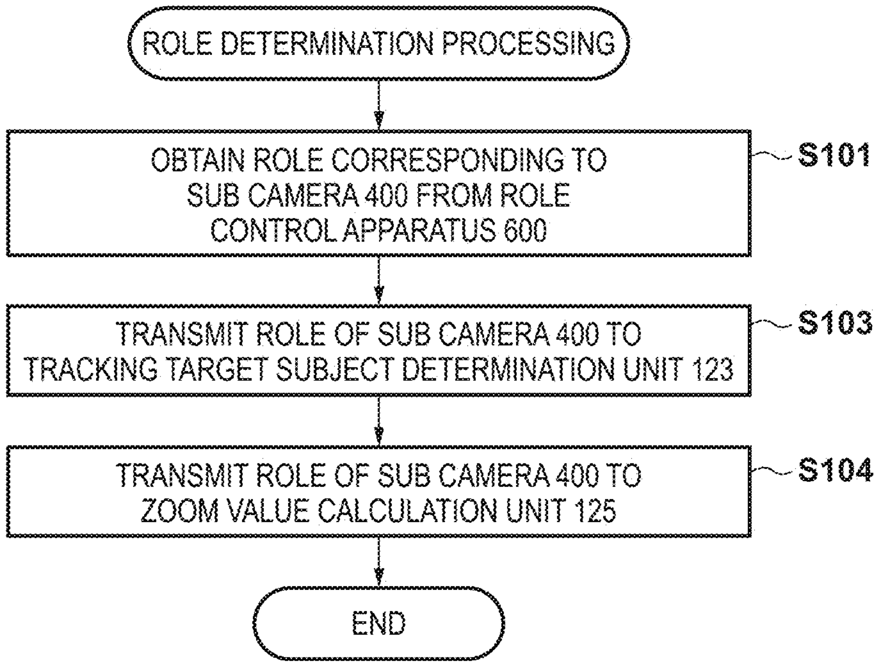
FIG. 4 is a diagram showing examples of roles and contents of control that can be set on a sub camera according to an embodiment.
FIG. 5 is a flowchart related to role determination processing according to the first embodiment.

FIG. 4 shows examples of the types of roles that can be set on the sub camera 400, and the contents of control associated with the roles. The content of control for each role can be stored in the ROM 603 of the role control apparatus 600 and the ROM 103 of the capture control apparatus 100 in a table format shown in FIG. 4, for example. It is assumed here that one of "main follow (MF)", "main counter (MC)", "assist follow (AF)", and "assist counter (AC)" can be set as a role (ROLE). In a case where there are a plurality of sub cameras 400, a role can be set for each sub camera.

With respect to the sub camera 400 whose role (ROLE) is "main follow", the capture control apparatus 100 (CPU 101) sets the same tracking target subject as the main camera 500, and also performs in-phase zoom control on the sub camera 400 when a zoom operation has been performed on the main camera 500. Here, in-phase means that the zoom direction (telephoto direction or wide-angle direction) is the same, that is to say, the direction of change in the angle of view is the same. On the other hand, antiphase means that the zoom direction (telephoto direction or wide-angle direction) is the opposite direction, that is to say, the direction of change in the angle of view is the opposite direction. Note that the angle of view may not be the same as that of the main camera 500 even if the zoom direction is in-phase, and the degree of change in zooming (the speed of change, the rate of change, or the like) may not be the same as that of the main camera 500 whether the zoom direction is in-phase or antiphase.

With respect to the sub camera 400 whose role (ROLE) is "main counter", the capture control apparatus 100 (CPU 101) sets the same tracking target subject as the main camera 500, and also performs antiphase zoom control on the sub camera 400 when a zoom operation has been performed on the main camera 500. Therefore, in a case where a zoom-in operation has been performed on the main camera 500, the capture control apparatus 100 (CPU 101) controls the sub camera 400 of this role to zoom out. Note that to zoom in means to switch to zooming in the telephoto direction (the direction toward the telephoto end), whereas to zoom out means to switch to zooming in the wide-angle direction (the direction toward the wide-angle end). In a case where zoom control is performed by the image processing unit 406, to zoom in means to reduce a region to be cut out from an image and increase the enlargement factor of the cut-out region compared to that before changing the region. On the other hand, to zoom out means to increase a region to be cut out from an image and reduce the enlargement factor of the cut-out region compared to that before changing the region.

With respect to the sub camera 400 whose role (ROLE) is "assist follow", the capture control apparatus 100 (CPU 101) sets a tracking target subject different from that of the main camera 500, and also performs in-phase zoom control on the sub camera 400 when a zoom operation has been performed on the main camera 500.

With respect to the sub camera 400 whose role (ROLE) is "assist counter", the capture control apparatus 100 (CPU 101) sets a tracking target subject different from that of the main camera 500. Also, when a zoom operation has been performed on the main camera 500, the capture control apparatus 100 performs antiphase zoom control on the sub camera 400.

Here, with respect to the sub camera 400 whose role (ROLE) is "assist follow" or "assist counter", a subject located on the left side (the far left) among the subjects other than a subject of interest of the main camera 500 in an image is set as a tracking target subject of the sub camera 400. Note that the tracking target subject of the sub camera 400 may be set in accordance with other conditions. For example, a subject that is located on the right side (the far right), the upper side (the top), or the lower side (the bottom) among the subjects other than a subject of interest of the main camera 500 in an image may be set as the tracking target subject of the sub camera. Alternatively, a subject that is located nearest to the front or the back among the subjects other than a subject of interest of the main camera 500 may be set as the tracking target subject of the sub camera 400.

Furthermore, only one of the setting of the tracking target subject and zoom control may be executed, and another control item may be further added.

In the role setting information, which is stored into the ROM 603 by the role control apparatus 600, information indicating the role (ROLE) (e.g., the name of the type described above, or the number assigned to the type) is associated with identification information of the sub camera 400. The CPU 101 of the capture control apparatus 100 obtains the role setting information from the role control apparatus 600, and executes control on the operations of the sub camera 400 in accordance with the type of the role (ROLE) set on the sub camera 400.

Note that in a case where the role setting on the sub camera 400 has been changed, the role control apparatus 600 may notify an external apparatus (e.g., the capture control apparatus 100) of the change. In this way, the change in the role setting can be immediately reflected in control on the operations of the sub camera 400.

<Description of Operations of Each Apparatus>

Subsequently, the operations of each apparatus in the multi-camera image capture system will be described. It is assumed here that the capture control apparatus 100 performs automatic control on a capture operation of the sub camera 400 based on a video of the overhead camera 300, information obtained from the main camera 500, and a role set on the sub camera 400.

Figure 3:
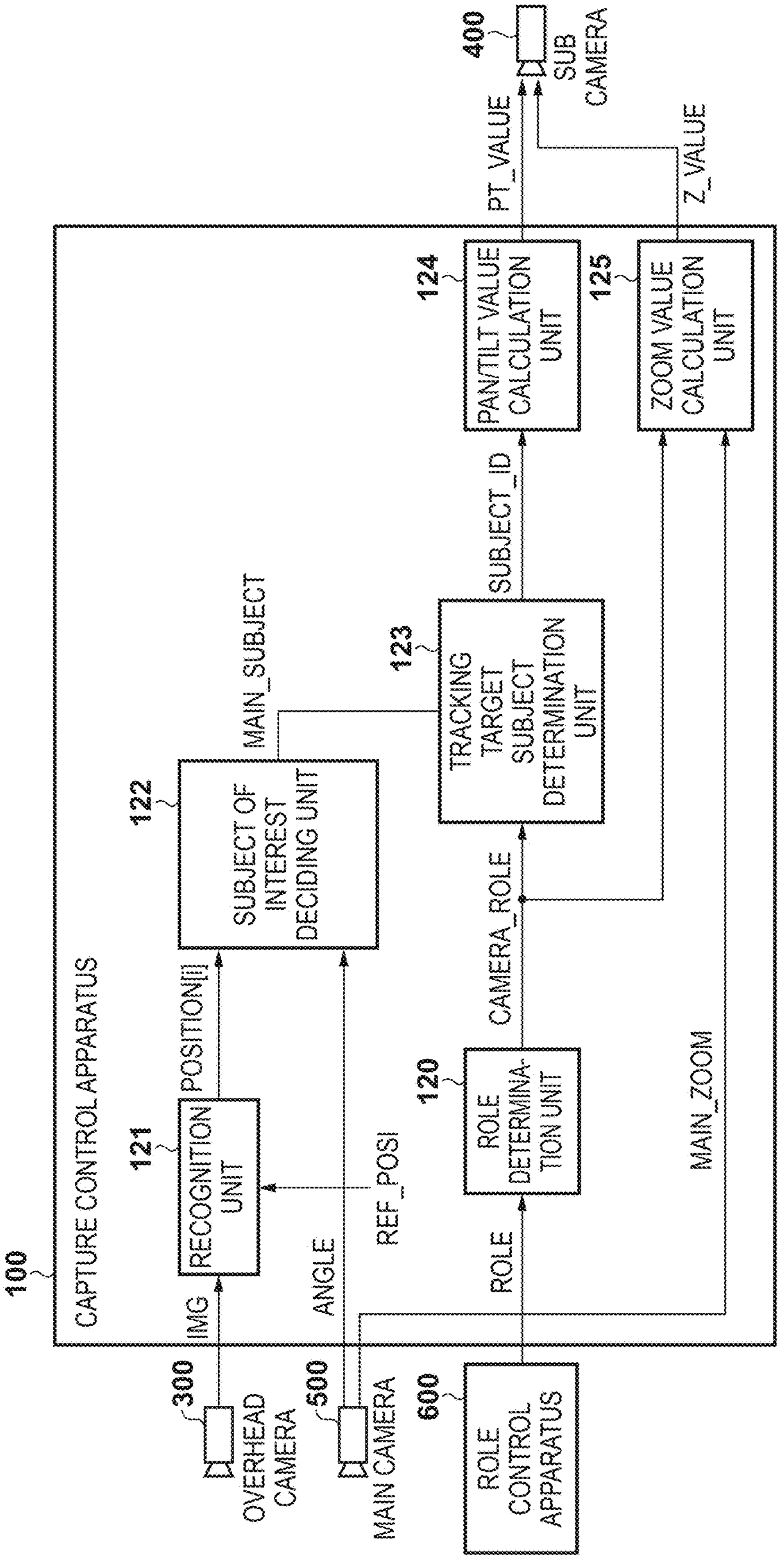
FIG. 3 is a diagram showing a capture control apparatus according to an embodiment, with a focus on main operations and flows of signals.

FIG. 3 is a diagram showing a processing sequence that is performed when the capture control apparatus 100 controls the operations of the sub camera 400, with a focus on main operations and flows of signals. The functional blocks shown inside the capture control apparatus 100 schematically indicate the main operations, and are equivalent to the main functions provided by the capture control application. Each functional block of FIG. 3 is realized by a combination of the CPU 101, which executes the capture control application, and one or more of the functional blocks of the capture control apparatus 100 shown in FIG. 2.

FIG. 5 is a flowchart showing the operations of the CPU 101 as a role determination unit 120. Also, FIG. 6A to FIG. 6D are flowcharts related to the operations of the capture control apparatus 100, the overhead camera 300, the main camera 500, and the sub camera 400, respectively.

In the following description, it is assumed that the capture control apparatus 100 is aware of the three-dimensional coordinate value of the viewpoint position of the overhead camera 300 and the capture direction (the optical axis direction) thereof. Furthermore, it is assumed that known position information, such as the three-dimensional coordinate values of the viewpoint positions of the sub camera 400 and the main camera 500, and the coordinate values of markers placed in the captured area, is stored in advance as predetermined position information REF_POSI in the ROM 103. Note, it is assumed that the coordinate system of a position is determined in advance in accordance with the type of the position.

(Operations of Role Determination Unit 120)

First, the operations of the CPU 101 as the role determination unit 120 of FIG. 3 will be described with reference to the flowchart shown in FIG. 5. The operations described below are realized by the CPU 101 executing the capture control application.

Note that although the timing to start the operations shown in the flowchart of FIG. 5 is not limited in particular, the operations are executed at least before the start of control on the capture operation of the sub camera 400. Furthermore, it is assumed that the operations are also executed upon receiving a notification indicating that the role setting on the sub camera 400 has been changed from the role control apparatus 600 via the network I/F 105.

In step S101, the CPU 101 as the role determination unit 120 obtains a role (ROLE) corresponding to the sub camera 400 (role setting information) from the role control apparatus 600. The CPU 101 can obtain the above-described role setting information from the role control apparatus 600 by, for example, transmitting a role obtainment command to the role control apparatus 600 via the network I/F 105. The CPU 101 stores the obtained role setting information into the RAM 102.

In step S103, the CPU 101 refers to the role setting information stored in the RAM 102 based on identification information of the sub camera 400, and obtains the content of operational control on the sub camera 400. Then, the CPU 101 as the role determination unit 120 transmits the obtained content of operational control (CAMERA_ROLE) to a tracking target subject determination unit 123. In practice, the CPU 101 stores the content of operational control into a specific region of the RAM 102, and refers to the same when it functions as the tracking target subject determination unit 123.

In step S104, the CPU 101 as the role determination unit 120 transmits the obtained content of operational control (CAMERA_ROLE) to a zoom value calculation unit 125. In practice, the CPU 101 stores the content of operational control into a specific region of the RAM 102, and refers to the same when it functions as the zoom value calculation unit 125.

(Operations of Capture Control Apparatus 100)

Next, the operations of the capture control apparatus 100 to control image capture performed by the sub camera 400 will be described with reference to FIG. 3 and FIG. 6A. The operations described below are equivalent to the operations of the CPU 101 as a recognition unit 121, a subject of interest determination unit 122, a tracking target subject determination unit 123, a pan/tilt value calculation unit 124, and a zoom value calculation unit 125 of FIG. 3. Note that the operations described below are realized by the CPU 101 executing the capture control application.

In step S201, the CPU 101 transmits a capture instruction command to the overhead camera 300 via the network I/F 105 using a predetermined protocol. In response to this command, the overhead camera 300 starts to supply video signals (moving image data) IMG to a video input unit 107. The CPU 101 starts to store the video signals received by the video input unit 107 into the RAM 102, and then executes step S202.

In step S202, the CPU 101 obtains information ANGLE indicating a capture direction from the main camera 500. Specifically, the CPU 101 transmits a capture direction obtainment command to the main camera 500 via the network I/F 105 using a predetermined protocol. In response to the capture direction obtainment command, a CPU 501 of the main camera 500 transmits information ANGLE indicating the current capture direction of the main camera 500 to the capture control apparatus 100. The information ANGLE may be, for example, the pan and tilt angles of the driving unit 509. The CPU 101 stores the obtained information ANGLE into the RAM 102.

In step S203, the recognition unit 121 executes the following processing.

(1) Apply processing for detecting subject regions to an input frame image, and store the detection results.

(2) For each of the detected subject regions, apply coordinate transformation to position information (image coordinates).

(3) For each of the detected subject regions, apply identification processing and specify identification information (in the case of a new subject, add information for identification processing).

(4) For each of the detected subject regions, store identification information ID[n] and position information POSITION[n] in association with each other.

The recognition unit 121 is realized mainly by the CPU 101 and the inference unit 104. The CPU 101 reads out, from the RAM 102, one frame of the video received from the overhead camera 300, and inputs the frame to the inference unit 104.

The following describes the operations of the recognition unit 121 in order.

(1) First, the inference unit 104 inputs the frame image to the machine learning model, and detects subject regions. The inference unit 104 stores the positions and the sizes of the respective subject regions that have been detected and the detection reliability degrees thereof, which have been output by the machine learning model as detection results, into the RAM 102. A position and a size of a subject region may be any information that allows a position and a size of a rectangular region in which the subject region is inscribed to be specified. Here, the central coordinates of the lower edge of the rectangular region, and the width and the height of the rectangular region, are used as the position and the size of the subject region.

Also, the inference unit 104 stores the detection results for the first frame image into the RAM 102 in association with identification information pieces ID[n] of subjects. Here, n is a subject number, and is an integer that takes a value from one to the total number of detected subject regions. Furthermore, the inference unit 104 stores the subject regions detected from the first frame image as templates for identifying the individual subjects into the RAM 102 in association with the identification information pieces ID[n] of the subjects. In a case where template matching is not used in identification of subjects, the templates may not be stored.

Figure 7A:
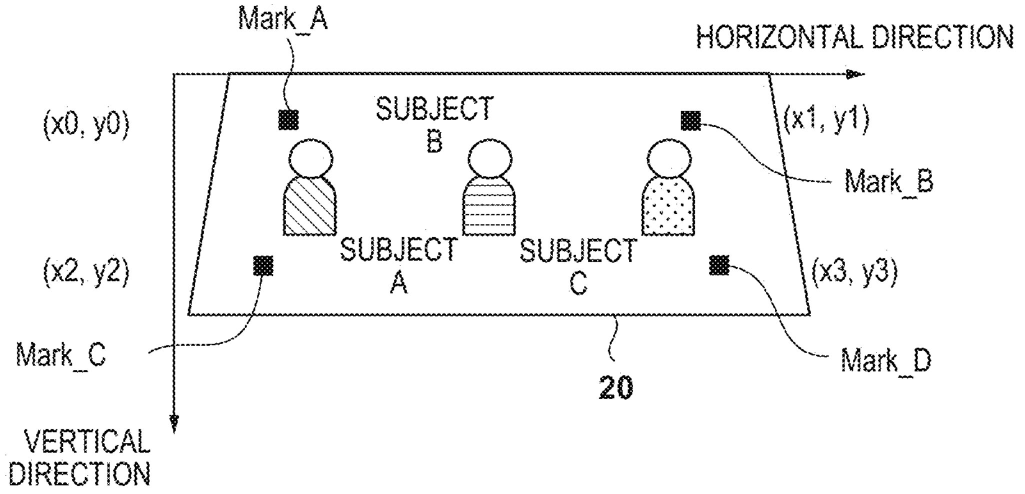
FIGS. 7A and 7B are diagrams illustrating a coordinate transformation according to an embodiment.
Figure 8A:
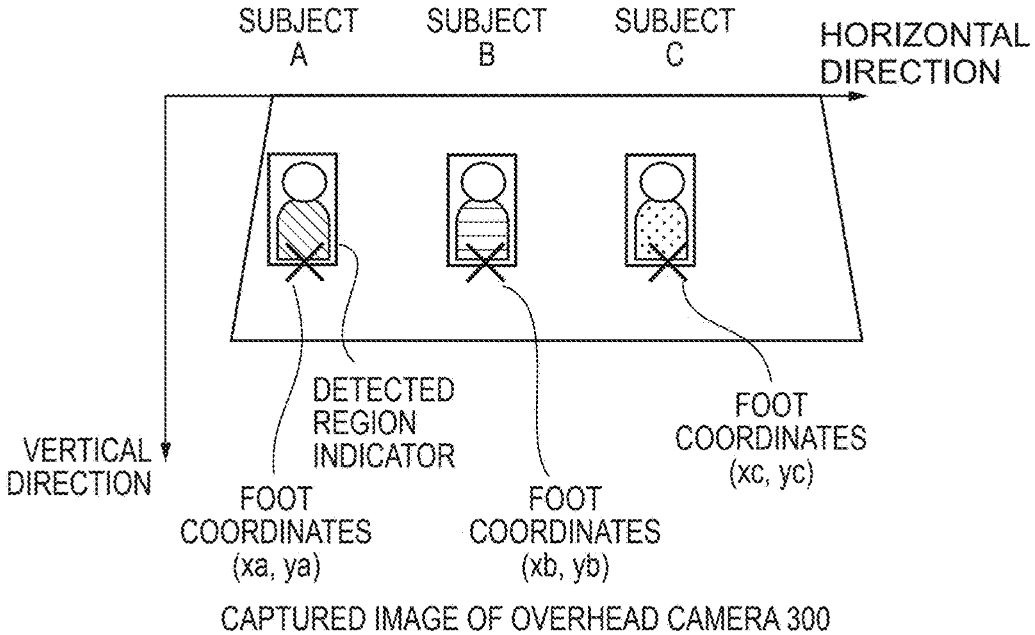
FIGS. 8A and 8B are diagrams related to subject detection and a coordinate transformation according to an embodiment.

FIG. 8A shows examples of the results of subject detection processing that has been executed by the inference unit 104 with respect to a video of the overhead camera 300 shown in FIG. 7A. Here, the regions of human subjects A to C, who are present inside a captured area 20, are detected, and the coordinates of the centers of the lower edges of rectangular regions in which the subject regions are inscribed (foot coordinates) are output as positions.

Figure 7B:
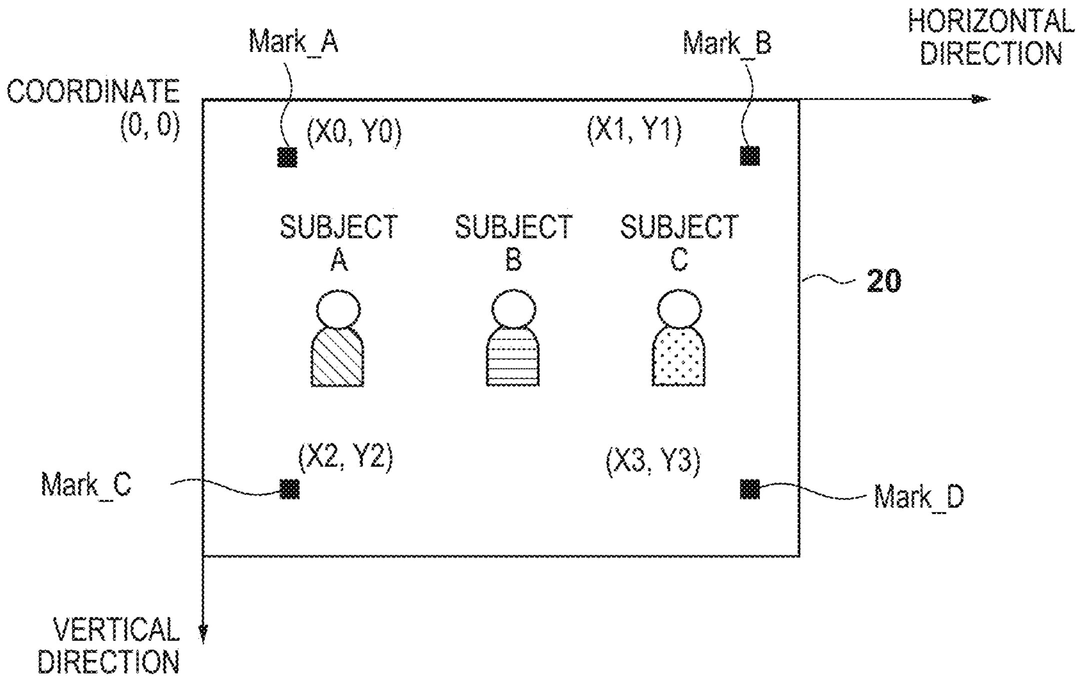

Note, for example, in a case where markers (Marks) are placed at known positions inside the captured area 20 as shown in FIG. 7B for the purpose of later-described coordinate transformation, the CPU 101 detects images of the markers included in the frame image (FIG. 7A), and stores the positions thereof into the RAM 102. The inference unit 104 may be configured to execute the detection of marker images as well. The detection of marker images can be carried out using any known method, such as pattern matching that uses marker templates. Marker images may be detected using a pre-stored machine learning model intended for marker detection.

(2) Next, the coordinate transformation executed by the inference unit 104 will be described. FIG. 7A schematically shows a video of the overhead camera 300, and FIG. 7B schematically shows a state where the captured area 20 is viewed from directly above the center thereof. The inference unit 104 transforms the coordinates of the positions of the subject regions in a coordinate system of the overhead camera into the values of a coordinate system (planar coordinate system) of a case where the captured area 20 is viewed from directly above the center thereof.

Here, the reason why the coordinates are transformed into the values of the planar coordinate system is because the coordinate transformation is convenient for calculation of a pan value for causing the sub camera 400 to capture a specific subject (an angle of movement on a horizontal plane). Note that the present description is provided on the premise that the sub camera 400 is placed so that the driving unit 409 performs a pan operation on a horizontal plane parallel to the floor of the captured area 20.

The coordinate transformation can be executed using a variety of methods; here, markers are placed at a plurality of known positions on the floor of the captured area 20, and the coordinates of the overhead camera coordinate system are transformed into the coordinates of the planar coordinate system based on the marker positions inside the video obtained from the overhead camera 300. Note that the coordinate transformation may be performed with use of, for example, the viewpoint position and the capture direction of the overhead camera 300, without using markers.

The coordinate transformation can be executed using a homography transformation matrix H in accordance with the following formula 1.

$$\begin{pmatrix} X \\ Y \\ W \end{pmatrix} = H \begin{pmatrix} x \\ y \\ 1 \end{pmatrix} \quad \text{(formula 1)}$$

In formula 1, x and y on the right side are the horizontal coordinate and the vertical coordinate in the overhead camera coordinate system, whereas X and Y on the left side are the horizontal coordinate and the vertical coordinate in the planar coordinate system.

The homography transformation matrix can be calculated by solving simultaneous equations by assigning the coordinates of the four markers detected from the video and the (known) coordinates of the four markers placed in the captured area 20 in formula 1. In a case where the positional relationship between the captured area 20 and the overhead camera 300 is fixed, the homography transformation matrix H can be calculated in advance at the time of test image capture and stored into the ROM 103, for example.

Figure 8B:
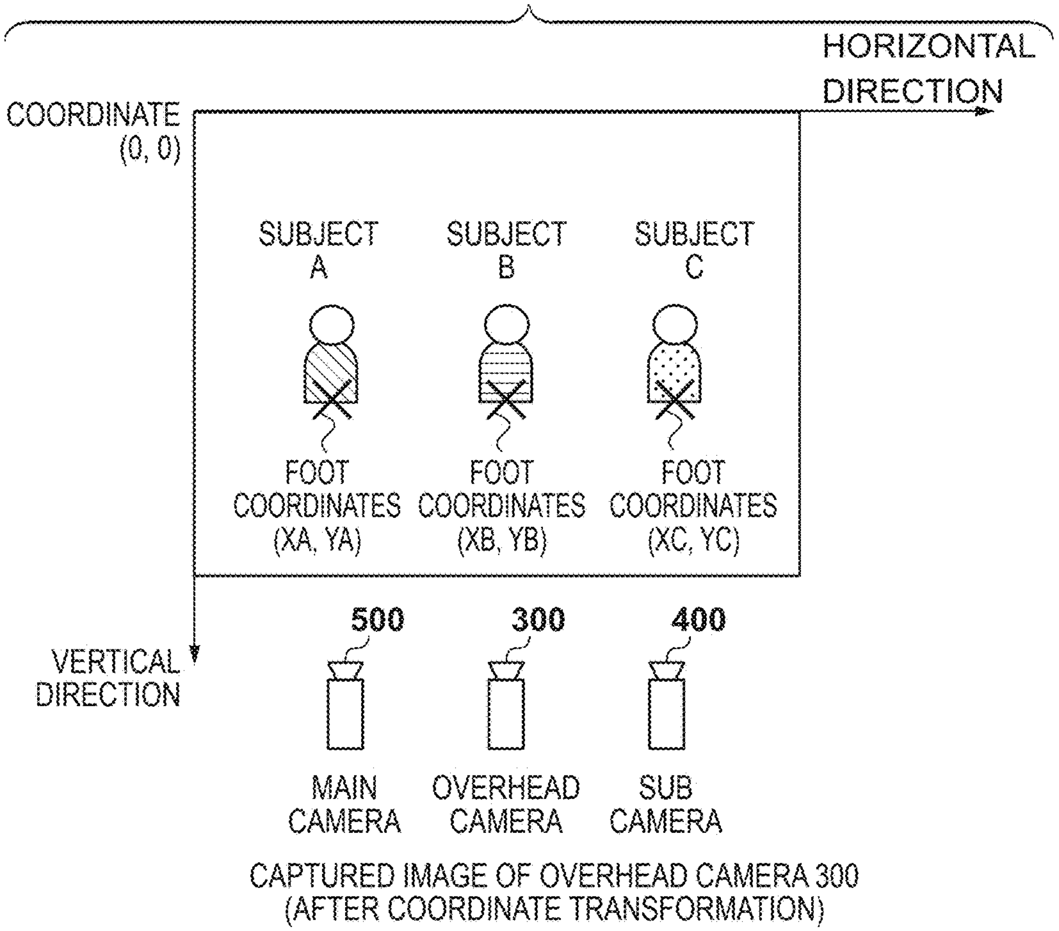

The CPU 101 sequentially reads out the positions of the subject regions from the RAM 102, and transforms the coordinates thereof into the values of the planar coordinate system. FIG. 8B schematically shows a state where the foot coordinates (x, y) of each subject region detected from the video of the overhead camera 300 shown in FIG. 8A have been transformed into the coordinate values (X, Y) of the planar coordinate system with use of formula 1 and the homography transformation matrix H stored in the ROM 103. The CPU 101 stores the foot coordinates obtained through the coordinate transformation as POSITION[n] into the RAM 102.

(3) Next, a description is given of an operation of the inference unit 104 to specify the identification information pieces ID[n] of the subjects. It is assumed here that the subjects are identified using template matching. Subject identification is carried out with respect to the results of subject detection processing that has been executed for the second time onward. With respect to the results of processing that has been executed for the first time, it is sufficient to newly assign identification information pieces ID[n] to the subject regions.

The inference unit 104 specifies identification information pieces ID[n] of the detected subject regions by way of template matching that uses templates stored in the RAM 102. As a result, the subjects inside the captured area are identified. For example, for each of the detected subject regions, the inference unit 104 calculates evaluation values indicating correlations with the individual templates. Then, the inference unit 104 specifies identification information ID[n] corresponding to a template with which it has a correlation equal to or larger than a certain level and it has the highest correlation as identification information ID[n] of the subject region. For example, a known value, such as the sum of absolute differences between pixel values, can be used as an evaluation value.

Note, with respect to a subject region that does not have a correlation equal to or larger than the certain level with any template, the inference unit 104 assigns new identification information ID[n] and adds an image of the subject region as a template.

Also, the inference unit 104 may update existing templates using the subject regions that have been detected in the latest frame image, and may delete a template if a subject region that has a correlation equal to or larger than the certain level therewith does not exist for a certain period. Furthermore, the inference unit 104 may store templates corresponding to identification information pieces ID[n] that frequently appear into the ROM 103.

Note that the subjects may be identified using a method other than template matching. For example, the same identification information ID[n] may be specified for a subject region that is closest, in terms of at least one of the detected position and the size, to an immediately-preceding subject region. Also, a position in the current frame image may be predicted using a Kalman filter or the like based on positional transitions in the plurality of past detection results associated with the same identification information, and the same identification information ID may be specified for a subject region that is closest to the predicted position. Furthermore, these methods may be combined. When template matching is not used, the accuracy of identification of different subjects with similar appearances can be increased.

(4) The inference unit 104 stores the specified identification information pieces ID[n] and the positions (planar coordinate system) POSITION[n] of the corresponding subject regions into the RAM 102 in association with each other.

Note that among the processing of (1) to (4), processing other than the subject detection may be executed by the CPU 101 in place of the inference unit 104.

Here, the identification information pieces ID[n] and the positions POSITION[n] related to the subjects inside the captured area 20 are obtained using the video of the overhead camera 300. However, a video of the sub camera 400 may be used. In a case where there are a plurality of sub cameras 400, the CPU 101 executes the operations shown in the flowchart of FIG. 6A for each sub camera 400. The positions of subject regions are output as values of a coordinate system of each sub camera 400. In this way, the overhead camera 300 is not indispensable, but it is considered that the accuracy of subject detection is higher when the overhead camera 300 is used.

Figure 6A:
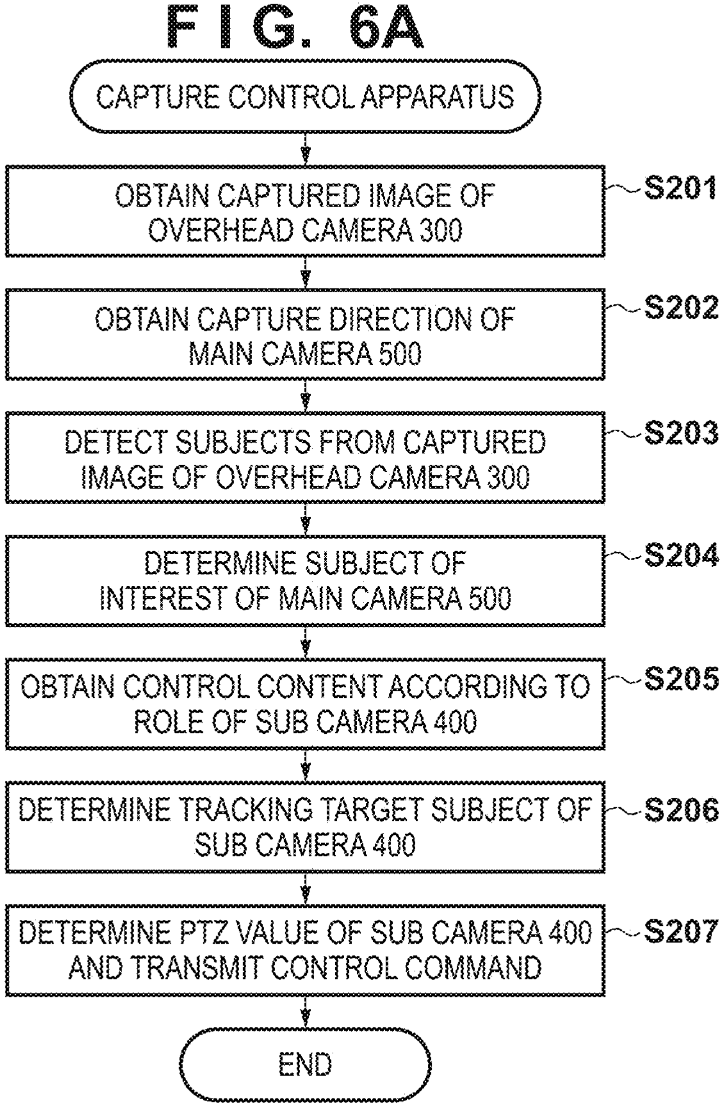
FIGS. 6A to 6D are flowcharts related to the operations of each apparatus in the image capture system according to an embodiment.

Returning to the description of FIG. 6A, in step S204, the CPU 101 as the subject of interest determination unit 122 of FIG. 3 determines a subject of interest that acts as a tracking target subject of the main camera 500. The CPU 101 can determine the subject of interest of the main camera 500 among the subjects detected in step S203 based on the capture direction of the main camera 500 obtained in step S202. The CPU 101 stores the identification information ID[n] corresponding to the subject region that has been determined as the subject of interest of the main camera 500 as identification information MAIN_SUBJECT of the subject of interest into the RAM 102.

For example, the CPU 101 can determine a subject that is closest to the capture direction of the main camera 500 in the planar coordinate system as the subject of interest of the main camera 500. Note that in a case where there are a plurality of subjects that are at a distance equal to or smaller than a threshold from the capture direction of the main camera 500, the user may select the subject of interest from among such subjects.

In a case where the user selects the subject of interest, the CPU 101 causes the display unit 108 or an external display apparatus to display the frame image to which the subject detection processing has been applied in step S202, together with an indicator that indicates the capture direction and indicators that indicate subject regions that are candidates for the subject of interest. The indicators of the subject regions may be, for example, rectangular frames indicating the outer edges of the subject regions shown in FIG. 8A, or may be other indicators. Furthermore, the CPU 101 may cause the display unit 108 to also display, for example, a message for encouraging a selection of a subject of interest inside the image.

The user can select a subject region corresponding to a desired subject of interest by operating the user input unit 106 (input device). The selection method is not limited in particular, but may be an operation of designating a desired subject region by operating a mouse or a keyboard.

Upon detecting a user operation for designating a subject region, the CPU 101 stores the identification information ID[n] corresponding to the designated subject region as identification information MAIN_SUBJECT of the subject of interest into the RAM 102.

Next, in step S205, the CPU 101 as the tracking target subject determination unit 123 of FIG. 3 obtains content of control CAMERA_ROLE corresponding to the role set on the sub camera 400. Specifically, the CPU 101 reads out content of control CAMERA_ROLE that has been obtained in the role determination processing, which has been described using FIG. 5, and stored in the RAM 102. Note that in a case where there are a plurality of sub cameras 400, the CPU 101 executes the processing of steps S205 to S207 for each sub camera.

In step S206, the CPU 101 as the tracking target subject determination unit 123 determines a subject to be tracked and captured by the sub camera 400 in accordance with the content of control CAMERA_ROLE. The CPU 101 determines a tracking target subject of the sub camera 400 in accordance with the provision related to the tracking target subject included in the content of control CAMERA_ROLE (FIG. 4).

In a case where the sub camera 400 is to have a tracking target subject that is the same as the subject of interest of the main camera 500, the CPU 101 sets the identification information MAIN_SUBJECT of the subject of interest that has been determined on in step S203 as identification information SUBJECT_ID of the tracking target subject of the sub camera 400.

In a case where a subject located on the left side among the subjects other than the subject of interest of the main camera 500 is to be set as the tracking target subject of the sub camera 400, the CPU 101 detects, among the subject regions detected in step S203, a leftmost subject region among the subject regions other than the subject of interest. Then, the CPU 101 sets the identification information ID[n] corresponding to the detected subject region as identification information SUBJECT_ID of the tracking target subject of the sub camera 400.

The CPU 101 writes the identification information SUBJECT_ID of the determined tracking target subject to the RAM 102. In a case where the tracking target subject can differ among the sub cameras, the CPU 101 stores the identification information pieces SUBJECT_ID of the tracking target subjects in association with the identification information pieces of the sub cameras. Note that in a case where the tracking target subject has changed, the CPU 101 keeps holding information of the previous tracking target subject in the RAM 102 without deleting the same.

Figure 9A:
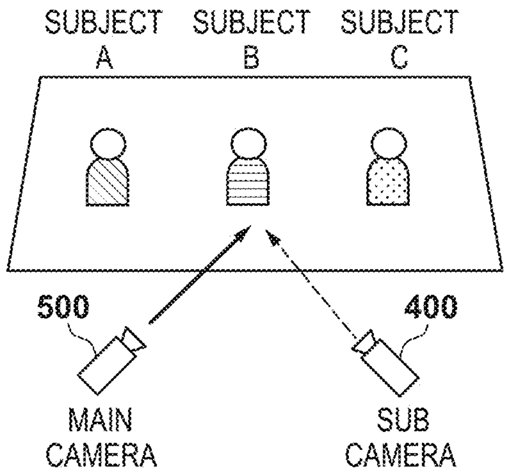
FIGS. 9A to 9C are schematic diagrams of control on the operations of the sub camera according to the first embodiment.
Figure 9B:
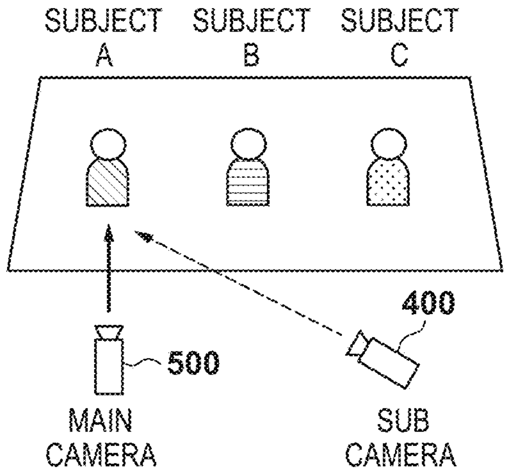
Figure 9C:
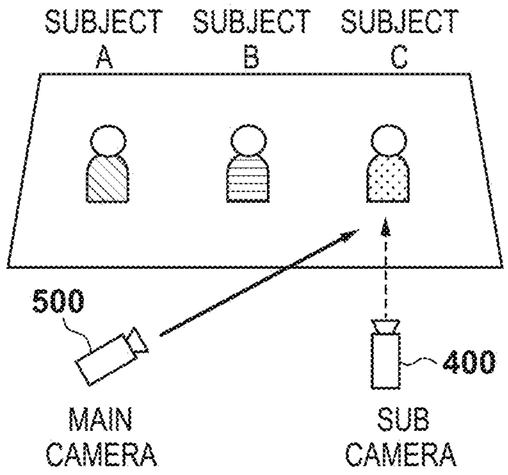

Using FIGS. 9A to 9C, the following describes the operations for a case where the role set on the sub camera 400 is "main follow". With regard to the sub camera 400 on which the role "main follow" is set, the capture control apparatus 100 performs control to track a subject of interest of the main camera 500.

Therefore, in a case where the subject of interest of the main camera 500 has been determined to be the subject B as shown in FIG. 9A, the CPU 101 determines the subject B as a tracking target subject of the sub camera 400. Thereafter, in a case where it has been determined that the subject of interest of the main camera 500 has been changed to the subject A as shown in FIG. 9B, the CPU 101 changes the tracking target subject of the sub camera 400 to the subject A. Similarly, in a case where it has been determined that the subject of interest of the main camera 500 has been changed to the subject C as shown in FIG. 9C, the CPU 101 changes the tracking target subject of the sub camera 400 to the subject C.

Figure 10A:
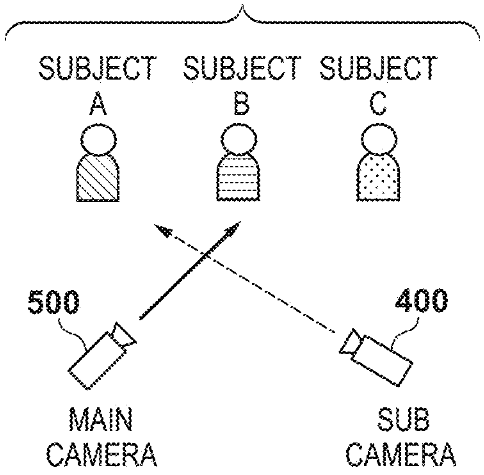
FIGS. 10A to 10C are schematic diagrams of another control on the operations of the sub camera according to the first embodiment.
Figure 10B:
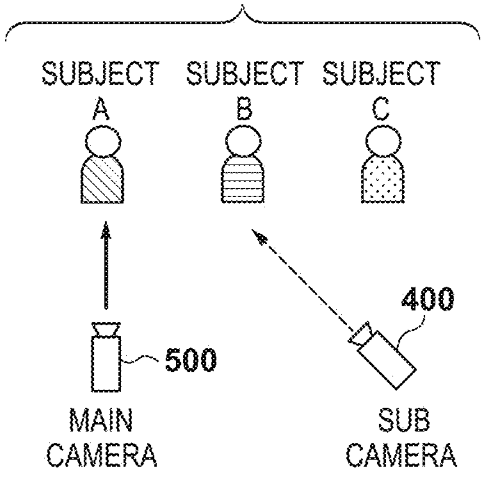
Figure 10C:
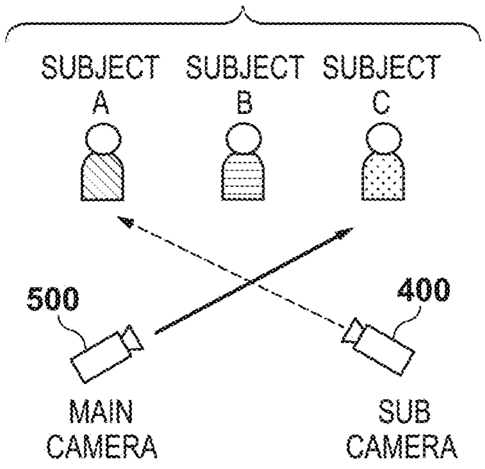

Using FIGS. 10A to 10C, the following describes the operations for a case where the role set on the sub camera 400 is "assist follow". With regard to the sub camera 400 on which the role "assist follow" is set, the capture control apparatus 100 performs control to track a subject located on the left side among subjects other than the subject of interest of the main camera 500.

Therefore, in a case where the subject of interest of the main camera 500 has been determined to be the subject B as shown in FIG. 10A, the CPU 101 determines the left-side subject A among the subjects A and C as a tracking target subject of the sub camera 400. Thereafter, in a case where it has been determined that the subject of interest of the main camera 500 has been changed to the subject A as shown in FIG. 10B, the CPU 101 changes the tracking target subject of the sub camera 400 to the left-side subject B among the subjects B and C. Furthermore, in a case where it has been determined that the subject of interest of the main camera 500 has been changed to the subject C as shown in FIG. 10C, the CPU 101 changes the tracking target subject of the sub camera 400 to the left-side subject A among the subjects A and B.

By dynamically changing the role set on the sub camera 400 with use of the role control apparatus 600, the tracking target subject of the sub camera 400 can be changed, and automatic image capture can be flexibly performed.

Returning to FIG. 6A, in step S207, the CPU 101 as the pan/tilt value calculation unit 124 calculates the amounts of changes in the pan angle and the tilt angle that are necessary for the sub camera 400 to track and capture the tracking target subject that has been determined on in step S206. Also, the CPU 101 as the zoom value calculation unit 125 calculates a zoom value of the sub camera 400 corresponding to the change in the angle of view of the main camera 500. The following describes a case where there is one sub camera 400; however, in a case where there are a plurality of sub cameras 400, the amounts of changes in the pan angle and the tilt angle, as well as the zoom value, are calculated for each sub camera.

First, the operations of the CPU 101 as the pan/tilt value calculation unit 124 will be described. It is assumed here that the following information is stored in advance as predetermined position information REF_POSI in the ROM 103 for each sub camera 400.

Three-dimensional coordinates of the position of placement (a value in the planar coordinate system)

A capture direction corresponding to the initial values of the pan angle and the tilt angle of the driving unit Range in which the pan and tilt angles can be controlled The CPU 101 reads out position information POSITION_OH corresponding to identification information SUBJECT_ID of the tracking target subject of the sub camera 400 from the RAM 102. Then, the CPU 101 first determines the pan angle from the position information POSITION_OH and the position of placement of the sub camera 400.

Figure 11:
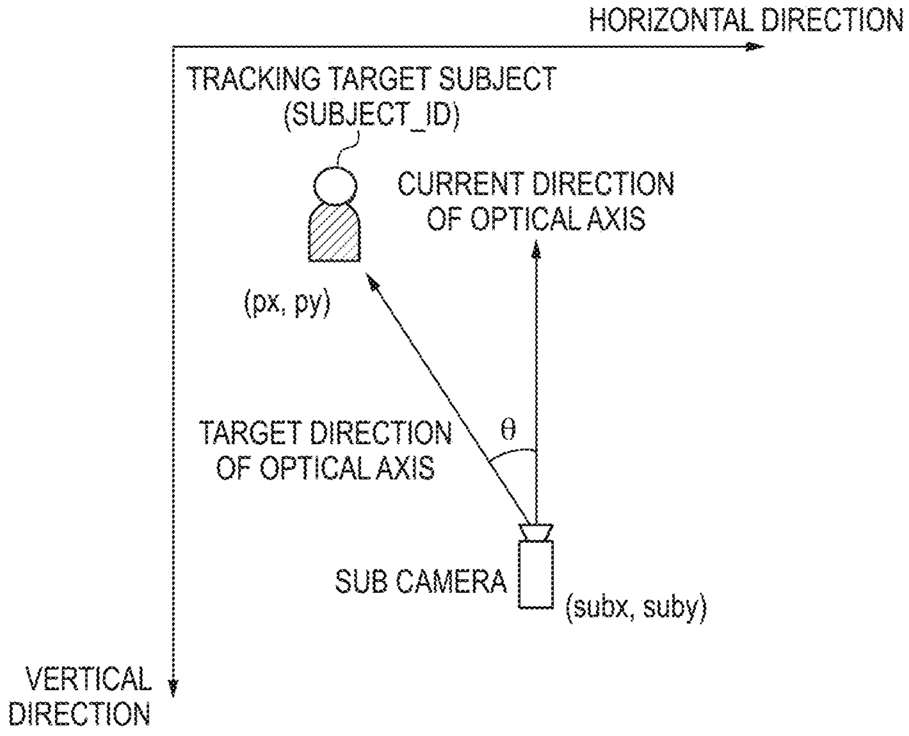
FIG. 11 is a diagram illustrating calculation of a pan value according to an embodiment.

FIG. 11 is a diagram showing an example of a positional relationship between the sub camera 400 and the tracking target subject in the planar coordinate system. It is assumed here that a pan angle θ for pointing the optical axis direction of the sub camera 400 at the subject position is determined. The CPU 101 calculates the pan angle θ using the following formula 2.

$$\theta = \tan^{-1}\frac{px - subx}{py - suby}(\text{rad}) \qquad \text{(formula 2)}$$

In formula 2, px and py are the horizontal coordinate and the vertical coordinate of the position information POSITION_OH corresponding to the identification information SUBJECT_ID of the tracking target subject. Also, subx and suby are the horizontal coordinate and the vertical coordinate of the position of placement of the sub camera. It is assumed here that the current pan angle is the initial value 0°, and the optical axis direction is the vertical direction (Y-axis direction). In a case where the current optical axis direction is not the vertical direction, it is sufficient to reflect the angle difference between the current optical axis direction and the vertical direction in the angle obtained from formula 2. Furthermore, the pan direction is the counterclockwise direction if subx>px, and the clockwise direction if subx<px.

Figure 12:
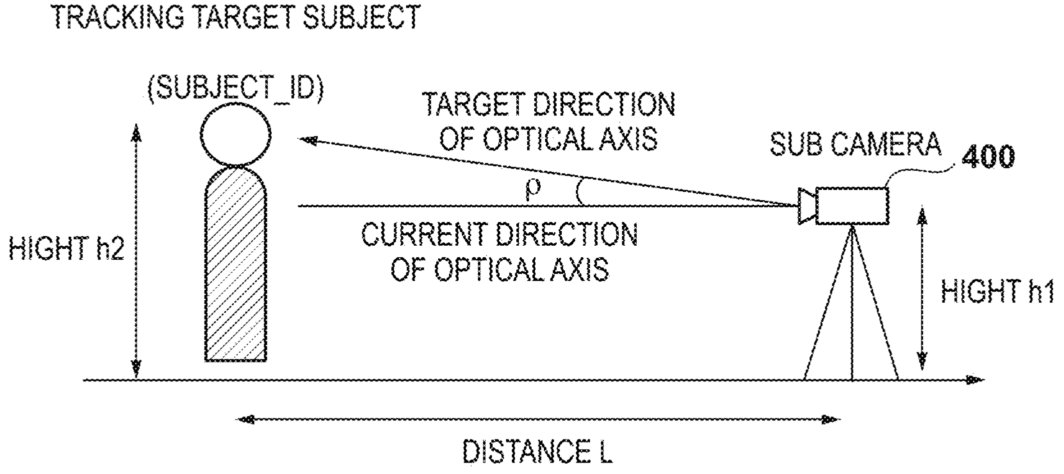
FIG. 12 is a diagram illustrating calculation of a tilt value according to an embodiment.

Next, the method of determination of the tilt angle will be described using FIG. 12. FIG. 12 shows a state where the sub camera and the tracking target subject are viewed from the side. It is assumed that the current optical axis of the sub camera 400 extends in the horizontal direction, the height thereof is h1, and the face of the tracking target subject at which the optical axis is to be pointed is at a height of h2. It is assumed that the angle difference in the height direction between the current optical axis direction and a target optical axis direction (the tilt angle) is p. The CPU 101 calculates the tilt angle ρ using the following formula 3 and formula 4.

$$L = \sqrt{(px - subx)^2 + (py - suby)^2} \qquad \text{(formula 3)}$$

$$\rho = \tan^{-1}\frac{h2 - h1}{L}(\text{rad}) \qquad \text{(formula 4)}$$

The coordinate values used in formula 4 are the same as the coordinate values used in formula 2. It is assumed that h1 and h2 are input to the capture control application and stored into the RAM 102 in advance. In this case, identification numbers that are associated with h2 of the respective subjects are set to be the same as identification numbers assigned in the subject detection processing. Alternatively, a value that has been measured in real time using a non-illustrated sensor may be used as h2.

It is assumed here that the current tilt angle is the initial value 0°, and the optical axis direction is the horizontal direction (the heights are constant). In a case where the current optical axis direction is not the horizontal direction, it is sufficient to reflect the angle difference between the current optical axis direction and the horizontal direction in the angle obtained from formula 4. Furthermore, the tilt direction is a downward direction if h1>h2, and an upward direction if h1<h2.

The CPU 101 cyclically communicates with the sub camera 400 via the communication network 700, obtains the current optical axis direction (the pan angle and the tilt angle of the driving unit), and stores the same into the RAM 102. Note that the communication cycle can be, for example, equal to or smaller than the reciprocal of the frame rate. Alternatively, the CPU 101 may hold the value of the sum total of the pan angles and the tilt angles that have been controlled with respect to the sub camera 400 from the initial state in the RAM 102, and use this value as the current optical axis direction.

The CPU 101 calculates the amounts of changes in the pan angle and the tilt angle of the sub camera 400 in the foregoing manner, and stores them into the RAM 102. Note that in a case where there are a plurality of sub cameras 400, the CPU 101 calculates the amounts of changes in the pan angle and the tilt angle for each sub camera.

The amounts of changes in the pan angle and the tilt angle may be an angular velocity for causing the sub camera 400 to turn to the direction of the tracking target subject. For example, the CPU 101 obtains the current pan angle and tilt angle from the sub camera 400 via the communication network 700. Then, the CPU 101 obtains a pan angular velocity proportional to the difference between the pan angle θ that has been read out from the RAM 102 and the current pan angle. Also, the CPU 101 obtains a tilt angular velocity proportional to the difference between the tilt angle ρ that has been read out from the RAM 102 and the current tilt angle. The CPU 101 stores the angular velocities calculated in the foregoing manner into the RAM 102.

Note that the amounts of changes in the pan angle and the tilt angle may be calculated using the video of the sub camera 400 instead of the video of the overhead camera 300. In this case, the CPU 101 may calculate the amount of change in the pan angle from the difference in the horizontal direction between the current optical axis direction and the direction of the tracking target subject in the coordinate system of the sub camera 400, and calculate the amount of change in the tilt angle from the difference in the vertical direction therebetween. Furthermore, in the image capture system, changing of the capture direction for tracking and capturing the tracking target subject may be performed only in one of the pan direction and the tilt direction; in such an image capture system, only the amount of change in one of the pan angle and the tilt angle may be calculated.

Next, the operations of the CPU 101 as the zoom value calculation unit 125 will be described. The CPU 101 as the zoom value calculation unit 125 cyclically obtains information MAIN_ZOOM indicating the angle of view of the main camera 500, and stores the same into the RAM 102. Then, in a case where the information MAIN_ZOOM has been changed, the CPU 101 calculates a zoom value Z_VALUE for the sub camera 400 in accordance with the content of control CAMERA_ROLE corresponding to the role set on the sub camera 400.

Note that the CPU 101 can determine a zoom operation of the main camera 500 and the phase thereof by, for example, detecting a change in the angle of view of the video of the main camera 500. For example, the change in the angle of view may be detected from the sizes of the subject regions, a temporal change in an interval therebetween, and the like.

Figure 13:
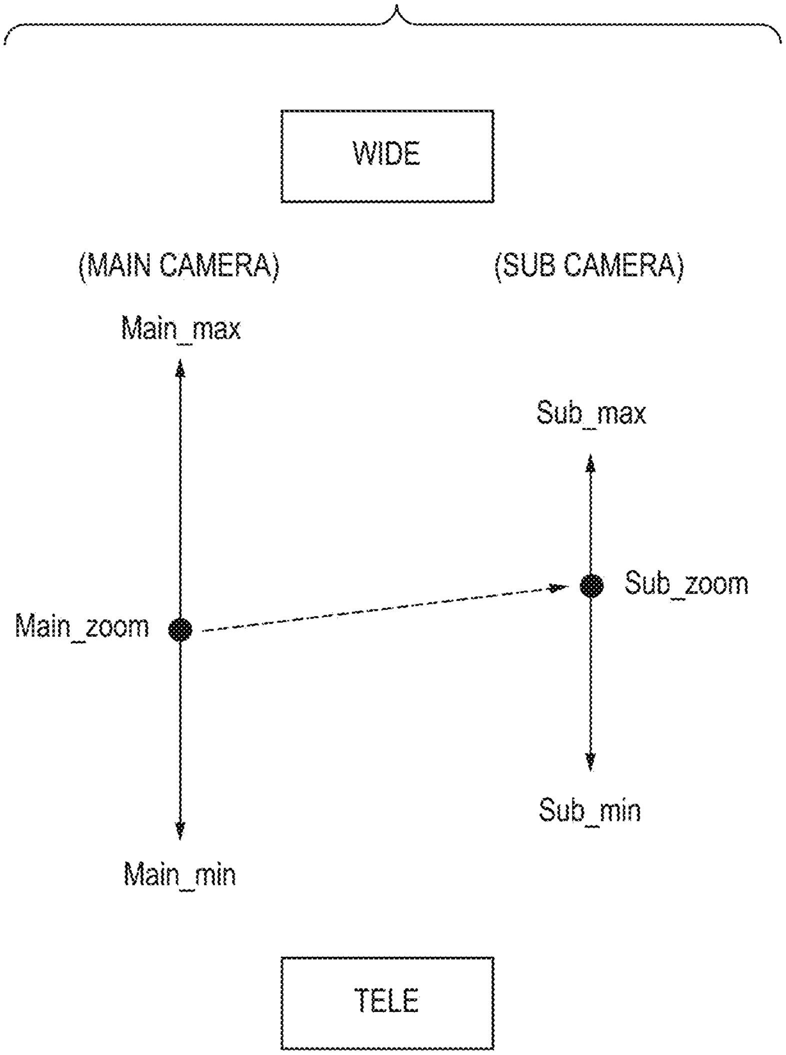
FIG. 13 is a diagram showing an example of mapping of zoom values of a main camera and a sub camera according to the first embodiment.

FIG. 13 shows an example of mapping of zoom values of the main camera and the sub camera. It is assumed here that the main camera 500 and the sub camera 400 optically change the angle of view (their image capture optical systems have a zoom function). However, a similar function may be realized by way of digital zooming that uses the image processing units 406 and 506.

Note that a zoom value is a parameter that has a value corresponding to the angle of view; in the present embodiment, the zoom value decreases as the angle of view decreases (narrows), and the zoom value on the telephoto side is smaller than the zoom value on the wide-angle side. It is assumed that the sub camera 400 and the main camera 500 can control their image capture optical systems to have an angle of view corresponding to a zoom value by transmitting thereto a command designating the zoom value. That is to say, a zoom value is information related to the angle of view, and is information indicating a zoom state. A zoom value may be, for example, a focal length (mm) of the image capture optical system corresponding to a full-size 35-mm image sensor; in this case, the zoom value on the telephoto side is larger than the zoom value on the wide-angle side.

In FIG. 13, the zoom value MAIN_ZOOM of the main camera 500 is in a range of main_min to main_max. Meanwhile, the sub camera 400 has a zoom range of sub_min to sub_max. Main_min and sub_min are respectively zoom values corresponding to the telephoto ends of the main camera 500 and the sub camera 400, whereas main_max and sub_max are respectively zoom values corresponding to the wide-angle ends of the main camera 500 and the sub camera 400. FIG. 13 shows an example in which the range of the zoom value of the main camera 500 is wider than the range of the zoom value of the sub camera 400, both on the telephoto end and on the wide-angle end.

In a case where the zoom value SUB_ZOOM of the sub camera 400 is controlled in phase with the zoom value MAIN_ZOOM of the main camera 500, the CPU 101 calculates SUB_ZOOM corresponding to the current MAIN_ZOOM using the following formula 5.

$$\text{SUB\_ZOOM} = \frac{\text{MAIN\_ZOOM} - \text{main\_min}}{\text{main\_max} - \text{main\_min}} \times (\text{sub\_max} - \text{sub\_min}) \quad \text{(formula 5)}$$

On the other hand, in a case where the zoom value SUB_ZOOM of the sub camera 400 is controlled to be antiphase relative to the zoom value MAIN_ZOOM of the main camera 500, SUB_ZOOM corresponding to the current MAIN_ZOOM is calculated using the following formula 6. Specifically, the CPU 101 calculates SUB_ZOOM corresponding to the current MAIN_ZOOM by assigning SUB_ZOOM calculated from formula 5 in the right side of the following formula 6.

$$\text{SUB\_ZOOM} = \text{sub\_max} - (\text{SUB\_ZOOM} - \text{sub\_min}) \quad \text{(formula 6)}$$

In a case where the main camera 500 performs digital zooming and controls the angle of view by way of cropping, the CPU 101 can determine the zoom value SUB_ZOOM of the sub camera 400 in accordance with the size of the range cropped by the main camera 500. Specifically, the CPU 101 sets the zoom value SUB_ZOOM so that it decreases (achieves a higher magnification factor) as the size of the range to be cropped by the main camera 500 decreases, and sets the zoom value SUB_ZOOM so that it increases (achieves a lower magnification factor) as the size increases.

Furthermore, the content of zoom control associated with a role of the sub camera 400 is not limited to control that is in-phase or antiphase relative to the main camera 500. For example, a zoom operation that is independent of a change in the angle of view of the main camera 500 may be associated with a role. For example, an auto-zoom operation that maintains the tracking target subject at a constant size may be associated with a role. Furthermore, the angle of view of the sub camera 400 may be fixed at a specific angle of view. Various zoom controls can be performed with respect to the sub camera 400 by adding roles associated with the foregoing zoom controls to the contents of control corresponding to the respective roles shown in FIG. 4, or by changing the contents of zoom control corresponding to the roles shown in FIG. 4.

Returning to FIG. 6A, in step S207, the CPU 101 reads out the amounts of changes in the pan and tilt angles and the zoom value, which have been calculated in step S206, from the RAM 102. Then, the CPU 101 generates a control command PT_VALUE for instructing the sub camera 400 to make changes equivalent to these amounts of changes to the pan angle and the tilt angle. Also, the CPU 101 generates a control command Z_VALUE for instructing the sub camera 400 to make a change equivalent to the zoom value to the angle of view. It is assumed that the format of the control commands has been determined in advance. The CPU 101 stores the generated control commands PT_VALUE and Z_VALUE into the RAM 102. Note that step S207 may be skipped in a case where the control commands need not be generated, such as a case where the tracking target subject is stationary and a case where the angle of view of the main camera 500 has not changed.

Then, the CPU 101 reads out the control commands PT_VALUE and Z_VALUE from the RAM 102, and transmits them to the communication network 700 via the network I/F 105. The sub camera 400 receives the control commands PT_VALUE and Z_VALUE via the network I/F 405.

The CPU 101 executes the processing from step S201 with respect to the next frame image in the video of the overhead camera 300. Note that the processing shown in FIG. 6A need not necessary be executed on a per-frame basis.

(Operations of Overhead Camera 300)

Figure 6B:
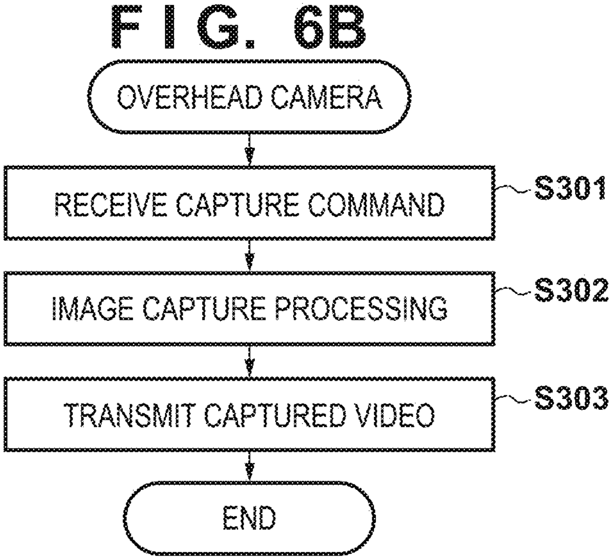

Next, the operations of the overhead camera 300 will be described with reference to FIG. 6B. The operations described below are realized by the CPU 301 executing the program.

When the power of the overhead camera 300 has been turned on, the CPU 301 initializes each functional block, and then a capture standby state begins. In the capture standby state, the CPU 301 may start moving image capture processing for live-view display, and output image data for display generated by the image processing unit 306 to the capture control apparatus 100 via the network I/F 305.

In the capture standby state, the CPU 301 waits for reception of a control command via the network I/F 305. Upon receiving a control command, the CPU 301 executes operations corresponding to the control command. The following describes operations for a case where a capture command has been received as the control command from the capture control apparatus 100.

In step S301, the CPU 301 receives a capture command from the capture control apparatus 100 via the network I/F 305.

Note that in the capture command, such capture parameters as the frame rate and the resolution may be designated. Furthermore, the capture command may include settings related to processing applied by the image processing unit 306.

In step S302, in response to the reception of the capture command, the CPU 301 starts processing for capturing moving images to be supplied to the capture control apparatus 100. In this moving image capture processing, moving images that have higher image quality than those of the moving image capture processing for live-view display are captured. For example, the captured moving images are higher in at least one of the moving image resolution and the capture frame rate than moving images for live-view display. The image processing unit 306 applies processing to the images based on settings for the moving images to be supplied to the capture control apparatus 100. The image processing unit 306 sequentially stores the generated pieces of moving image data into the RAM 302.

In step S303, the CPU 101 reads out the pieces of moving image data from the RAM 302, and transmits them to the capture control apparatus 100 via the network I/F 305. From then on, processing from the image capture to the supply of pieces of moving image data is continued until a control command for stopping the image capture is received.

(Operations of Main Camera 500)

Figure 6C:
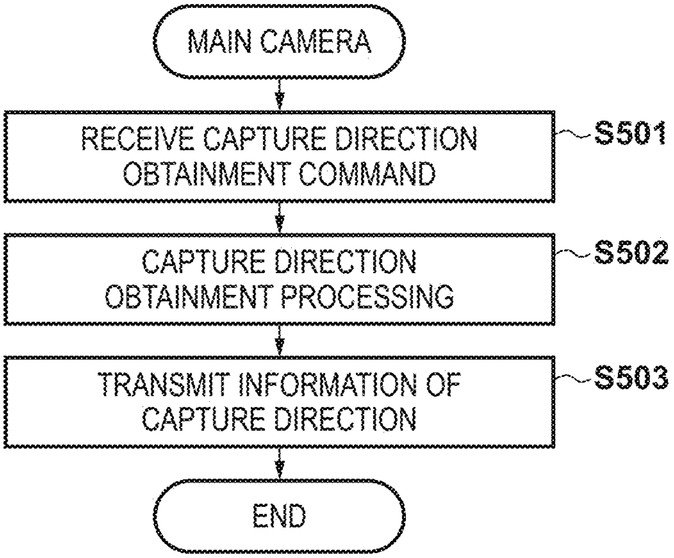

Next, the operations of the main camera 500 will be described with reference to FIG. 6C. The operations described below are realized by the CPU 501 executing the program.

When the power of the main camera 500 has been turned on, the CPU 501 initializes each functional block, and then starts processing for capturing moving images to the supplied to the capture control apparatus 100. The image processing unit 506 applies, to analog image signals obtained from an image sensor 507, processing based on settings for the moving images to be supplied to the capture control apparatus 100. The image processing unit 506 sequentially stores the generated pieces of moving image data into the RAM 502. The CPU 501 reads out the pieces of moving image data from the RAM 502, and supplies them to the capture control apparatus 100 via the network I/F 505.

While supplying the pieces of moving image data to the capture control apparatus 100, the CPU 501 waits for reception of a control command via the network I/F 305. Upon receiving a control command, the CPU 501 executes operations corresponding to the control command. The following describes operations for a case where a capture direction obtainment command has been received. Note that in a case where a pan/tilt control command PT_VALUE or a zoom control command Z_VALUE has been received, the CPU 501 drives the driving unit 509 in accordance with the command.

In step S501, the CPU 501 receives a capture direction obtainment command via the network I/F 505. The CPU 501 stores the received capture direction obtainment command into the RAM 502.

In step S502, in response to the reception of the capture direction obtainment command, the CPU 501 obtains the current pan angle and tilt angle from the driving unit 509 via the driving I/F 508, and stores them into the RAM 502.

In step S503, the CPU 501 reads out the current pan angle and tilt angle from the RAM 502, and transmits them as information ANGLE of the capture direction to the capture control apparatus 100 via the network I/F 305.

(Operations of Sub Camera 400)

Figure 6D:
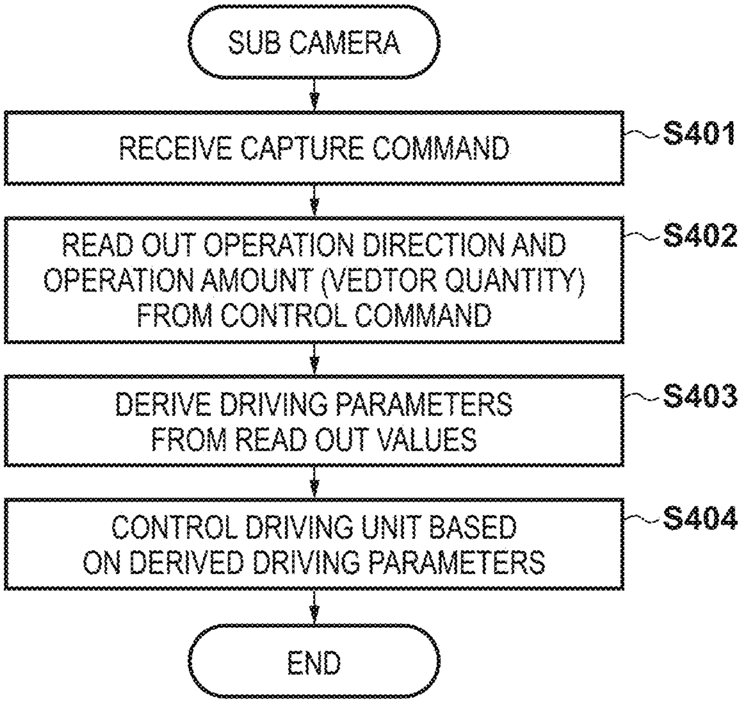

Next, the operations of the sub camera 400 will be described with reference to FIG. 6D. The operations described below are realized by the CPU 401 executing the program.

When the power of the sub camera 400 has been turned on, the CPU 401 initializes each functional block, and then starts processing for capturing moving images to the supplied to the capture control apparatus 100. The image processing unit 406 applies, to analog image signals obtained from an image sensor 407, processing based on settings for the moving images to be supplied to the capture control apparatus 100. The image processing unit 406 sequentially stores the generated pieces of moving image data into the RAM 402. The CPU 401 reads out the pieces of moving image data from the RAM 402, and supplies them to the capture control apparatus 100 via the network I/F 405.

While supplying the pieces of moving image data to the capture control apparatus 100, the CPU 401 waits for reception of a control command via the network I/F 305. Upon receiving a control command, the CPU 401 executes operations corresponding to the control command. The following describes operations for a case where a pan/tilt control command PT_VALUE and a zoom control command Z_VALUE have been received from the capture control apparatus 100.

In step S401, the CPU 401 receives at least one of the pan/tilt control command PT_VALUE and the zoom control command Z_VALUE from the capture control apparatus 100 via the network I/F 405. The CPU 401 stores the received control command into the RAM 402.

In step S402, the CPU 401 reads out an operation direction and a corresponding operation amount (vector quantity) from the control command stored in the RAM 402, and stores them into the RAM 402. Here, in the case of the pan/tilt control command PT_VALUE, the operation direction is the direction(s) of pan and/or tilt, and the operation amount is a target angle. Meanwhile, in the case of the zoom control command Z_VALUE, the operation amount is a zoom value, and it is not necessary to read out and store the operation direction because the operation direction can be specified from the zoom value.

In step S403, the CPU 401 generates driving parameters for the driving unit 409 based on the operation direction and the operation amount that have been read out in step S402. The CPU 401 may obtain, for example, driving parameters corresponding to the combination of the operation direction and the operation amount with use of a table that has been held in the ROM 403 in advance. Note that in a case where the operation amount is provided in the form of a target value (a target angle or zoom value), the CPU 401 obtains driving parameters from the difference from the current value.

In step S404, the CPU 401 drives the driving unit 409 via the driving I/F 408 based on the driving parameters obtained in step S404 S403. Accordingly, the driving unit 409 changes the capture direction of the sub camera 400 to the operation direction and the angle designated by the pan/tilt control command PT_VALUE. Also, the driving unit 409 changes the angle of view of the image capture optical system to the zoom value designated by the zoom control command Z_VALUE.

Figure 14:
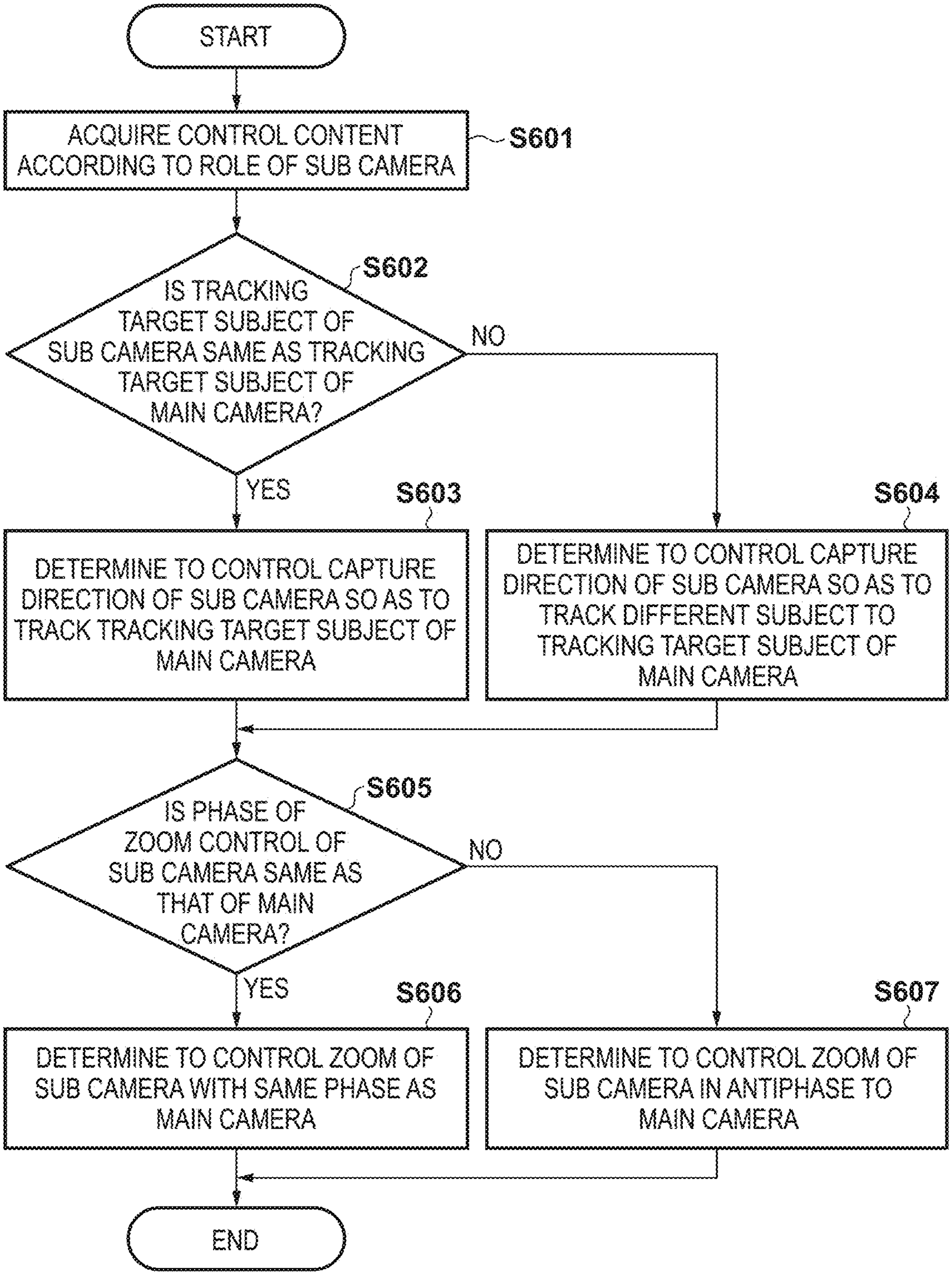
FIG. 14 is a flowchart related to processing for determining the content of control corresponding to a role of the sub camera according to the first embodiment.

Next, the operations of the capture control apparatus 100 to control the capture direction (pan and tilt) and the angle of view (zoom value) of the sub camera in accordance with a role set on the sub camera 400 will be described in more detail using a flowchart shown in FIG. 14. The operations shown in the flowchart of FIG. 14 are executed as a part of the operations of steps S205 to S207 in FIG. 6A.

In step S601, which is equivalent to step S205, the CPU 101 reads out the content of control CAMERA_ROLE that has been stored into the RAM 102 in step S103 of FIG. 5.

Steps S602 to S607 are executed in, for example, step S206.

In step S602, the CPU 101 determines whether the provision related to the tracking target subject of the sub camera 400, which is included in the content of control CAMERA_ROLE, indicates the tracking target subject (subject of interest) of the main camera 500. For example, in a case where the provision related to the tracking target subject of the sub camera 400 has a value indicating "same as main", the CPU 101 determines that the provision related to the tracking target subject of the sub camera 400 indicates the tracking target subject of the main camera 500, and executes step S603. On the other hand, in a case where the provision related to the tracking target subject of the sub camera 400 has a value indicating "different from main (left side)", the CPU 101 determines that the provision related to the tracking target subject of the sub camera 400 does not indicate the tracking target subject of the main camera 500, and executes step S604.

In step S603, the CPU 101 determines to control the capture direction of the sub camera 400 so as to track the tracking target subject (subject of interest) of the main camera 500.

In step S604, the CPU 101 determines to control the capture direction of the sub camera 400 so as to track a subject located on the left side among subjects other than the subject of interest of the main camera 500.

In step S605, the CPU 101 determines whether the provision related to zoom control on the sub camera 400, which is included in the content of control CAMER-A_ROLE, indicates control that is in phase with the main camera 500. For example, in a case where the provision related to zoom control on the sub camera 400 has a value indicating "in phase with main", the CPU 101 determines that the provision related to zoom control on the sub camera 400 indicates control that is in phase with the main camera 500, and executes step S606. On the other hand, in a case where the provision related to zoom control on the sub camera 400 has a value indicating "antiphase relative to main", the CPU 101 determines that the provision related to zoom control on the sub camera 400 does not indicate control that is in phase with the main camera 500, and executes step S607.

In step S606, the CPU 101 determines to control the zoom value (angle of view) of the sub camera 400 in phase with the change in the zoom value of the main camera 500.

In step S607, the CPU 101 determines to control the zoom value (angle of view) of the sub camera 400 so that the control is antiphase relative to the change in the zoom value of the main camera 500.

Figure 15:
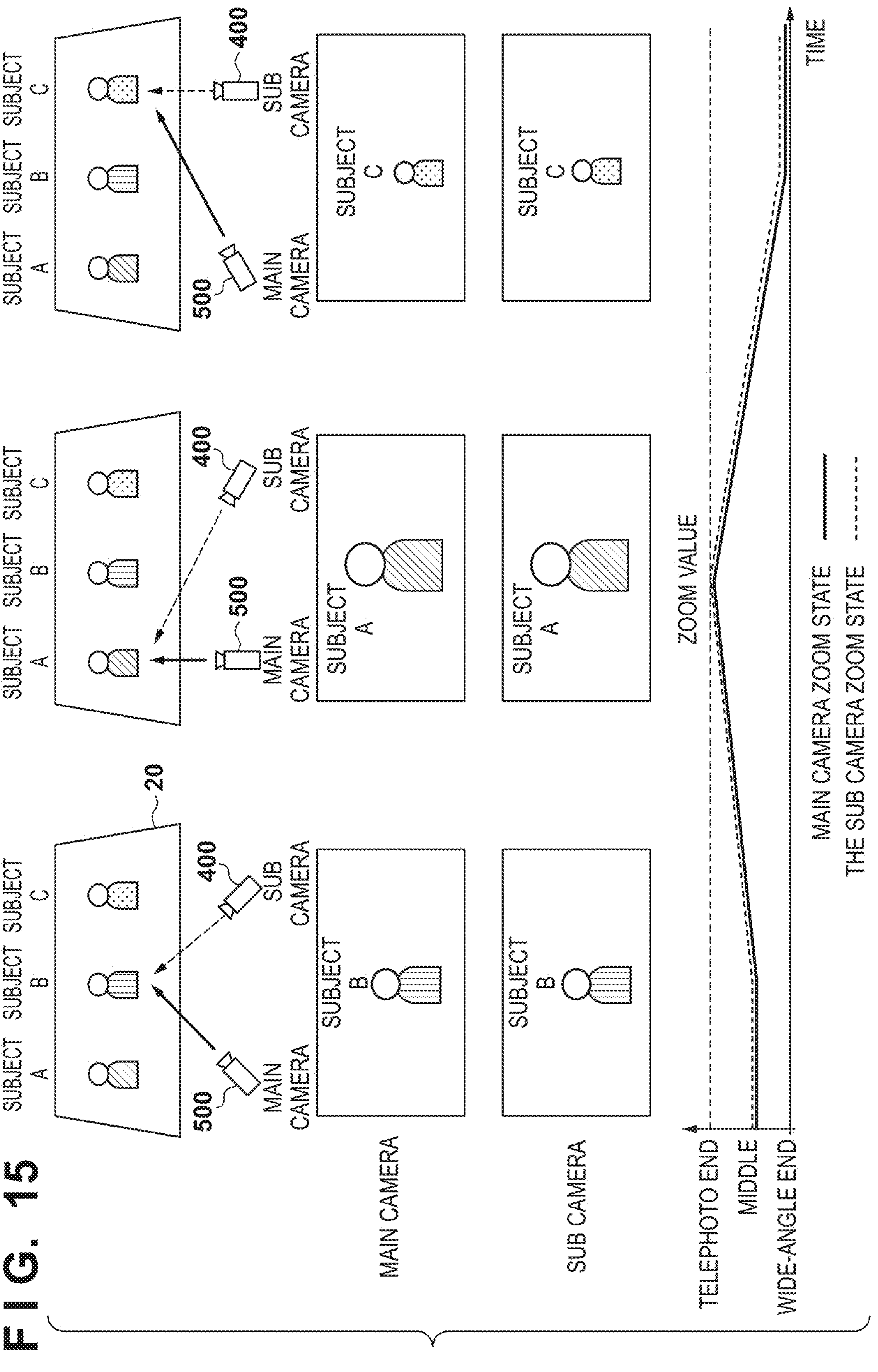
FIG. 15 is a schematic diagram of control corresponding to a role of the sub camera according to the first embodiment.

Using FIG. 15, the following describes an example of control on the sub camera for a case where the role set on the sub camera 400 is "main follow". FIG. 15 schematically shows how the capture control apparatus 100 controls the capture direction and the angle of view of the sub camera 400 in a case where the subject of interest and the angle of view of the main camera 500 change with the passage of time during image capture. In the figure, time elapses from left to the rightward direction. Note that in FIG. 15, a zoom state is indicated in three stages: "telephoto end", "middle", and "wide-angle end". This is because the range of the zoom value can differ between the sub camera and the main camera as shown in FIG. 13. "Telephoto end" corresponds to a state where the camera has zoomed in to the telephoto end, "wide-angle end" corresponds to a state where the camera has zoomed out to the wide-angle end, and "middle" corresponds to a zoom state that is in the middle between "telephoto end" and "wide-angle end"; however, an actual zoom value can differ between the sub camera and the main camera. For example, when the zoom state is "telephoto end", the zoom value of the main camera is main_min, and the zoom value of the sub camera is sub_min.

At first, the subject of interest (tracking target subject) of the main camera 500 is the subject B, and the zoom state thereof is "middle". Therefore, the CPU 101 determines the subject B as the tracking target subject of the sub camera 400, and controls the capture direction so that the sub camera 400 tracks the subject B. Also, the CPU 101 controls the zoom state of the sub camera 400 to be "middle".

Thereafter, the subject of interest of the main camera 500 is changed from the subject B to the subject A, and the zoom state thereof is changed to "telephoto end". In response, the CPU 101 changes the tracking target subject of the sub camera 400 from the subject B to the subject A, and controls the capture direction so that the sub camera 400 tracks the subject A. Furthermore, the CPU 101 controls the zoom state of the sub camera 400 to be "telephoto end".

Thereafter, the subject of interest of the main camera 500 is changed from the subject A to the subject C, and the zoom state thereof is changed to "wide-angle end". In response, the CPU 101 changes the tracking target subject of the sub camera 400 from the subject A to the subject C, and controls the capture direction so that the sub camera 400 tracks the subject C. Furthermore, the CPU 101 controls the zoom state of the sub camera 400 to be "wide-angle end".

As described above, in a case where the role of the sub camera 400 is "main follow", the CPU 101 automatically changes the tracking target subject and the zoom value of the sub camera 400 so as to follow the changes in the subject of interest and the angle of view (zoom value) of the main camera 500. Note that although the extent of the change in the zoom state of the sub camera 400 is controlled to be the same as the extent of the change in the zoom state of the main camera 500 in the example shown in FIG. 15, the actual zoom values may be different as long as the directions of the changes in the zoom values are in phase with each other. For example, when the zoom state of the main camera 500 is the telephoto end, the zoom state of the sub camera 400 may not be the telephoto end. Whether to bring the zoom value of the sub camera 400 in consistency with the zoom value of the main camera 500 may be settable using the role setting information.

Next, an example of control on the sub camera for a case where the role set on the sub camera 400 is "assist counter" will be described using FIG. 16, which is similar to FIG. 15.

At first, the subject of interest (tracking target subject) of the main camera 500 is the subject B, and the zoom state thereof is "telephoto end". Therefore, the CPU 101 determines the left-side subject A, among the subjects A and C other than the subject B, as the tracking target subject of the sub camera 400, and controls the capture direction so that the sub camera 400 tracks the subject A. Furthermore, the CPU 101 controls the zoom state of the sub camera 400 to be "wide-angle end", which is antiphase relative to the main camera 500.

Thereafter, the subject of interest of the main camera 500 is changed from the subject B to the subject A, and the zoom state thereof is changed to "middle". In response, the CPU 101 changes the tracking target subject of the sub camera 400 to the left-side subject B, among the subjects B and C other than the subject A, and controls the capture direction so that the sub camera 400 tracks the subject B. Also, as the zoom state of the main camera 500 has changed from "telephoto end" to "middle", the CPU 101 controls the zoom state of the sub camera 400 to change from "wide-angle end" to "middle" (antiphase).

Thereafter, the subject of interest of the main camera 500 is changed from the subject A to the subject C, and the zoom state thereof is changed to "wide-angle end". In response, the CPU 101 changes the tracking target subject of the sub camera 400 to the left-side subject A, among the subjects A and B other than the subject C, and controls the capture direction so that the sub camera 400 tracks the subject A. Also, as the zoom state of the main camera 500 has changed from "middle" to "wide-angle end", the CPU 101 controls the zoom state of the sub camera 400 to change from "middle" to "telephoto end" (antiphase).

As described above, in a case where the role of the sub camera 400 is "assist counter", the CPU 101 automatically changes the tracking target subject of the sub camera 400 to one of subjects other than the subject of interest of the main camera 500 in response to a change in the subject of interest of the main camera 500. Furthermore, the CPU 101 automatically changes the zoom value of the sub camera 400 in the direction opposite to the change in the angle of view (zoom value) of the main camera 500.

Figure 16:
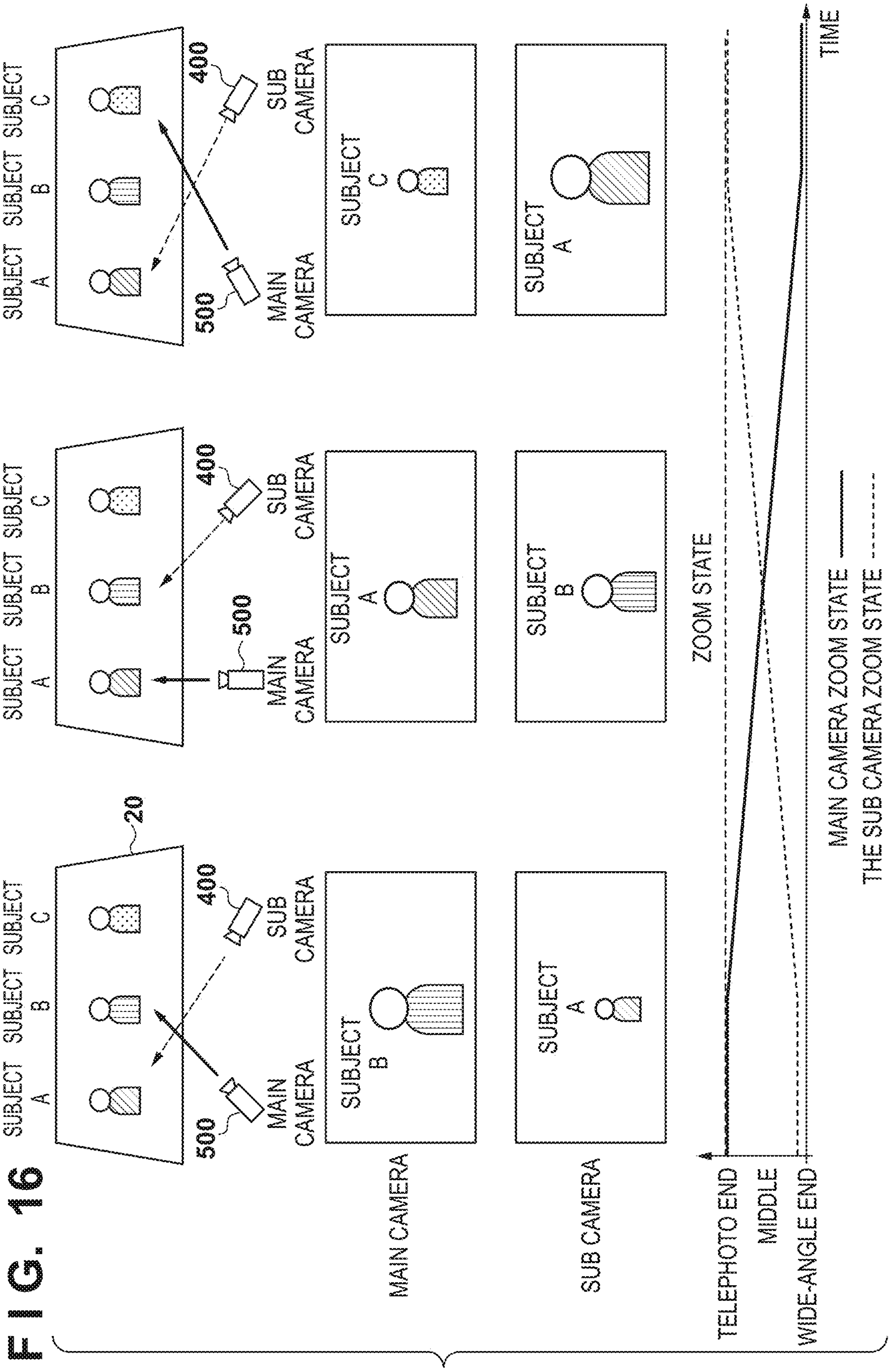
FIG. 16 is a schematic diagram of control corresponding to a role of the sub camera according to the first embodiment.

Note that although the zoom state of the sub camera 400 is controlled in such a manner that the extent of the change therein is the same as the extent of the change in the zoom state of the main camera 500 in the example shown in FIG. 16, the amounts of changes in the zoom values may be different as long as the directions of the changes in the zoom values are antiphase. For example, when the zoom state of the main camera 500 is the telephoto end, the zoom state of the sub camera 400 may not be the wide-angle end. The extent of the change in the zoom state of the sub camera 400 relative to the extent of the change in the zoom state of the main camera 500 may be settable using the role setting information.

Modification Example

The above has described an example in which the tracking target subject and the zoom value of the sub camera 400 are automatically controlled based on the subject of interest and the zoom value of the main camera 500. In the above-described example, automatic control is performed so that the sub camera tracks a single subject; however, it is also possible to perform automatic control so that the sub camera tracks a plurality of subjects inside the captured area.

Figure 17:
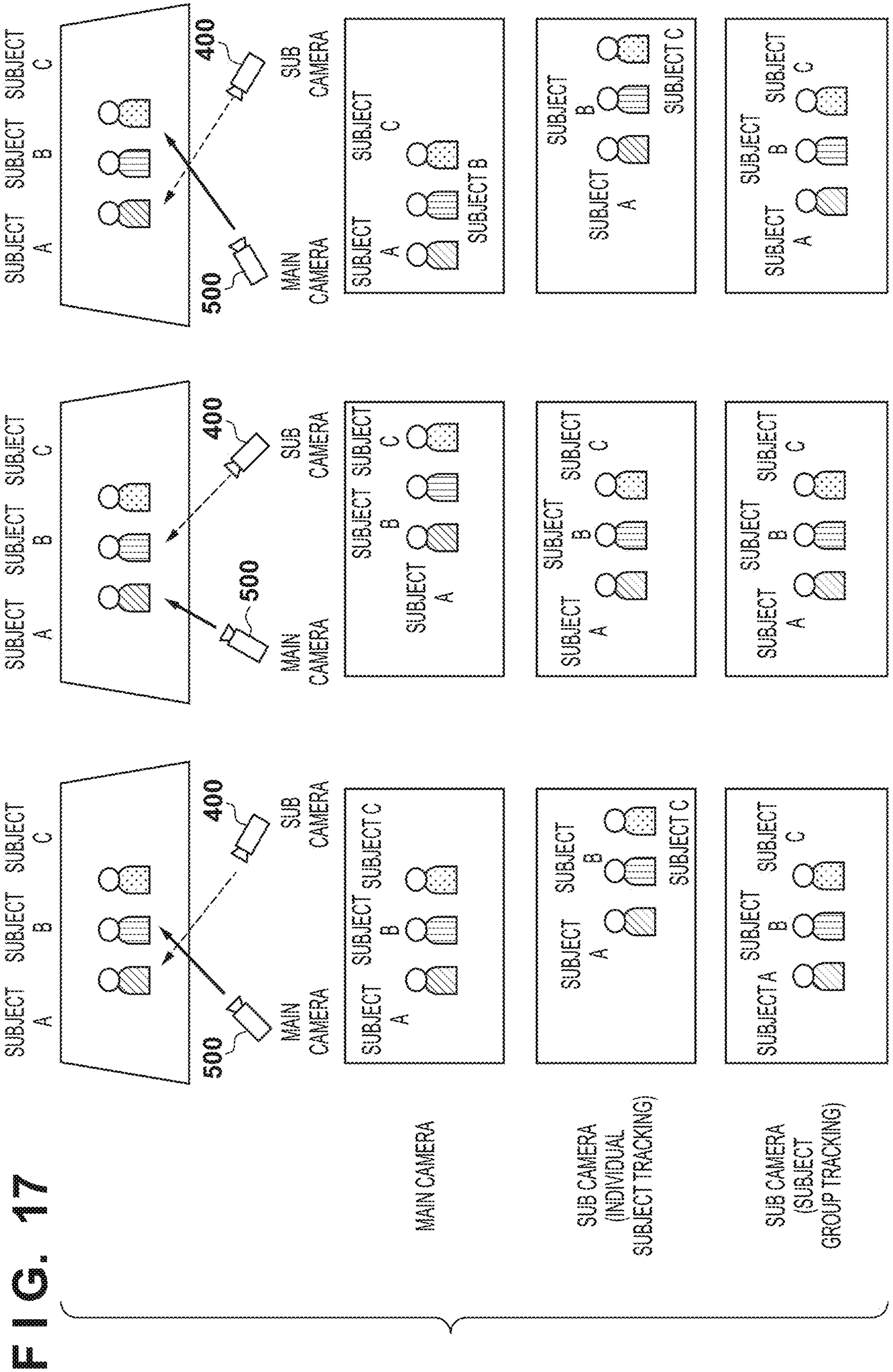
FIG. 17 is a schematic diagram of an operation of tracking a plurality of subjects according to a modification example of the first embodiment.

Using FIG. 17, a description is now given of an example of control for a case where the sub camera 400 tracks a single subject and a case where it tracks a plurality of subjects when the role set on the sub camera 400 is "assist follow". For ease of understanding and explanation, the following describes a case where the angle of view of the main camera 500 does not change, and only control on tracking target subjects is executed. Also, it is assumed that the angle of view of the sub camera 400 allows all of the subjects inside the captured area 20 to be captured at all times irrespective of the capture direction. Note that the capture directions of the sub camera 400 shown in the topmost level of FIG. 17 indicate the capture directions for a case where a single subject is tracked.

Similarly to FIG. 16, at first, the subject of interest (tracking target subject) of the main camera 500 is the subject B. Therefore, the CPU 101 determines the left-side subject A, among the subjects A and C other than the subject B, as the tracking target subject of the sub camera 400, and controls the capture direction so that the sub camera 400 tracks the subject A. If the capture direction is controlled so that the tracking target subject is positioned at the center of the screen, the subjects A to C in the video of the sub camera 400 are crowded together on the right, and thus poorly balanced, as shown in the second level from the bottom. In view of this, in a case where the video of the sub camera 400 includes a plurality of subjects including the tracking target subject, the capture direction can be controlled so as to track these plurality of subjects. For example, the CPU 101 can control the capture direction so as to track the mass center of the positions of the plurality of subjects A to C included in the video of the sub camera 400. As a result, the sub camera 400 captures a video shown in the lowermost level.

According to the example shown in FIG. 17, no matter which one of the subjects A to C is tracked by the sub camera 400, all of the subjects A to C are captured, and thus the capture direction of the sub camera 400 is substantially constant even if the subject of interest of the main camera 500 has changed.

Second Modification Example

Furthermore, after the tracking target subject of the sub camera 400 has been determined, the CPU 101 may control the sub camera 400 to focus on the tracking target subject. Although the CPU 401 basically controls the focusing distance on a continual basis in the sub camera 400 so as to focus on the designated tracking target subject, the capture control apparatus 100 can set an AF frame of the sub camera 400 at the position of the tracking target subject. This allows the sub camera 400 to focus on the tracking target subject quickly and reliably. Note that setting the AF frame when the pan speed has become slow (equal to or smaller than a threshold) has a possibility of reducing the time period required to achieve focus because there is a high possibility that the tracking target is positioned at the center of the screen.

Third Modification Example

Furthermore, the sub camera 400 can be controlled without using the overhead camera 300. In this case, the capture direction of the sub camera 400 can be determines from the positions of placement of the main camera 500 and the sub camera 400, and the capture direction of the main camera 500 (the direction in which the main camera 500 is facing the tracking target subject). The main camera 500 executes the subject detection processing, and the CPU 101 obtains and uses the results of the subject detection processing; as a result, the sub camera 400 can be controlled. For example, the CPU 101 obtains images of subject regions from the main camera 500 as the results of the subject detection processing. Then, the CPU 101 can control the sub camera 400 so as to execute subject tracking processing that uses the obtained images as templates. Alternatively, the CPU 101 may use the obtained images as templates, and control the sub camera 400 so as to track a subject region that has a low degree of correlation with the templates.

Fourth Modification Example

Although the capture control apparatus 100 and the role control apparatus 600 have been described as apparatuses that are independent from the main camera 500, it is also possible to embed the functions of the capture control apparatus 100 and the role control apparatus 600 in the main camera 500. In this case, the video of the overhead camera 300 is supplied to the main camera 500. This configuration can reduce the number of devices necessary to realize the multi-camera image capture system.

As described above, according to the present embodiment, when the operations of the sub camera are automatically controlled based on the state and the video of the main camera, automatic control corresponding to the role set on the sub camera is executed. Therefore, the capture control apparatus of the present embodiment can realize automatic capture control with a higher degree of freedom while saving labor.

Second Embodiment

Next, a second embodiment of the present disclosure will be described. In the present embodiment, a tracking target subject of a sub camera is determined on in consideration of a video of the sub camera, in addition to information based on a state or a video of a main camera and a role set on the sub camera.

Figures 18, 19:
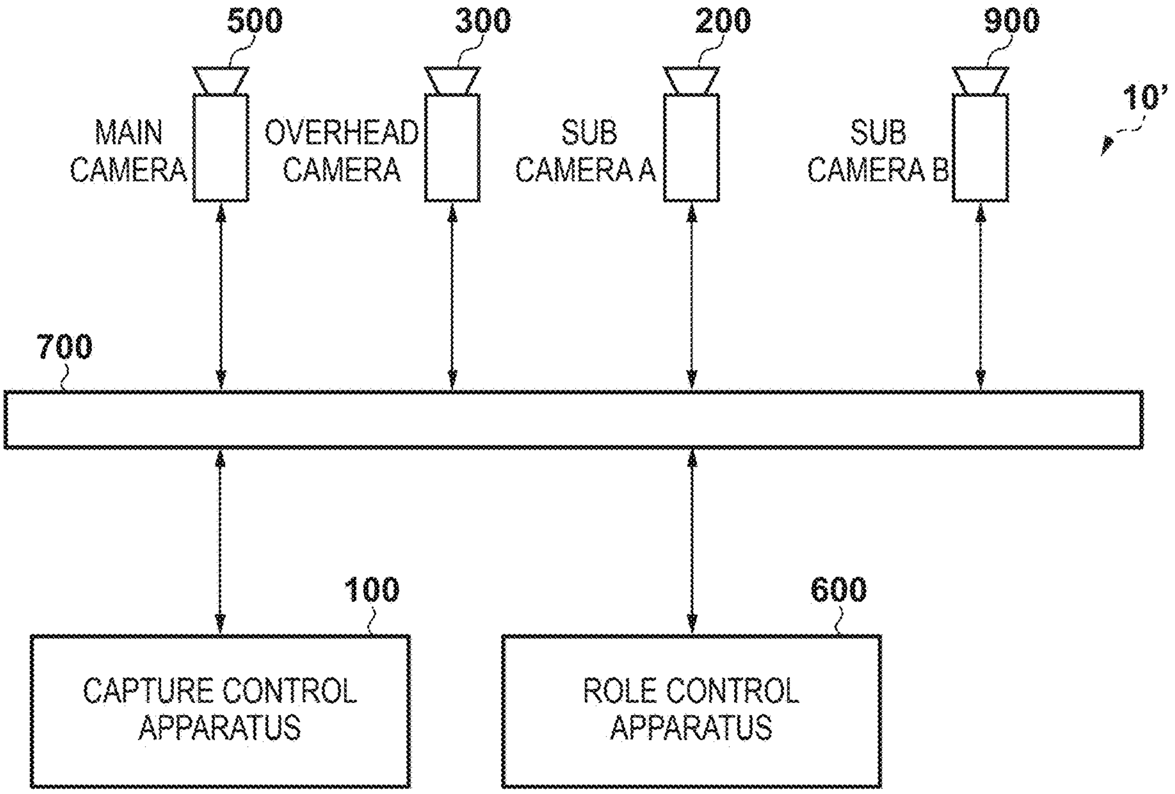
FIG. 18 is a schematic diagram of an image capture system according to a second embodiment.
FIG. 19 is a diagram showing examples of roles and contents of control that can be set in the second embodiment.

FIG. 18 is a schematic diagram showing an exemplary configuration of an image capture system 10' according to the present embodiment. In FIG. 18, the constituents that are similar to those of the image capture system 10 according to the first embodiment are given the same reference numerals as FIG. 1, and a description thereof is omitted. The image capture system 10' according to the present embodiment includes two sub cameras, namely a sub camera A 200 and a sub camera B 900. As the functional configurations of the sub camera A 200 and the sub camera B 900 are similar to those of the sub camera 400 described in the first embodiment, a description thereof is omitted.

In the present embodiment, the role control apparatus 600 sets roles on the capture control apparatus 100, and the role setting information includes contents of control that are different among different sub cameras. The CPU 101 controls operations for each sub camera in accordance with the roles set on the capture control apparatus 100.

FIG. 19 is a diagram showing an example of the role setting information according to the present embodiment. Here, only the role "assist follow", and the corresponding contents of control on the respective sub cameras, are shown as an example. However, the types of roles that can be set on the capture control apparatus 100 and the contents of control corresponding to the types of roles are not limited to the example shown in FIG. 19.

Here, the provision related to the sub camera A 200 indicates that a left-side subject among subjects different from a tracking target subject of the main camera is set as a tracking target subject, and control is performed to focus on the tracking target subject. Meanwhile, the provision related to the sub camera B 900 indicates that a right-side subject among subjects different from a tracking target subject of the main camera is set as a tracking target subject, and control is performed to focus on the tracking target subject. Here, as it is known in advance that the total number of subjects is three, the provisions indicate the one on the left or the right among two people; however, the provisions may simply indicate the left side or the right side. Note that although the provisions related to zoom control may be provided similarly to the first embodiment, zoom control is omitted to simplify the description.

The role setting information shown in FIG. 19 is stored in advance in the ROM 103 of the capture control apparatus 100. Alternatively, the role setting information may be supplied from the role control apparatus 600 to the capture control apparatus 100, and stored into the RAM 102 by the CPU 101.

Figure 20A:
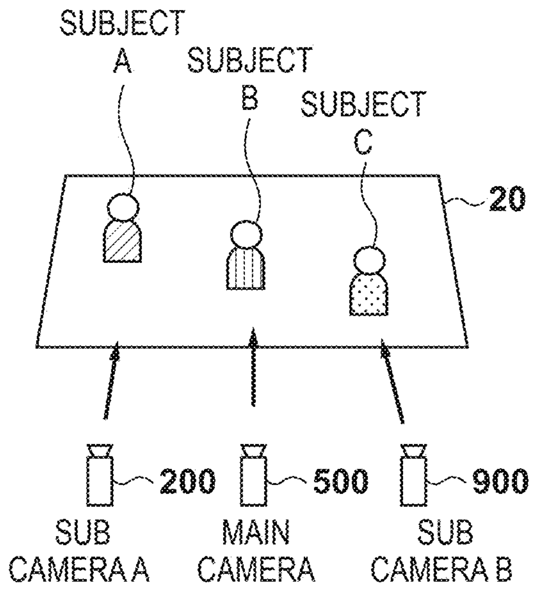
FIGS. 20A and 20B are schematic diagrams showing an example of control related to tracking target subjects of sub cameras according to the second embodiment.
Figure 20B:
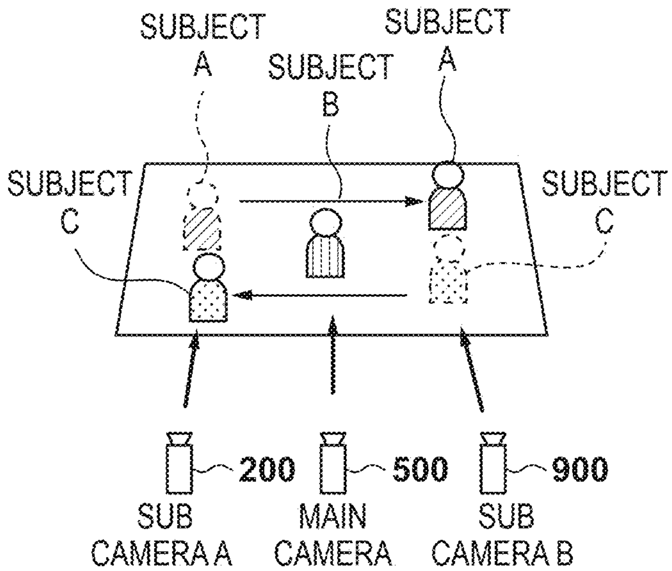

Using FIGS. 20A and 20B, the following describes how the capture control apparatus 100 controls the sub camera A 200 and the sub camera B 900 based on the role setting information.

FIG. 20A shows a positional relationship among the captured area 20, the main camera 500, the sub camera A 200, and the sub camera B 900 at the start of image capture, and subjects A to C inside the captured area 20. FIG. 20B shows a state where, after the image capture has been started, the subject A has moved from the left to the right of the subject B, and the subject C has moved from the right to the left of the subject B.

At the stage of FIG. 20A, the CPU 101 of the capture control apparatus 100 controls the operations of the sub camera A 200 and the sub camera B 900 based on the role setting information shown in FIG. 19. That is to say, the CPU 101 determines the left-side subject A among the subjects A and C other than the subject of interest of the main camera 500 (the subject B) as the tracking target subject of the sub camera A 200, and determines the right-side subject C thereamong as the tracking target subject of the sub camera B 900.

The CPU 101 controls the capture directions of the sub camera A 200 and the sub camera B 900 so as to track the determined tracking target subjects. Also, the CPU 101 controls the sub camera A 200 and the sub camera B 900 so as to focus on the determined tracking target subjects.

In the state of FIG. 20B, the subject A tracked by the sub camera A 200 does not satisfy the condition "the left-side subject" (other than the subject of interest of the main camera 500). Therefore, the CPU 101 changes the tracking target subject of the sub camera A 200 to the left-side subject C among the subjects A and C other than the subject of interest of the main camera 500 (the subject B). Similarly, the subject C tracked by the sub camera B 900 does not satisfy the condition "right-side subject", either. Therefore, the CPU 101 changes the tracking target subject of the sub camera B 900 to the right-side subject A among the subjects A and C other than the subject of interest of the main camera 500 (the subject B). Also, the CPU 101 controls the sub camera A 200 and the sub camera B 900 so as to focus on the determined tracking target subjects.

In a case where a subject has moved significantly as shown in FIG. 20B, the possibility that another subject is present in front thereof increases, and thus the tracking target subject becomes likely to be hidden. By configuring the settings so that a sub camera placed on the left side relative to the captured area 20 tracks a subject located on the left side, a provision can be provided that effectively changes a tracking target subject in a case where the tracking target subject has moved significantly in the rightward direction. The same goes for a sub camera placed on the right side relative to the captured area 20.

The present embodiment can provide provisions related to contents of control that cause different sub cameras to track different subjects under the same role. Therefore, the capture control apparatus 100 of the present embodiment can automatically control the sub cameras to capture videos in which various subjects are tracked based on information obtained from the state and the video of the main camera.

Modification Example

In the present embodiment, the capture directions of the sub cameras for tracking specific subjects are estimated by transforming the coordinates of positions of subject regions detected from the video of the overhead camera 300. However, a similar estimation may be made based on the videos of the sub camera A 200 and the sub camera B 900. In this case, although the processing load of the capture control apparatus 100 increases, the coordinate transformation is unnecessary; as a result, the accuracy of control on the capture directions of the sub cameras can be increased.

Second Modification Example

Furthermore, the pan/tilt values for controlling the sub camera A 200 and the sub camera B 900 in the present embodiment are calculated so as to perform automatic tracking of tracking targets. However, automatic tracking is not indispensable. For example, the role setting information may include provisions for controlling the pan values of the sub camera A 200 and the sub camera B 900 in accordance with the zoom value of the main camera 500.

As one example, in a case where the zoom state of the main camera 500 is "wide-angle end", the sub camera A 200 can be controlled to be pointed in the obliquely leftward direction of a 45-degree angle, and the sub camera B 900 can be controlled to be pointed in the obliquely rightward direction of a 45-degree angle. On the other hand, in a case where the zoom state of the main camera 500 is "telephoto end", the sub camera A 200 and the sub camera B 900 can both be controlled to be pointed in the central direction of a 0-degree angle.

By performing the foregoing control, the capture directions of a plurality of sub cameras can be controlled in synchronization with the zoom state of the main camera 500, and a dramatic effect can be enhanced. For example, when the main camera 500 is zooming in on a specific subject, the sub camera A 200 and the sub camera B 900 can change their capture directions while zooming in on the same subject in coordination. By performing the foregoing control, in a staging where the images of a plurality of cameras are displayed on a plurality of monitors, a plurality of captured images obtained by controlling the plurality of cameras in synchronization with one another can be viewed simultaneously. Furthermore, by automatically controlling the discrete cameras on which the same role has been set, the variations among temporal changes in the angles of view of the cameras decrease, the changes in the angles of view share a strong sense of unity, and a dramatic effect that further increases realistic sensations can be expected compared to a case where each individual camera is manually operated.

Third Modification Example

Furthermore, although the present embodiment has been described using an example in which the main camera 500 is controlled as a master and the sub camera A 200 and the sub camera B 900 are controlled as slaves, the master-slave relationship between the main camera 500 and the sub camera A 200 may be dynamically changeable. For example, among the main camera 500, the sub camera A 200, and the sub camera B 900, a camera that is capturing a main video may be controlled as a master, and other cameras may be controlled as slaves. In this case, it is sufficient for the capture control apparatus 100 to obtain information indicating which one of the videos of the cameras has been selected as a main video from an external apparatus, such as a switcher that selects a video, or distinguish such information based on a tally signal. Similar control may be executed also when the selection has been made as a video related to viewing by the audience or recording, such as a video for recording, in addition to when the selection has been made as a main video.

Furthermore, the master-slave relationship among the cameras may be switched when the sub camera A 200 or the sub camera B 900 has been manually operated. In this case, when the user has manually operated one of the sub cameras, control on other cameras is started with this sub camera acting as a master, thereby offering convenience.

Third Embodiment

Next, a third embodiment of the present disclosure will be described. An image capture system according to the present embodiment provides a user with information that indicates the capture states of a main camera and a sub camera in a visualized manner; as a result, the convenience of the image capture system is improved.

Figure 21:
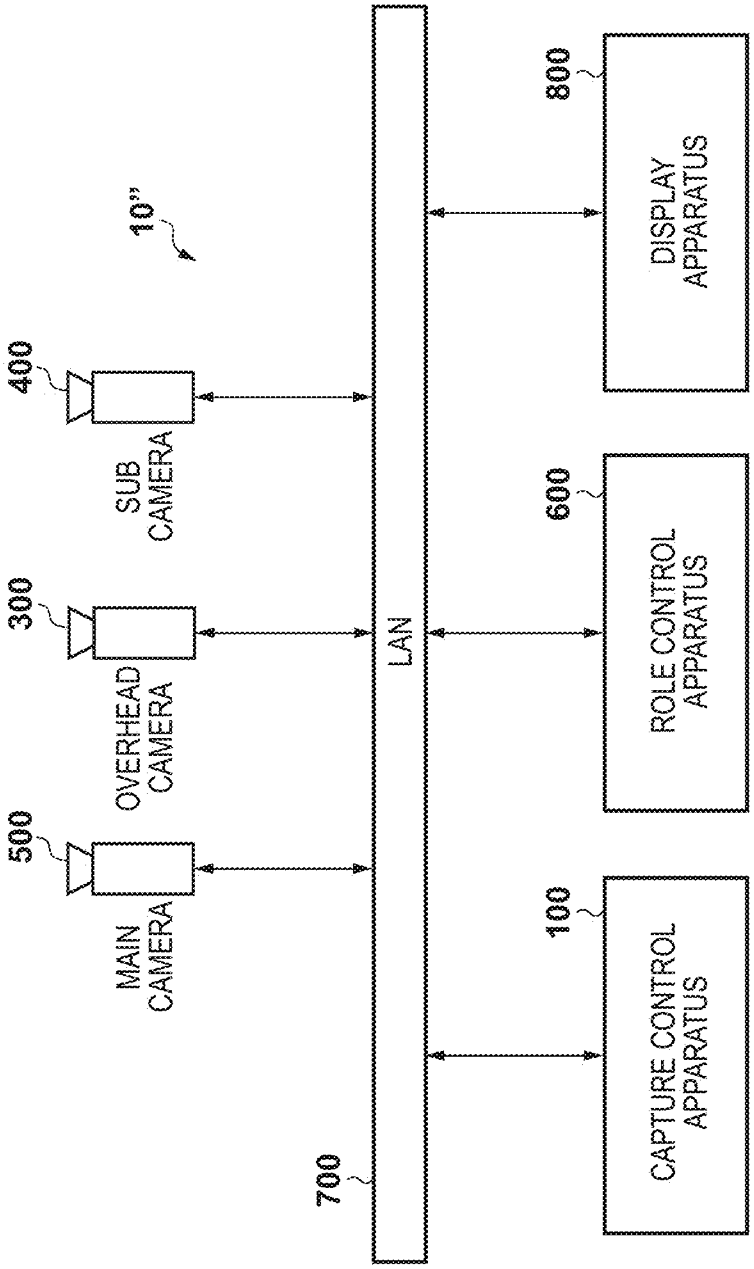
FIG. 21 is a schematic diagram of an image capture system according to a third embodiment.

FIG. 21 is a schematic diagram showing an exemplary configuration of an image capture system 10" according to the third embodiment of the present disclosure. Here, an exemplary configuration based on the image capture system 10 according to the first embodiment is illustrated for ease of explanation and understanding. The description of the first embodiment is applied to constituents other than a display apparatus 800.

The display apparatus 800 presents information of the sub camera 400 and the main camera 500, particularly information related to subjects that are currently captured, to a user who uses the image capture system. Although the display apparatus 800 is described as a constituent separate from the capture control apparatus 100 and the role control apparatus 600 in the present embodiment, the functions of the display apparatus 800 may be implemented by at least one of the capture control apparatus 100 and the role control apparatus 600.

The display apparatus 800 displays capture information generated by the capture control apparatus 100. In a case where the capture control apparatus 100 generates image data for display, the display apparatus 800 may be an apparatus that exclusively provides a display function, such as a liquid crystal display, or may be any electronic device that can function as an external display apparatus for the capture control apparatus 100. Also, the display apparatus 800 may be any electronic device (an information processing apparatus, a smartphone, a tablet terminal, or the like) that can communicate with the capture control apparatus 100 and has a display function. The display apparatus 800 may generate and display image data for display based on the capture information obtained from the capture control apparatus 100.

Figure 22:
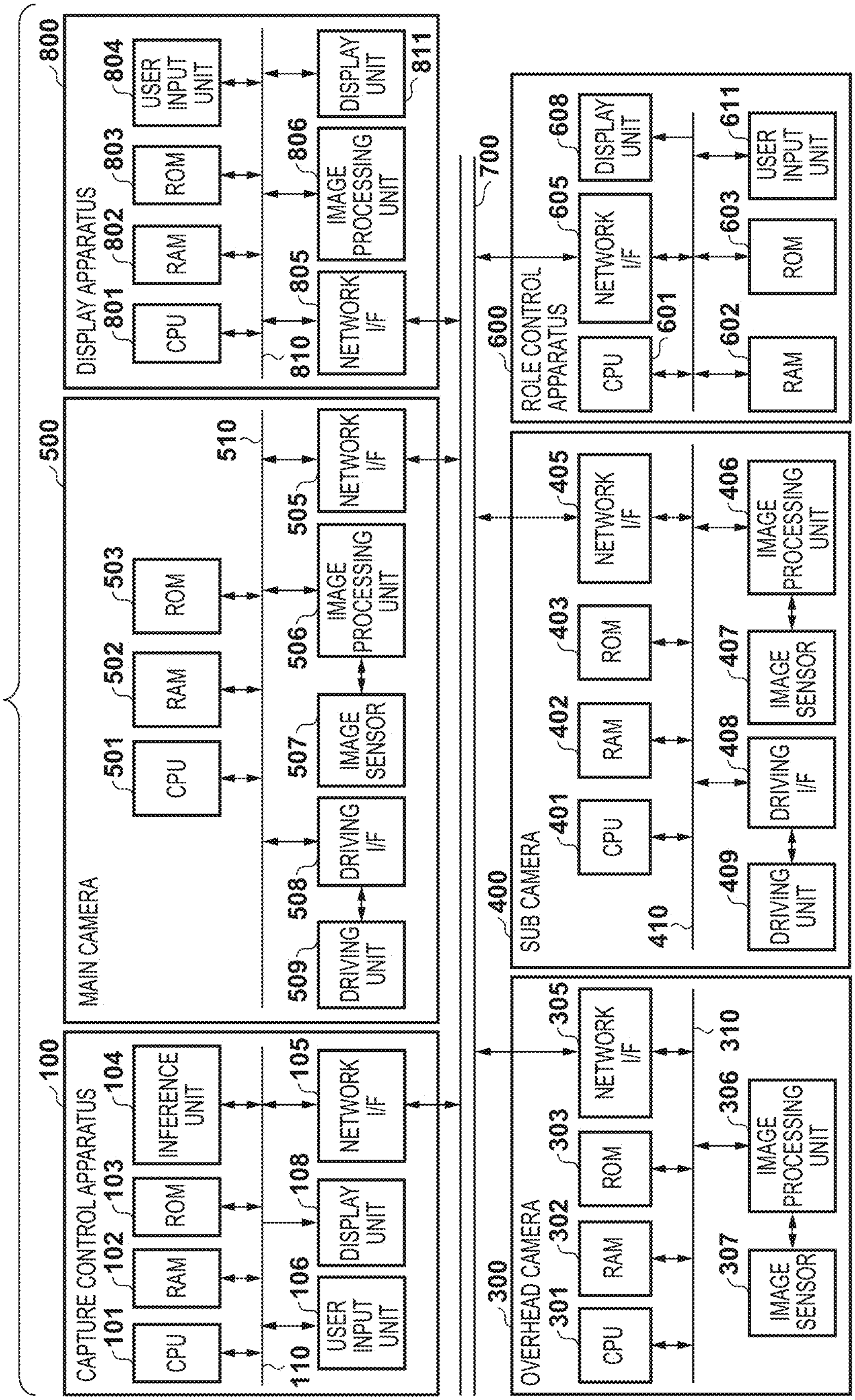
FIG. 22 is a block diagram showing an exemplary functional configuration of each apparatus in the image capture system according to the third embodiment.

FIG. 22 is a block diagram showing an exemplary functional configuration of each device that composes the image capture system 10" shown in FIG. 21. The description provided in the first embodiment in relation to FIG. 2 is applied to devices other than the display apparatus 800.

The display apparatus 800 is configured in such a manner that a CPU 801, a RAM 802, a ROM 803, a user input unit 804, a network interface (I/F) 805, an image processing unit 806, and a display unit 811 are connected to one another via an internal bus 810.

The CPU 801 is a microprocessor capable of executing programmed instructions. The CPU 801 realizes the functions of the display apparatus 800, which will be described later, by reading a program stored in the ROM 803 into the RAM 802 and executing the program, for example. The CPU 801 can realize the functions of the display apparatus 800 by, for example, executing a display control application that operates on base software (OS).

The RAM 802 is used to load the program executed by the CPU 801, and to temporarily store data that is processed by the CPU 801, data that is currently processed, and so forth. Also, a part of the RAM 802 may be used as a video memory for the display unit 811.

The ROM 803 is a nonvolatile rewritable memory, and stores the program (OS and application) executed by the CPU 801, user data, and so forth.

The user input unit 804 is an input device, such as a mouse, a keyboard, and a touch panel. The display apparatus 800 accepts a user instruction via the user input unit 804.

The network I/F 805 is an interface for connecting the display apparatus 800 to the communication network 700. The display apparatus 800 (CPU 801) can communicate with external apparatuses in the communication network 700, such as the capture control apparatus 100, via the network I/F 805. Note that the display apparatus 800 may communicate with external apparatuses via another non-illustrated communication interface (a USB, Bluetooth®, or the like). The CPU 801 obtains information (e.g., network addresses) necessary for communication with apparatuses in the communication network 700 at an arbitrary timing, and stores the information into the RAM 802.

The image processing unit 806 generates image data to be displayed on the display unit 811 (image data for display) from image data obtained via the network I/F 805. Also, the image processing unit 806 generates image data for display based on the capture states of the main camera 500 and the sub camera 400 received from the capture control apparatus 100. The image processing unit 806 stores the generated image data for display into the RAM 802. Note that the image processing unit 806 may reduce the amount of data by applying compression processing to the image data for display as necessary. Also, the image processing unit 806 may apply an image quality adjustment, such as color correction, exposure control, and sharpness correction, to the received image data.

The display unit 811 is a display apparatus, such as a liquid crystal display (LCD). The display unit 811 displays a GUI screen provided by the OS, the display control application, or the like. The display unit 811 also displays images indicating the capture states of the main camera 500 and the sub camera 400.

The operations of the display apparatus 800 are controlled by a user instruction issued via the user input unit 804, and an instruction (command) received from the capture control apparatus 100 or the like via the network I/F 805.

Figure 23:
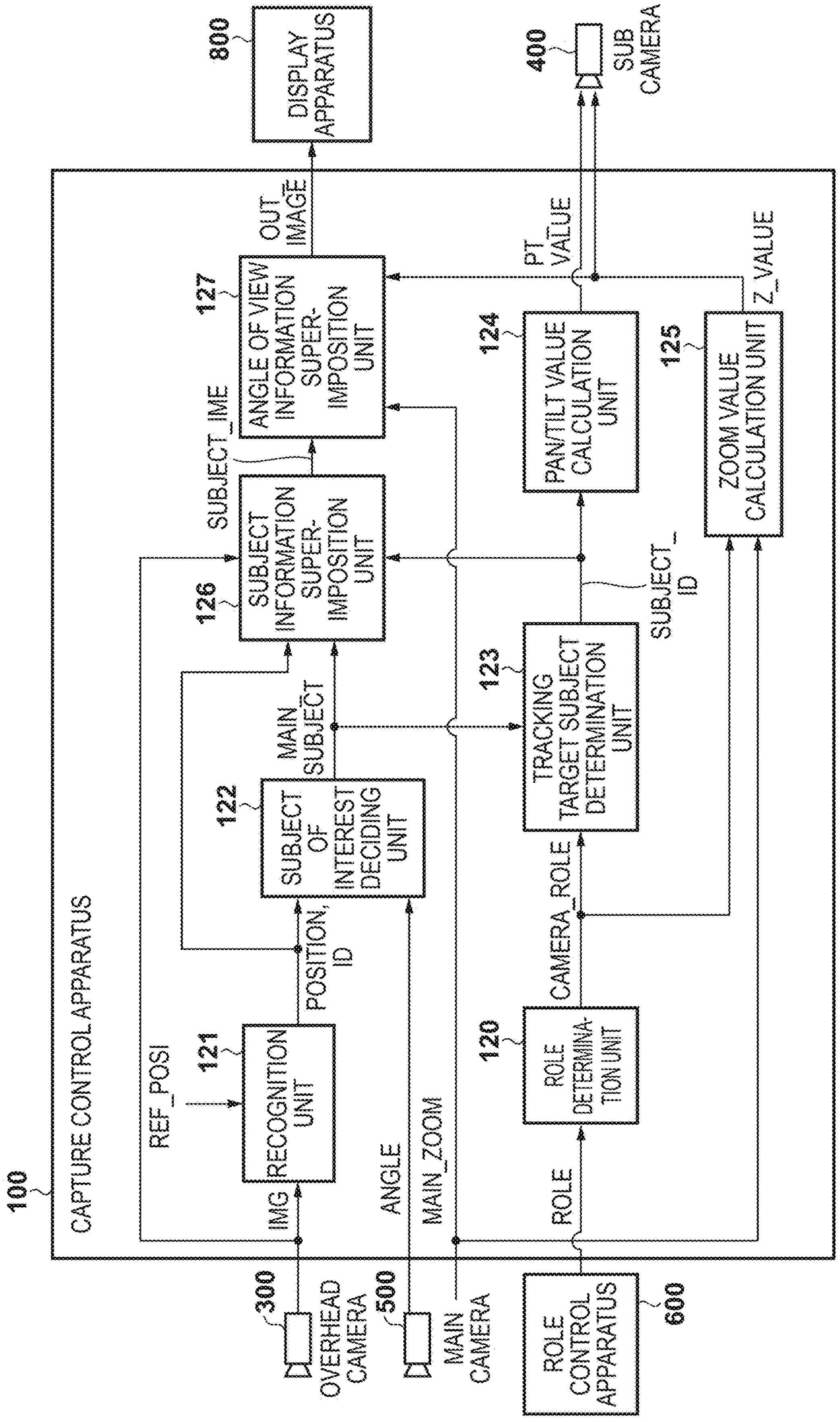
FIG. 23 is a diagram showing a capture control apparatus according to the third embodiment, with a focus on main operations and flows of signals.

Similarly to FIG. 3, FIG. 23 is a diagram showing a processing sequence that is performed when the capture control apparatus 100 controls the operations of the sub camera 400, with a focus on main operations and flows of signals. The functional blocks shown inside the capture control apparatus 100 schematically indicate the main operations, and are equivalent to the main functions provided by the capture control application. Each functional block of FIG. 23 is realized by a combination of the CPU 101, which executes the capture control application, and one or more of the functional blocks of the capture control apparatus 100 shown in FIG. 22.

As can be understood from comparison between FIG. 23 and FIG. 3, the capture control apparatus 100 of the present embodiment has the functions of a subject information superimposition unit 126 and an angle of view information superimposition unit 127. The subject information superimposition unit 126 superimposes information indicating the respective tracking target subjects of the main camera 500 and the sub camera 400 on a video obtained from the overhead camera 300. Also, the angle of view information superimposition unit 127 superimposes information indicating the respective angles of view of the main camera 500 and the sub camera 400 on the video obtained from the overhead camera 300. The operations of the subject information superimposition unit 126 and the angle of view information superimposition unit 127 can be switched between an enabled state and a disabled state, both individually and dynamically. Note that it is permissible to adopt a configuration in which a display control apparatus different from the capture control apparatus 100 includes the subject information superimposition unit 126 and the angle of view information superimposition unit 127, the display control apparatus receives various types of information from the capture control apparatus 100, and images generated by the display control apparatus are output to the display apparatus 800.

Figure 24A:
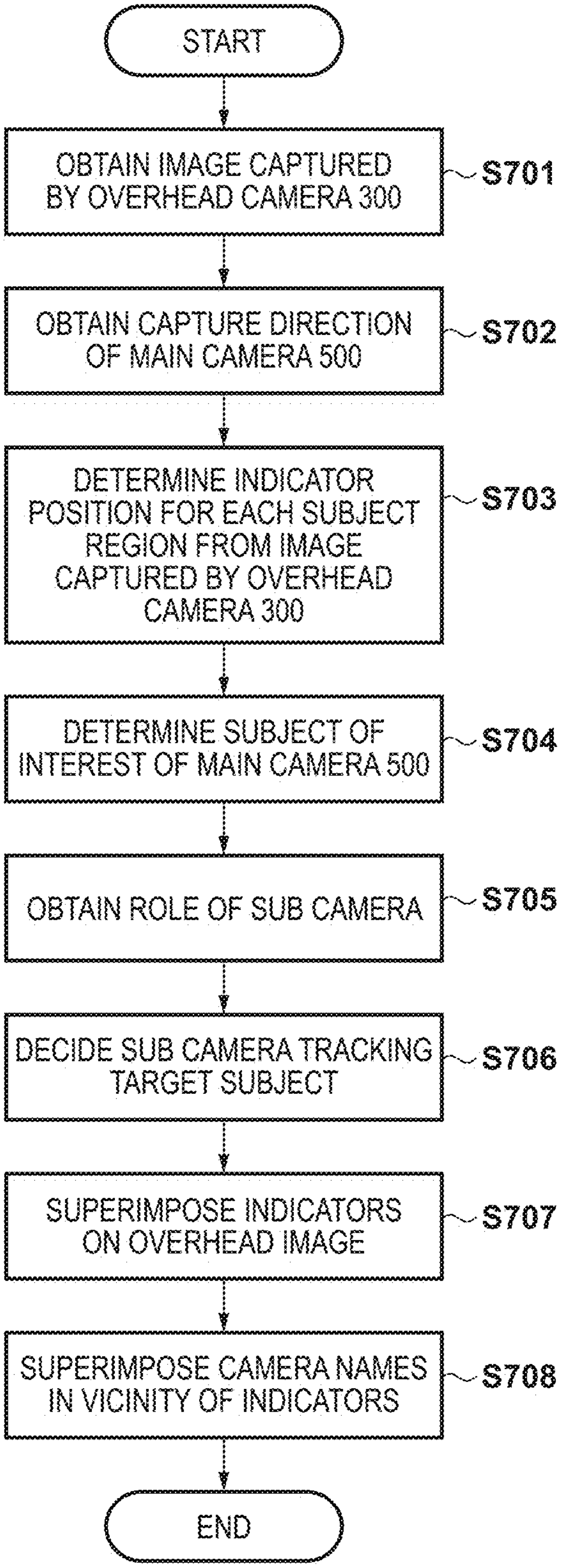
FIGS. 24A and 24B are flowcharts related to the operations of the capture control apparatus according to the third embodiment.
Figure 24B:
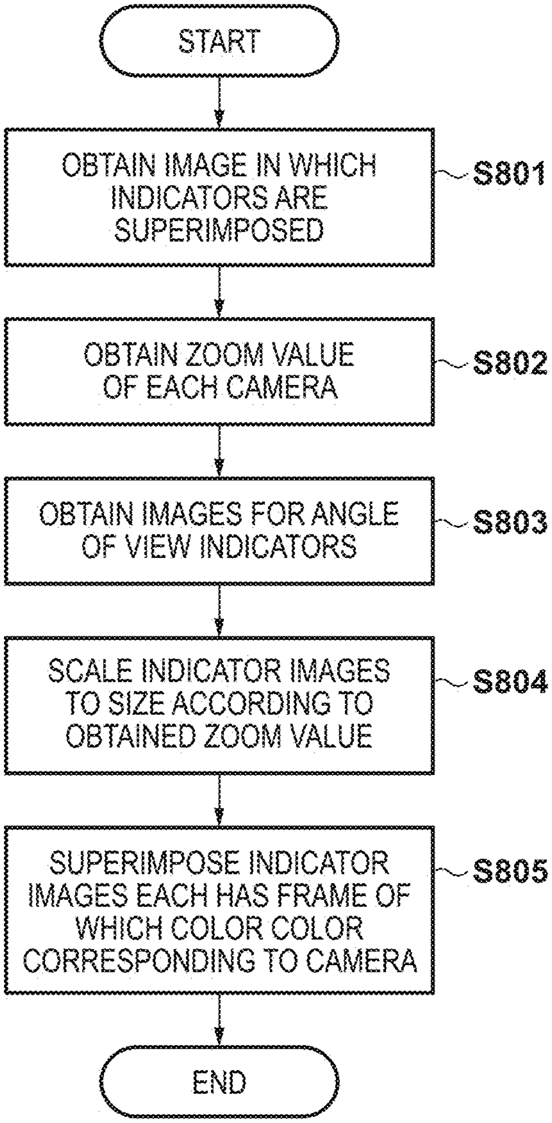

Using the flowcharts shown in FIGS. 24A and 24B, the following describes the operations for generating an image on which capture information of the main camera 500 and the sub camera 400 has been superimposed, among the operations executed by the capture control apparatus 100 in the present embodiment. The capture control apparatus 100 can execute the operations described below in parallel with other operations, such as automatic capture control operations of the sub camera.

FIG. 24A is a flowchart related to the operations for superimposing information of tracking target subjects, which is one type of capture information, on the video from the overhead camera 300. Also, FIG. 24B is a flowchart related to the operations for superimposing information of angles of view, which is one type of capture information, on the video from the overhead camera 300. It is assumed here that the subject information superimposition unit 126 superimposes information of the tracking target subjects, and the angle of view information superimposition unit 127 further superimposes information of the angles of view. Note that the order of superimposition may be reversed, and whether the superimposition is to be performed can be controlled on an individual basis.

Furthermore, the operations shown in the flowcharts of FIG. 24A and FIG. 24B are executed once every predetermined number of frames of the video of the overhead camera 300 (e.g., once every frame, once every two frames, or the like).

In step S701, the CPU 101 starts to obtain video signals (image data) IMG from the overhead camera 300, similarly to step S201.

In step S702, the CPU 101 obtains information ANGLE indicating a capture direction from the main camera 500, similarly to step S202.

In step S703, the CPU 101 (recognition unit 121) reads out image data IMG corresponding to one frame from the RAM 102, and executes the subject detection processing, which has been described in relation to step S203. Then, for each subject region, the CPU 101 determines the position at which an indicator is to be superimposed based on the results of subject detection. It is assumed here that the frames indicating the rectangular regions in which the subject regions are inscribed, which are shown in FIG. 8A, are superimposed as the indicators. Therefore, for each subject region, the CPU 101 determines rectangle information DETECT_POSI as information for specifying the position of the rectangular region based on the output from the inference unit 104, and stores the same into the RAM 102.

Rectangle information DETECT_POSI may specifically be the image coordinates of vertices of a rectangular region that are opposing corners. It is assumed here that the image coordinates are the coordinates of the upper-left vertex (xul, yul) and the coordinates of the lower-right vertex (xdr, ydr).

In step S704, the CPU 101 as the subject of interest determination unit 122 determines a subject of interest of the main camera 500, similarly to step S204. The CPU 101 stores the identification information ID[n] corresponding to the subject region that has been determined as the subject of interest of the main camera 500 as identification information MAIN_SUBJECT of the subject of interest into the RAM 102.

In step S705, the CPU 101 as the tracking target subject determination unit 123 obtains content of control CAMERA_ROLE corresponding to the role set on the sub camera 400, similarly to step S205. Specifically, the CPU 101 reads out the content of control CAMERA_ROLE from the RAM 102.

In step S706, the CPU 101 as the tracking target subject determination unit 123 determines a subject to be tracked and captured by the sub camera 400 in accordance with the content of control CAMERA_ROLE, similarly to step S206. The CPU 101 determines a tracking target subject of the sub camera 400 in accordance with the provision related to the tracking target subject included in the content of control CAMERA_ROLE (FIG. 4).

In a case where the indicators indicating the capturing angles of view for the tracking target subjects are displayed without displaying the indicators of the subject regions and the indicators of the tracking target subjects of the respective cameras, the CPU 101 executes step S801 of FIG. 24B after processing of step S706 has ended.

In step S707, the CPU 101 as the subject information superimposition unit 126 reads out image data IMG that is the same as the image data IMG read out from the RAM 102 in step S703. Then, the CPU 101 reads out the rectangle information pieces DETECT_POSI of the respective subject regions from the RAM 102, and superimposes indicators based on the rectangle information pieces DETECT_POSI on the image data IMG. As stated earlier, an indicator is a rectangular frame whose vertices at opposing corners have the coordinates indicated by rectangle information DETECT_POSI. Furthermore, here, the color of the rectangular frame differs among different subject regions. The CPU 101 (subject information superimposition unit 126) stores the image data on which the indicators of the subject regions have been superimposed into the RAM 102.

Figures 25, 26:
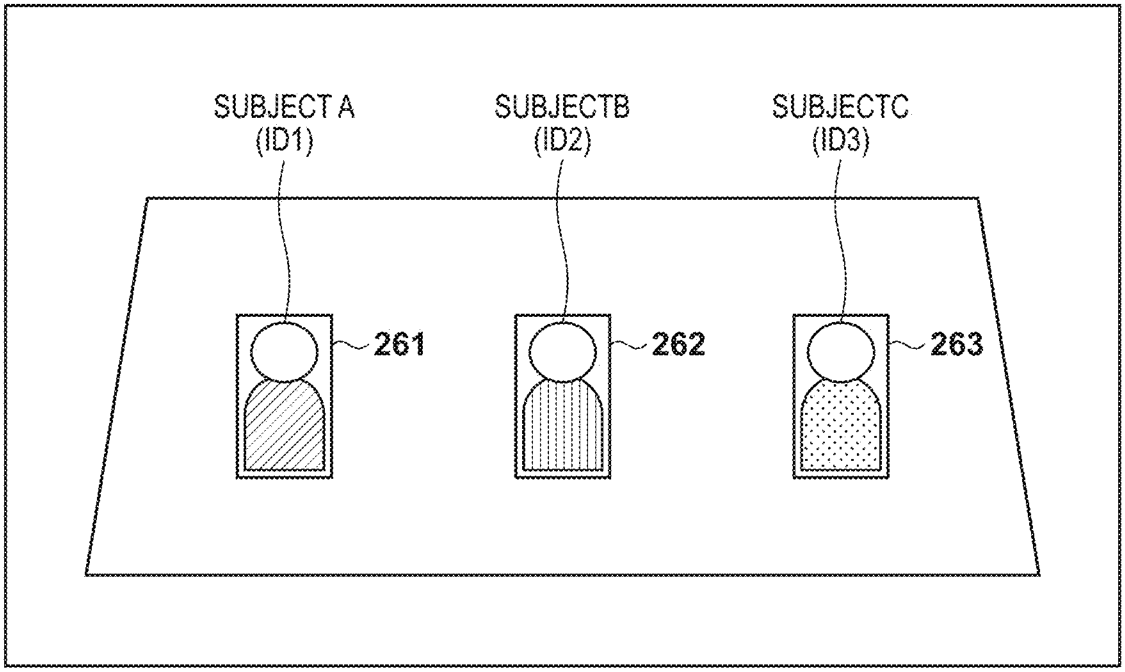
FIG. 25 is a diagram showing information associated with identifications ID of subjects in the third and fourth embodiments.
FIG. 26 is a diagram showing an example of an overhead image according to the third embodiment.

FIG. 25 is a diagram showing an example of a relationship among an identification ID of a subject detected from a frame image of the video of the overhead camera 300, rectangle information DETECT_POSI, and a display color of an indicator of each subject region. The position information (rectangle information DETECT_POSI) of a bounding rectangular region of a subject region corresponding to an identification ID "ID1" is (xul1, yul1) and (xdr1, ydr1), and an indicator color "red" is associated therewith. This means that, with respect to a subject whose identification ID has been determined to be ID1, a red indicator (here, rectangular frame) is superimposed at the position in the image indicated by the rectangle information. The same goes for other identifications ID, namely ID2 and ID3. Note that the colors assigned to the identifications ID can be determined in advance.

FIG. 26 shows an example of an image indicated by image data on which the indicators of the subject regions have been superimposed. It is assumed here that three human subjects A to C have been detected from an overhead image, and ID1 to ID3 have been respectively assigned thereto as identifications ID. The overhead image is one frame of the video from the overhead camera 300.

In a case where the indicator colors are defined as shown in FIG. 25, indicators 261 to 263 that are respectively in the forms of red, green, and blue rectangular frames are superimposed on the regions of the subjects A to C.

Note that the indicator of each subject is not limited to the indicator in the form of a rectangular frame that has been exemplarily shown. For example, it is sufficient for a rectangular frame to include at least a part of a subject region. Also, inside a rectangular frame, a region other than a subject region may be filled with the same color as the frame. Furthermore, an indicator may be, for example, semi-transparent. Using a semi-transparent indicator allows a subject region to be visually recognized even in a case where the indicator overlaps the subject region. The indicator of each subject may be or may not be in contact with the subject region associated therewith as long as its correspondence relationship with the subject region is clear.

In step S708, the CPU 101 reads out the image data generated in step S707 from the RAM 102. Then, the CPU 101 generates image data SUBJECT_IMG on which identification information pieces of the main camera 500 and the sub camera 400 that respectively have tracking target subjects are superimposed in the vicinity of the regions of the tracking target subjects of these cameras.

First, the CPU 101 reads out MAIN_SUBJECT indicating the subject of interest (tracking target subject) ID of the main camera 500 and SUBJECT_ID indicating the tracking target subject ID of the sub camera 400 from the RAM 102. The CPU 101 superimposes identification information of the main camera 500 (which is assumed to be characters "main camera" here) in the vicinity of the subject region corresponding to the identification ID of MAIN_SUBJECT. Similarly, the CPU 101 superimposes identification information of the sub camera 400 (which is assumed to be characters "sub camera" here) in the vicinity of the subject region corresponding to SUBJECT_ID.

Note that identification information of the role set on the sub camera 400 may be superimposed in addition to the identification information of the sub camera 400. For example, in a case where the role "main follow" is set on the sub camera 400, characters "sub camera (MF)" can be superimposed.

The position at which identification information of a camera is superimposed may be, for example, immediately above the subject indicator in the form of a rectangular frame. In this case, the CPU 101 can determine the position at which the identification information of the camera is superimposed from rectangle information. Note that the CPU 101 may determine the position at which the identification information of the camera is superimposed from the position information of the subject region. Furthermore, the identification information of the camera, too, can be semi-transparent.

The position at which the identification information of the camera is superimposed may be determined individually in accordance with, for example, the position of the corresponding subject region. For example, in a case where the subject region is close to an edge of the image, the display position may be changed. Specifically, the identification information of the camera can be superimposed below the subject region if the subject region is close to an upper edge of the image, and can be superimposed to the right of the subject region if the subject region is close to a left edge of the image. Furthermore, the position may be changed dynamically in consideration of the distance between subject regions, overlapping of subject regions, or the like.

Furthermore, the identification information of the camera is not limited to the role of the camera (main or sub). For example, it may be any information that allows the camera to be identified, such as an IP address and a model name of the camera. Furthermore, a plurality of types of identification information may be superimposed simultaneously, or in such a manner that they can be switched.

In addition, the color of the identification information of the camera may be the color associated with the corresponding subject, that is to say, the same color as the indicator of the corresponding subject region. Alternatively, a predetermined, fixed color may be used for each of the main camera and the sub camera.

The CPU 101 writes the data of the image obtained by superimposing information indicating the indicators of the subject regions and the tracking target subjects of the respective cameras into the RAM 102 as SUBJECT_IMG. Note that in a case where angle of view information is not superimposed, the CPU 101 may output the image data SUBJECT_IMG to the display apparatus 800 as image data for display OUT_IMAGE.

Figure 27A:
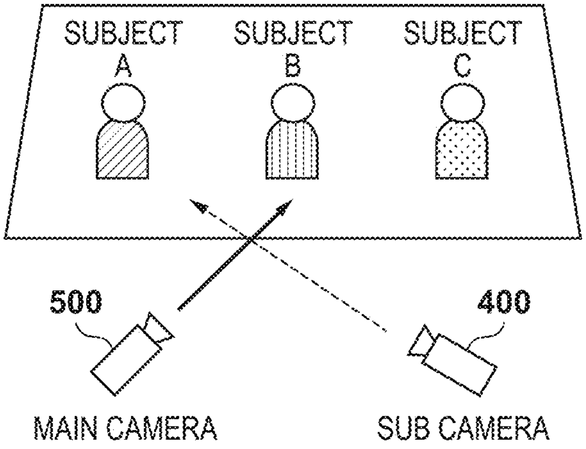
FIGS. 27A to 27F are diagrams showing examples of an overhead image generated in the third embodiment.
Figure 27B:
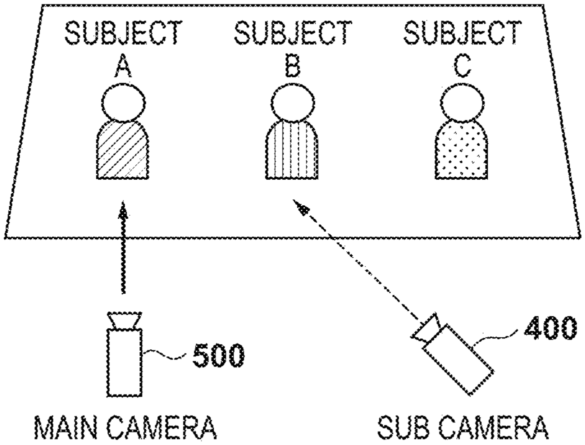
Figure 27C:
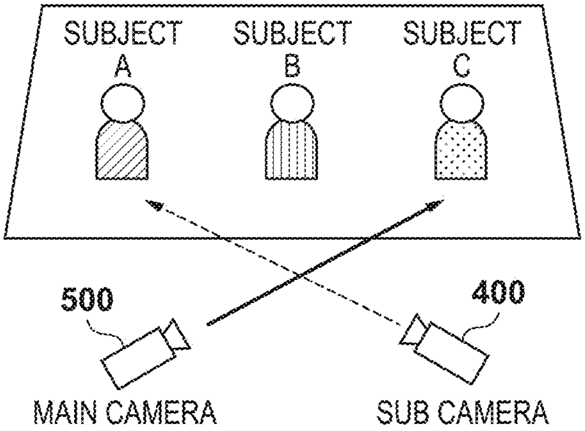
Figure 27D:
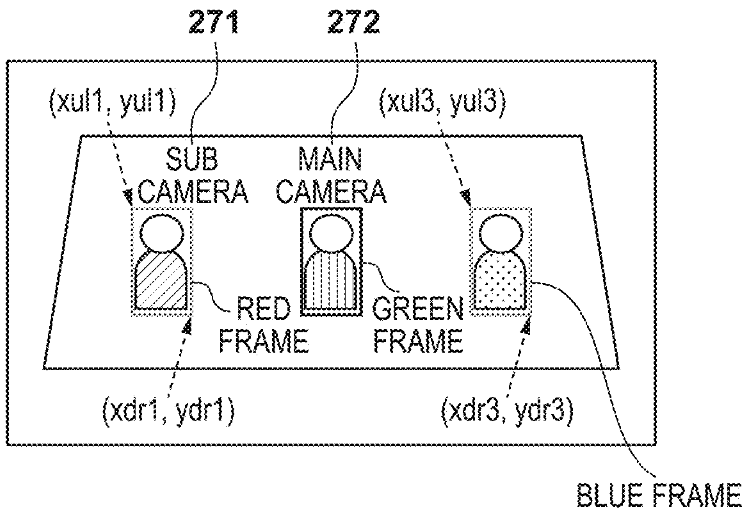
Figure 27E:
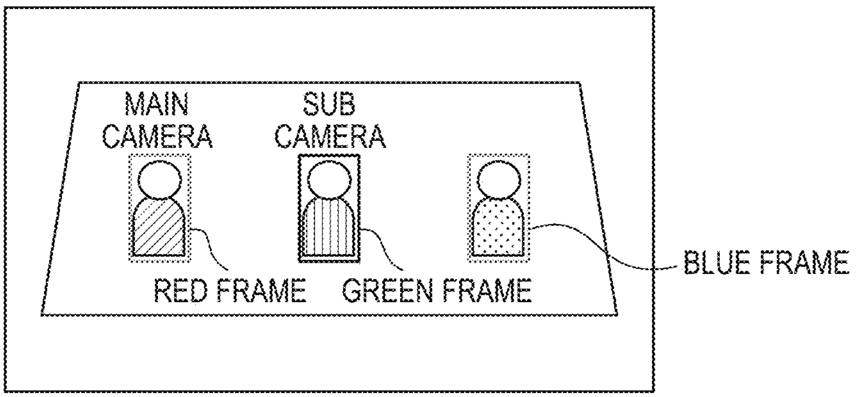
Figure 27F:
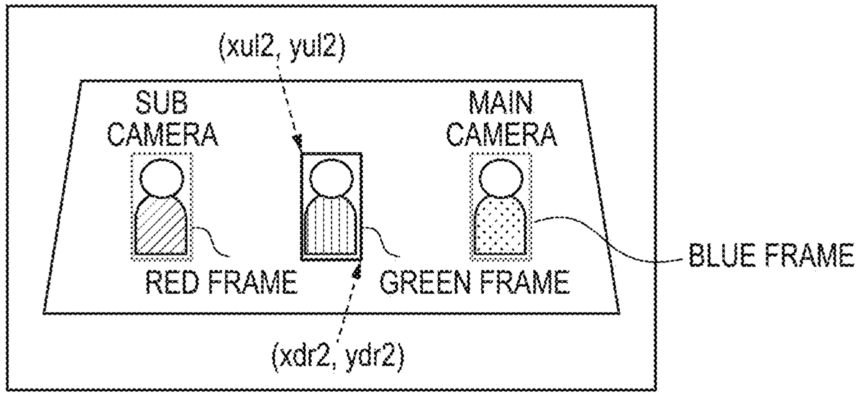

FIG. 27A to FIG. 27C show an example of a case where the tracking target subject differs between the main camera 500 and the sub camera 400 with regard to the human subjects A to C who are present inside the captured area. Specifically, this is a case where the sub camera 400 is performing automatic capture in accordance with the role "assist follow" or "assist counter". Also, FIG. 27D to FIG. 27F show image data pieces SUBJECT_IMG that are generated in correspondence with FIG. 27A to FIG. 27C, respectively.

Regardless of the tracking target subjects of the main camera 500 and the sub camera 400, indicators in the form of rectangular frames that have colors based on the relationship shown in FIG. 25 are superimposed on the regions of the subjects A to C in the overhead image.

FIG. 27A is a state where the main camera 500 and the sub camera 400 are tracking the subject B and the subject A, respectively. Therefore, characters 272 of "main camera" are superimposed in the vicinity of the region of the subject B, which is the tracking target subject of the main camera 500. Also, characters 271 of "sub camera" are superimposed in the vicinity of the region of the subject A, which is the tracking target subject of the sub camera 400.

FIG. 27B is a state where the main camera 500 and the sub camera 400 are tracking the subject A and the subject B, respectively. Therefore, characters 272 of "main camera" are superimposed in the vicinity of the region of the subject A, which is the tracking target subject of the main camera 500. Also, characters 271 of "sub camera" are superimposed in the vicinity of the region of the subject B, which is the tracking target subject of the sub camera 400.

FIG. 27C is a state where the main camera 500 and the sub camera 400 are tracking the subject C and the subject A, respectively. Therefore, characters 272 of "main camera" are superimposed in the vicinity of the region of the subject C, which is the tracking target subject of the main camera 500. Also, characters 271 of "sub camera" are superimposed in the vicinity of the region of the subject A, which is the tracking target subject of the sub camera 400.

Next, using the flowchart shown in FIG. 24B, a description is given of processing for adding the indicators indicating the capturing angles of view for the tracking target subjects to the overhead image.

In step S801, the CPU 101 as the angle of view information superimposition unit 127 reads out the data SUBJECT_IMG of the overhead image on which the indicators of the subject regions and the indicators of the tracking target subjects of the respective cameras have been superimposed, which has been generated in step S708, from the RAM 102. Note that in a case where the indicators of the subject regions and the indicators of the tracking target subjects of the respective cameras are not superimposed, the CPU 101 reads out the image data IMG of the frame that is the same as the image data read out from the RAM 102 in step S703.

In step S802, the CPU 101 obtains the current zoom values of the main camera 500 and the sub camera 400. The value that the zoom value calculation unit 125 has obtained from the main camera 500 most recently and stored into the RAM 102 can be used as the zoom value MAIN_ZOOM of the main camera 500. Also, the zoom value Z_VALUE that the zoom value calculation unit 125 has determined most recently and stored into the RAM 102 in step S207 can be used as the zoom value of the sub camera 400. Note that the CPU 101 may obtain the zoom values from the main camera 500 and the sub camera 400 by transmitting commands for obtaining the zoom values via the network I/F 105.

In step S803, the CPU 101 reads out image data to be used for the indicators indicating the capturing angles of view from, for example, the ROM 103. It is assumed here that a specific image is scaled to a size corresponding to an angle of view, and the resultant image is used as the indicator indicating the capturing angle of view. Note that an indicator indicating a capturing angle of view may be in another form, such as an indicator indicating a zoom value using characters.

In step S804, the CPU 101 generates the indicator indicating the capturing angle of view for the tracking target subject of the main camera 500 by resizing the image obtained in step S803 in accordance with the zoom value of the main camera 500 obtained in step S802. With regard to the sub camera 400, too, the CPU 101 similarly generates the indicator indicating the capturing angle of view for the tracking target subject.

Regarding the rate of resizing of an image, a correspondence relationship between the rate of resizing and the zoom value is stored in advance in the ROM 103 so that a smaller zoom value (a narrower angle of view) causes the image to be resized to a larger size, and a larger zoom value (a wider angle of view) causes the image to be resized to a smaller size. Furthermore, in the present embodiment, the positions DRAW_POSI in the image at which the indicators indicating the capturing angles of view for the tracking target subjects are to be superimposed on the overhead image are stored in advance in the ROM 103. For each of the main camera 500 and the sub camera 400, a position DRAW_POSI defines the coordinates of vertices that are opposing corners of a rectangular region for displaying the indicator. Note that individual positions DRAW_POSI may be stored in accordance with the number of sub cameras 400.

Figure 28A:
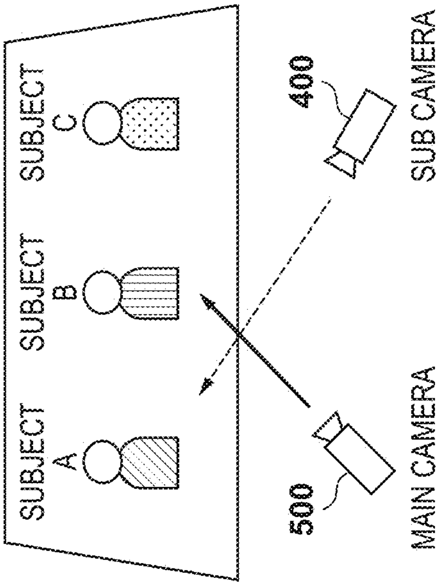
FIGS. 28A to 28E are diagrams showing examples of an overhead image generated in the third embodiment.
Figure 28B:
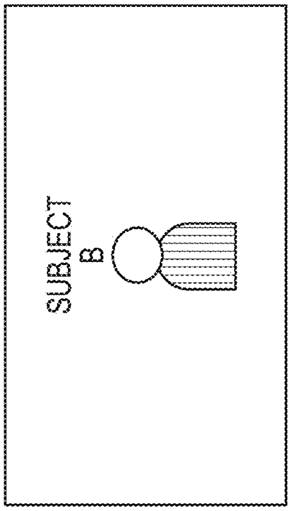
Figure 28C:
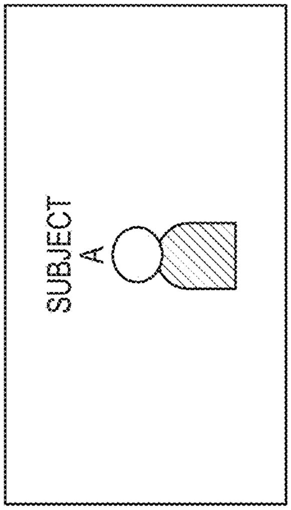
Figure 28D:
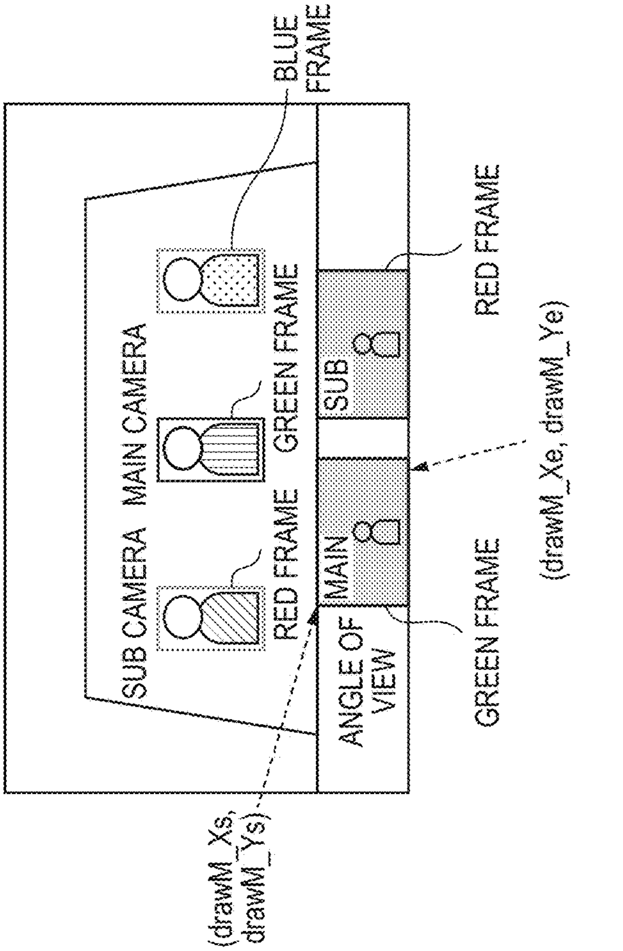
Figure 28E:
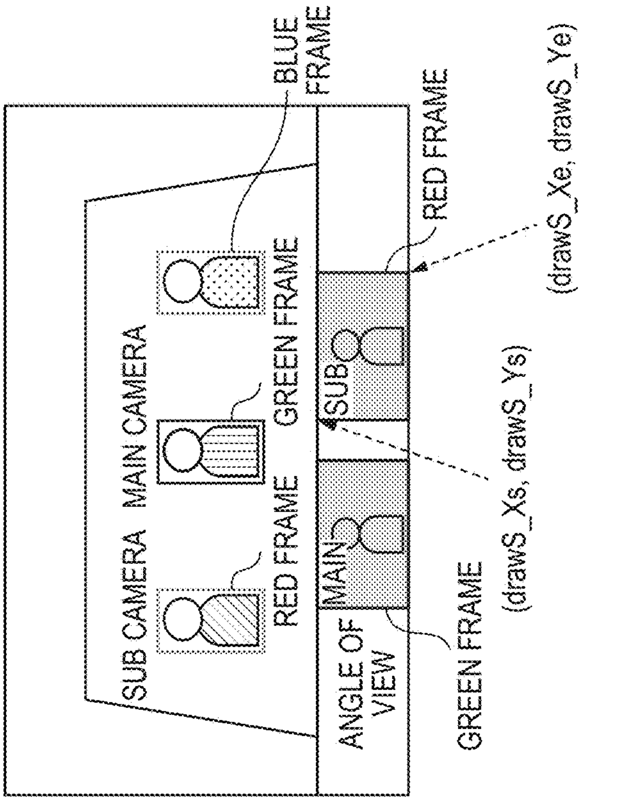

It is assumed here that the indicators indicating the capturing angles of view are displayed in a bottom part of the overhead image as shown in FIG. 28D and FIG. 28E. In this case, the positions DRAW_POSI include the coordinates (drawM_Xs, drawM_Ys) of the upper-left vertex and the coordinates (drawM_Xe, drawM_Ye) of the lower-right vertex of the rectangular region for displaying the indicator of the capturing angle of view of the main camera 500. Furthermore, the positions DRAW_POSI also include the coordinates (drawS_Xs, drawS_Ys) of the upper-left vertex and the coordinates (drawS_Xe, drawS_Ye) of the lower-right vertex of the rectangular region for displaying the indicator of the capturing angle of view of the sub camera 400.

The CPU 101 superimposes scaled images inside the rectangular regions indicated by the positions DRAW_POSI in the overhead image.

Using FIGS. 28A to 28E, the following describes the operations related to generation and superimposition of the indicators indicating the capturing angles of view more specifically. FIG. 28A shows a state where the tracking target subject of the main camera 500 is the subject B and the tracking target subject of the sub camera 400 is the subject A among the human subjects A to C who are present inside the captured area. Specifically, this is a case where the sub camera 400 is performing automatic capture in accordance with the role "assist follow". FIG. 28B and FIG. 28C show the video of the main camera 500 and the video of the sub camera 400, respectively.

FIG. 28D shows an example of display of the indicators indicating the capturing angles of view in the state of FIG. 28A in a case where the capturing angles of view of the main camera 500 and the sub camera 400 are both wide-angle. Meanwhile, FIG. 28E shows an example of display of the indicators indicating the capturing angles of view in the state of FIG. 28A in a case where the capturing angles of view of the main camera 500 and the sub camera 400 are both telephoto.

Here, an image of a figure having a simple shape imitating a torso and a head of a human body (a human body model image) is used to generate indicators. Note that, for ease of understanding and explanation, it is assumed that the main camera 500 and the sub camera 400 have the same zoom value range, and control is performed so that the zoom value of the sub camera 400 becomes equal to the zoom value of the main camera 500 due to the role "assist follow". As shown in FIG. 28D and FIG. 28E, a small indicator is displayed in a case where the capturing angle of view is wide-angle, whereas a large indicator is displayed in a case where the capturing angle of view is telephoto.

In step S805, the CPU 101 executes processing for clarifying to which cameras the indicators of the capturing angles of view correspond. Specifically, the CPU 101 gives the colors conforming with the relationship between identifications ID and indicator colors shown in FIG. 25 to the outlines of the rectangular regions for displaying the indicators. Specifically, the CPU 101 presents at least a part of an outline of a rectangular region for displaying an indicator in a color corresponding to the identification ID of a subject indicated by this indicator. Alternatively, the CPU 101 superimposes, on at least a part of an outline of a rectangular region for displaying an indicator, an image of a color corresponding to the identification ID of a subject indicated by this indicator.

In the example shown in FIG. 28A, the tracking target subject of the main camera 500 is the subject B. Also, as shown in FIG. 25, the color of the indicator corresponding to the subject B (the identification ID2) is green. Therefore, the CPU 101 gives the color green to the outline of the rectangular region for displaying the indicator indicating the capturing angle of view for the subject B. Similarly, the CPU 101 gives the color red to the outline of the rectangular region for displaying the indicator indicating the capturing angle of view for the subject A (the identification ID1).

Note that a region for displaying an indicator indicating a capturing angle of view, too, may include identification information of a camera whose tracking target subject corresponds to the indicator. The inclusion of the identification information of the camera makes it possible to understand to which camera the capturing angle of view corresponds more directly.

The CPU 101 generates data of an image including the indicators indicating the capturing angles of view and the identification information pieces of subjects corresponding to the indicators, which is shown in FIGS. 28D and 28E, as image data for display OUT_IMAGE. Then, the CPU 101 transmits the image data for display OUT_IMAGE to the display apparatus 800. The image data for display OUT_IMAGE includes at least one of (1) information indicating the indicators of the subject regions and the tracking target subjects of the respective cameras, which are shown in FIGS. 27D to 27F, and (2) the indicators indicating the capturing angles of view and identification information pieces of the subjects corresponding to the indicators. Note that the CPU 101 may display the image data for display OUT_IMAGE on the display unit 108.

Upon receiving the image data for display OUT_IMAGE via the network I/F 805, the CPU 801 of the display apparatus 800 stores the same into the RAM 802. Then, the CPU 801 displays the image data for display OUT_IMAGE on the display unit 811. The CPU 801 may convert the image data for display OUT_IMAGE into data that is appropriate for display on the display unit 811 as necessary. For example, the CPU 801 can scale the image data for display OUT_IMAGE in accordance with the resolution of the display unit 811.

An indicator that indicates an angle of view in terms of size is generated by scaling an image of a shape obtained by deforming a torso and a head in accordance with a zoom value. However, an indicator that indicates an angle of view without using size may be generated. For example, the size of a range to be used as an indicator out of a predetermined image (e.g., an image obtained by deforming an entirety of a human body) may vary in accordance with a zoom value. Specifically, a range to be used as an indicator can be narrowed as the angle of view decreases; for example, an entire image (entire body) can be used as an indicator in a case where the capturing angle of view is wide-angle, whereas only the upper body in the image can be used as an indicator in a case where the capturing angle of view is telephoto.

Furthermore, an image imitating a subject may not be used as an indicator. For example, instead of an image of a shape obtained by deforming a torso and a head, an image of a fruit (e.g., an apple), a musical instrument (e.g., a guitar), or the like may be scaled and used as an indicator of a capturing angle of view. Alternatively, an image of a subject that has been cut out from the overhead image may be used. Scaling may be replaced with a selection of one of a plurality of pre-prepared images with different sizes based on a zoom value. An indicator that varies in size in accordance with a zoom value can be generated using any known method.

In a case where there are a plurality of sub cameras 400, it is sufficient to display indicators for the respective sub cameras 400. Indicators indicating the capturing angles of view can be displayed in the following order, starting from the leftmost rectangular region: main camera, sub camera 1, sub camera 2, and so forth. Alternatively, the indicator indicating the capturing angle of view of the main camera may be displayed on a rectangular region located at the center in the horizontal direction, whereas the indicators of the capturing angles of view of the respective sub cameras may be displayed on rectangular regions on the left and right in a predetermined order.

Furthermore, it is assumed that each camera has one tracking target subject in the present embodiment. However, each camera may have a plurality of tracking target subjects.

An indicator indicating the capturing angle of view of a camera that has a plurality of tracking target subjects can be generated using an image based on the number of the tracking target subjects. For example, with respect to a camera that tracks three subjects (subject A to subject C) shown in FIG. 26 all at once, the indicator indicating the capturing angle of view can be generated by scaling an image of a state where the three subjects are placed in a line. The same goes for other numbers of subjects.

Alternatively, in a case where a plurality of subjects are grouped and tracked on a per-group basis, an indicator may be generated by scaling an image of one person and then superimposing identification information pieces (e.g., group names) of the groups. In this case, a group of subjects may be assigned an indicator color different from those of the individual subjects. Alternatively, subjects that belong to the same group may be indicated by using an indicator that contains all of the colors assigned to the individual subjects. For example, according to the example shown in FIG. 25, in a case where the subjects A to C belong to the same group, an indicator (e.g., a rectangular frame) composed of three colors, namely red, green, and blue, may be superimposed on each of the regions of the subjects A to C.

Furthermore, although rectangular frames in a color associated with a subject are used in visually associating a tracking target subject and a capturing angle of view of the same camera with each other in the present embodiment, other methods may be used. For example, it is permissible to use an image of a solid line, a dot line, a dash line, a double line, or the like connecting between a region of a tracking target subject and a display region of an indicator indicating a capturing angle of view for the same camera. No limitation is intended by rectangular frames; arrows indicating the subject regions, or frames of such figures as circles and trapezoids surrounding the subject regions, may be used.

Furthermore, icons of corresponding cameras may be displayed in association with the indicators indicating the capturing angles of view. In this way, to which cameras the capturing angles of view correspond can be displayed more clearly in a case where, for example, the cameras have different external shapes. For example, in a case where the main camera 500 is a horizontally long video camera and the sub camera 400 is a round PTZ camera, displaying icons imitating the external appearances of the cameras in association with the indicators indicating the capturing angles of view makes it possible to recognize, at first sight, to which cameras the capturing angles of view correspond. Also, the types of the cameras can also be understood from the icons.

Furthermore, the capturing angles of view may be presented using character information. For example, an image showing a numerical character indicating a zoom value, or such characters as "far" (wide-angle) and "close" (telephoto), may be used as an indicator indicating a capturing angle of view. Any other expressions that can indicate a capturing angle of view may be used.

Also, in the present embodiment, indicators that indicate the tracking target subjects and the capturing angles of view of the respective cameras in a visualized manner have been exemplarily described as capture information. However, the capture information is not limited to these. For example, tally states of the respective cameras may be visualized. Specifically, indicators of a tracking target subject and a capturing angle of view of a camera whose tally state is currently broadcasting or currently distributing, may be displayed in association with a mark that has the same color as the color of a tally lamp, and character information indicating "currently broadcasting" or "currently distributing". In a case where a video to be output from the image capture system is selected using a switcher, displaying the tally states superimposed on the overhead image makes it possible to easily understand a subject and an angle of view of the video that is currently output, in addition to the subjects and the angles of view of the individual cameras.

As described above, according to the present embodiment, in an image capture system including a sub camera that performs automatic image capture in coordination with a main camera, capture information indicating the subjects captured by the respective cameras and the capturing angles of view therefor can be understood in real time. This makes it possible to easily execute remote operations to switch a main camera, and to make appropriate changes to the angles of view of the respective cameras.

Fourth Embodiment

Next, a fourth embodiment of the present disclosure will be described. The third embodiment has been described using an example in which the capture information of each camera is presented to a user by superimposing the same on an overhead image. In the fourth embodiment, the capture information of each camera is presented to a user with use of a method different from the method in which the capture information is superimposed on an overhead image.

Figure 29:
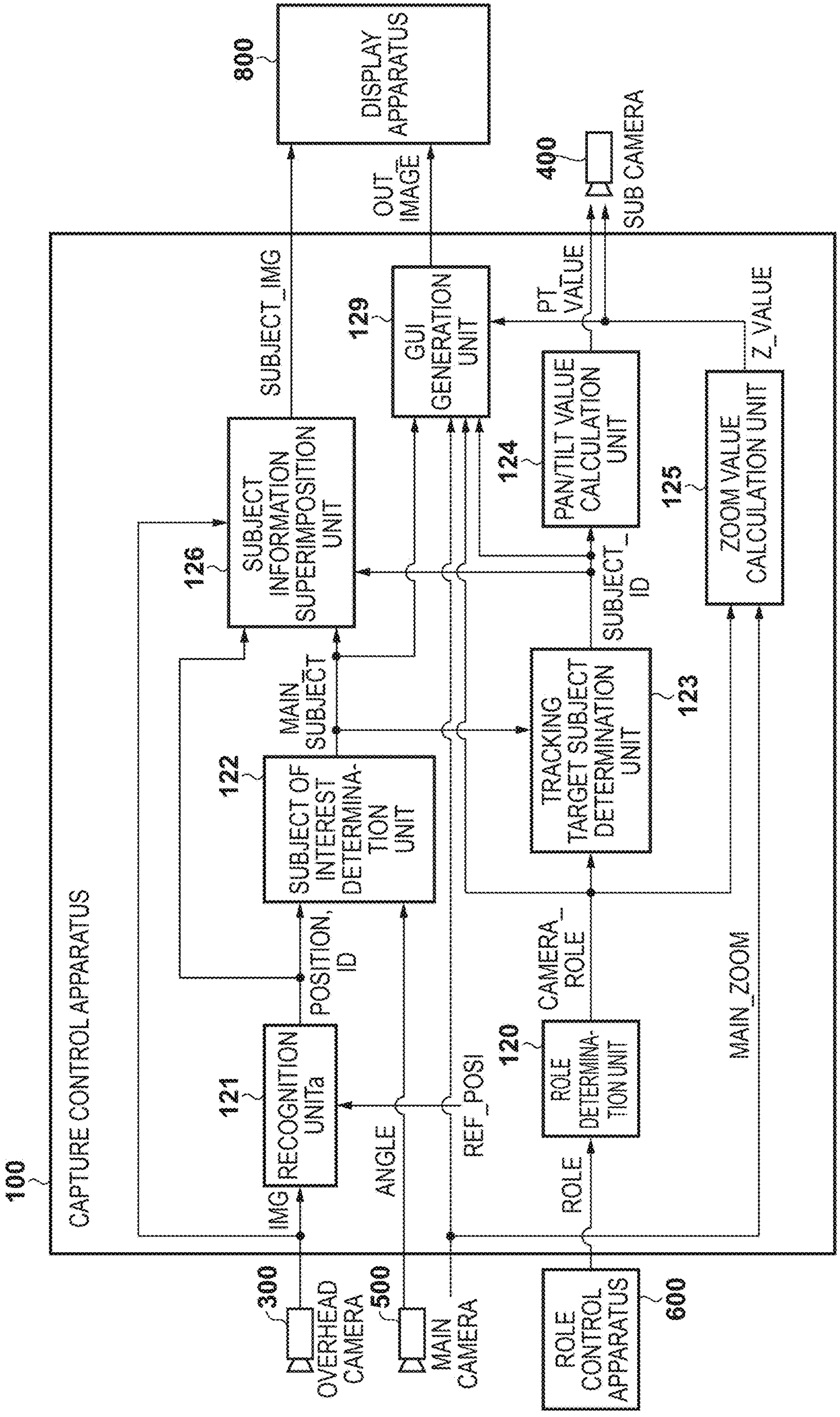
FIG. 29 is a diagram showing a capture control apparatus according to a fourth embodiment, with a focus on main operations and flows of signals.

Similarly to FIG. 3 and FIG. 23, FIG. 29 is a diagram showing a processing sequence that is performed when the capture control apparatus 100 controls the operations of the sub camera 400, with a focus on main operations and flows of signals. The functional blocks shown inside the capture control apparatus 100 schematically indicate the main operations, and are equivalent to the main functions provided by the capture control application. Each functional block of FIG. 29 is realized by a combination of the CPU 101, which executes the capture control application, and one or more of the functional blocks of the capture control apparatus 100 shown in FIG. 22.

As can be understood from comparison between FIG. 29 and FIG. 23, the capture control apparatus 100 of the present embodiment has the functions of a GUI generation unit 129 in addition to the constituents according to the third embodiment. The GUI generation unit 129 generates a graphical user interface (GUI) as a second image for display, which is for presenting the capture information of each camera to a user. By generating the GUI for presenting the capture information to the user, a representation that is different from a first image for display, which is obtained by superimposing the capture information on an overhead image, can be used. This makes it possible to provide another means for allowing the user to understand the capture information of each camera.

Figure 30:
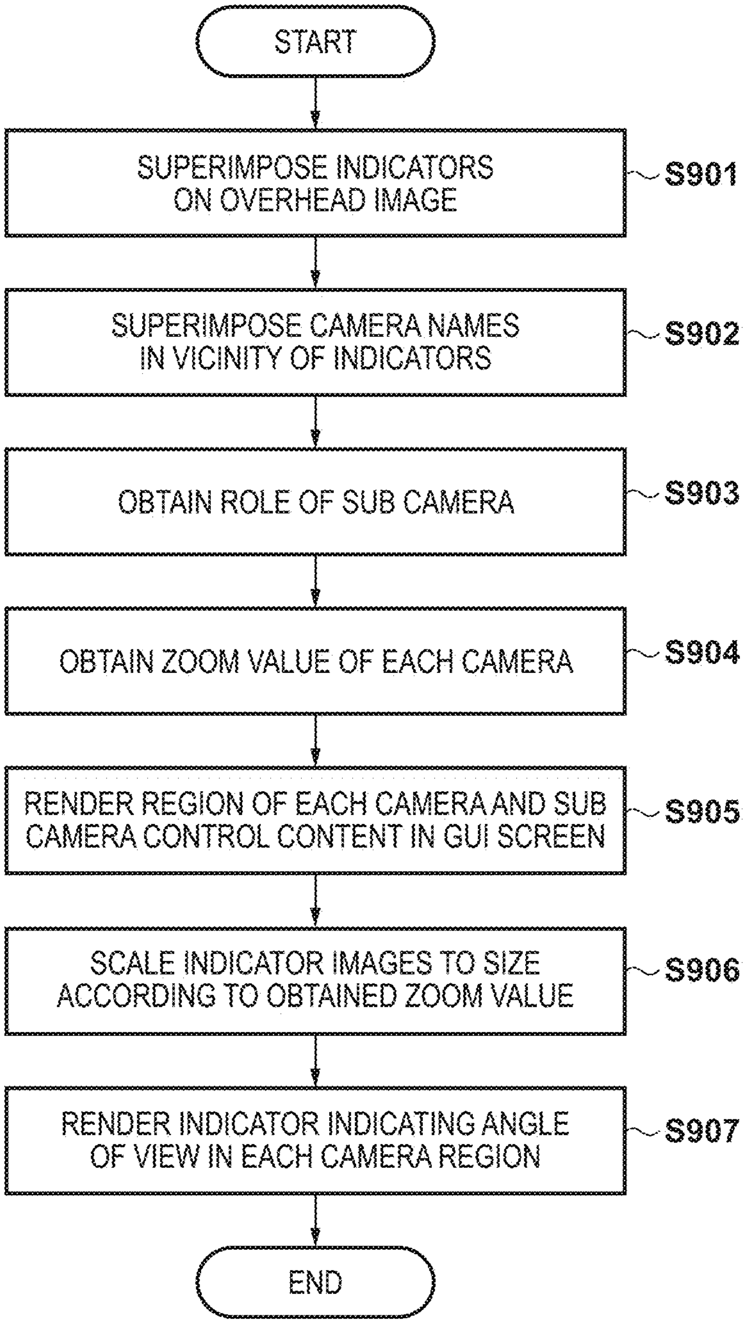
FIG. 30 is a flowchart related to the operations of the capture control apparatus according to the fourth embodiment.

Next, using a flowchart shown in FIG. 30, a description is given of the operations to generate a GUI image for presenting the capture information of the main camera 500 and the sub camera 400 among the operations executed by the capture control apparatus 100 in the present embodiment. The capture control apparatus 100 can execute the operations described below in parallel with automatic capture control operations of the sub camera, the operations described in the third embodiment, and the like.

As one example, it is assumed here that a GUI image is generated that presents the content of a coordinated operation of the sub camera conforming with the set role as the capture information, in addition to the tracking target subjects and the capturing angles of view of the respective cameras. Although any type of GUI may be generated, it is assumed here that a window that presents the capture information is generated as one example.

In step S901, similarly to step S707 of FIG. 24A, the CPU 101 generates data of an overhead image on which images of rectangular frames that have colors corresponding to the identifications ID of subjects are superimposed around subject regions. The CPU 101 stores the generated image data into the RAM 102.

In step S902, similarly to step S708, the CPU 101 adds, to the image data generated in step S901, images of identification information pieces of the cameras to be superimposed in the vicinity of the subject regions equivalent to the tracking target subjects of the main camera 500 and the sub camera 400. Here, images of characters "main camera" and "sub camera" are added as the images of the identification information pieces of the cameras. The CPU 101 stores data of the overhead image on which the capture information has been superimposed (the first image for display), which has been obtained in the processes of steps S901 and S902, into the RAM 102.

In step S903, the CPU 101 obtains the role CAMERA_ROLE set on the sub camera 400, similarly to step S705.

In step S904, the CPU 101 obtains zoom values of the respective cameras, similarly to step S802.

Figure 31A:
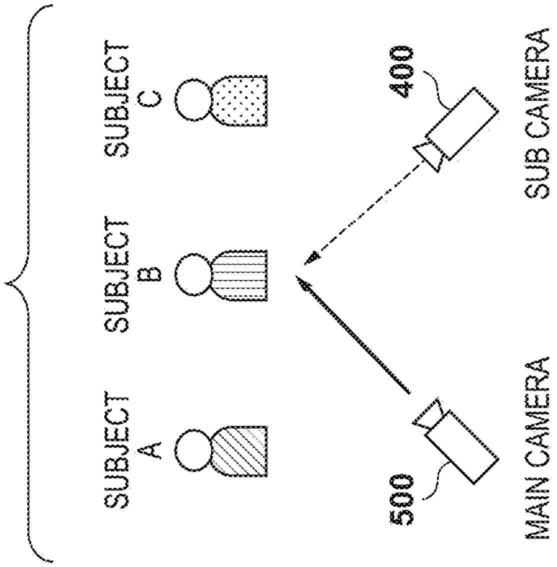
FIGS. 31A to 31F are diagrams showing examples of images generated in the fourth embodiment.

In step S905, the CPU 101 as the GUI generation unit 129 starts to generate a GUI image for presenting the capture information. First, the CPU 101 renders regions for the respective cameras in an image of a window having a predetermined size. Here, as one example, rectangles corresponding to the respective cameras are rendered in colors associated with the identifications ID of the tracking target subjects of the respective cameras. FIG. 31E shows examples of a window 310 and rectangular frames 311 and 312 corresponding to the respective cameras. In FIG. 31E, the tracking target subjects of the main camera 500 and the sub camera 400 are both subject B, as shown in FIG. 31A. Therefore, the CPU 101 renders both of the rectangular frame 311 corresponding to the main camera 500 and the rectangular frame 312 corresponding to the sub camera 400 in green.

Furthermore, in order to indicate correspondence between the regions and the cameras, the CPU 101 renders identification information pieces 313 and 314 of the cameras above the rectangular frames 311 and 312. Although character information indicating "main camera" and "sub camera" is rendered as one example in FIG. 31E, other types of images, such as icons of external shapes of the cameras, may be rendered as stated earlier.

Furthermore, in the region corresponding to the sub camera 400, the CPU 101 renders information indicating the content of control related to the tracking target subject among the contents of control corresponding to the role CAMERA_ROLE set on the sub camera 400.

In the example shown in FIG. 31E, the region (region inside the rectangle) corresponding to each camera is divided into upper and lower parts. Then, the content of control related to the tracking target subject and information of the capturing angle of view are rendered in the upper part and the lower part, respectively. Note that how to divide the inside of the region, and what kind of capture information is presented in the divided region, can be determined as appropriate in accordance with the types and the number of capture information pieces to be provided.

In the example shown in FIG. 31E, the role "main follow" is set on the sub camera. Therefore, in the upper part of the region corresponding to the sub camera 400, the CPU 101 renders information 317 indicating that the tracking target subject of the sub camera 400 is the same as the tracking target subject of the main camera. In FIG. 31E, character information indicating "tracking target subject same as main" is rendered as one example.

In step S906, the CPU 101 generates indicators indicating the capturing angles of view of the respective cameras, similarly to step S804. Here, the indicators are generated using images similar to those of the third embodiment; however, as stated earlier, the indicators may be generated using other types of images or character information.

In step S907, the CPU 101 renders the indicators generated in step S906 in the regions corresponding to the respective cameras. In the example shown in FIG. 31E, the indicators are rendered in the lower parts of the regions. Then, the CPU 101 stores data of the GUI image obtained through the processes of steps S905 to S907 (the second image for display) into the RAM 102.

The CPU 101 transmits the data of the overhead image (the first image for display) stored into the RAM 102 in step S902, and the data of the GUI image (the second image for display) stored into the RAM 102 in step S907, to the display apparatus 800 as image data for display OUT_IMAGE. In the present embodiment, too, the image data for display OUT_IMAGE can be displayed on the display unit 108.

Upon receiving the image data for display OUT_IMAGE via the network I/F 805, the CPU 801 of the display apparatus 800 stores the same into the RAM 802. Then, the CPU 801 displays the image data for display OUT_IMAGE on the display unit 811. The CPU 801 may convert the image data for display OUT_IMAGE into data that is appropriate for display on the display unit 811 as necessary. For example, the CPU 801 can scale the overhead image and the GUI image so that the overhead image and the GUI image are displayed as separate windows on the display unit 811.

An example of the image data for display OUT_IMAGE generated by the CPU 101 in the present embodiment will be described using FIGS. 31A to 31F.

Figure 31B:
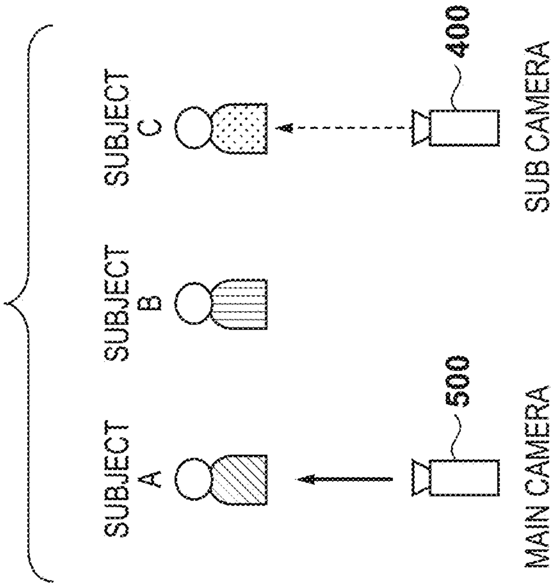

FIG. 31A and FIG. 31B show a state where a scene similar to FIG. 28A is automatically captured by the main camera 500 and the sub camera 400 that is in coordination with the main camera 500. In FIG. 31A, the sub camera 400 is performing automatic image capture in accordance with the role "main follow". Meanwhile, in FIG. 31B, the sub camera 400 is performing automatic image capture in accordance with the role "assist counter". Note, it is assumed here that in the case of the role "assist counter", a subject located on the right among subjects other than the subject of interest of the main camera 500 is set as the tracking target subject of the sub camera 400.

Also, it is assumed that the main camera 500 and the sub camera 400 have the same capturing angle of view in FIG. 31A. On the other hand, it is assumed that the angle of view of the main camera 500 in FIG. 31B is narrow (on the telephoto side) compared to the state of FIG. 31A. Therefore, in accordance with the role "assist counter", the capturing angle of view of the sub camera 400 is controlled to be wide (on the wide-angle side) compared to the state of FIG. 31A.

In FIG. 31A, both of the main camera 500 and the sub camera 400 are tracking the subject B. In FIG. 31B, the main camera 500 and the sub camera 400 are tracking the subject A and the subject C, respectively.

Figure 31C:
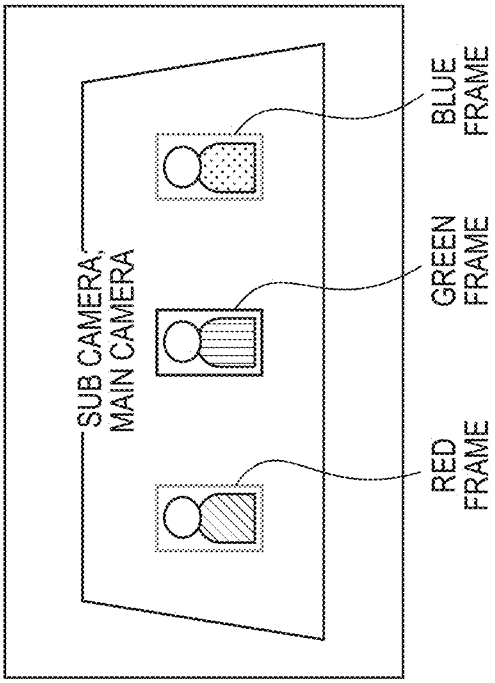

FIG. 31C shows an image equivalent to overhead image data generated in step S902 in the capture state of FIG. 31A. Rectangular frames that have colors associated with the identifications ID of the subjects are superimposed on the regions of the respective subjects. Also, an image indicating the identification information pieces of the main camera 500 and the sub camera 400 (characters “main camera” and “sub camera”) is superimposed above the rectangular frame of the subject B, which is the tracking target subject of the main camera 500 and the sub camera 400.

Figure 31D:
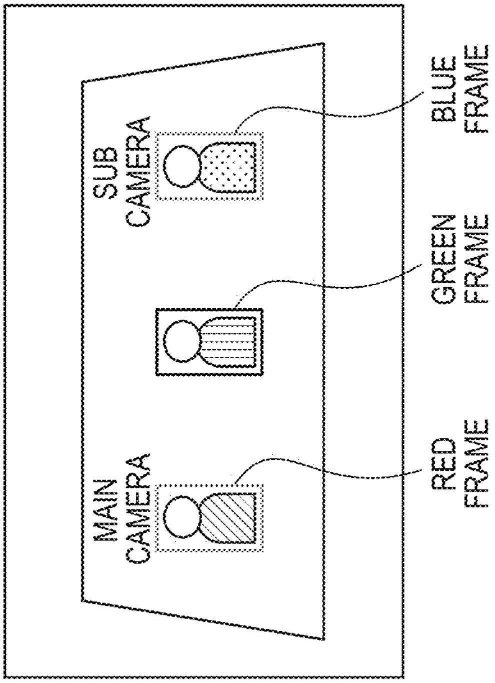
Figure 31E:
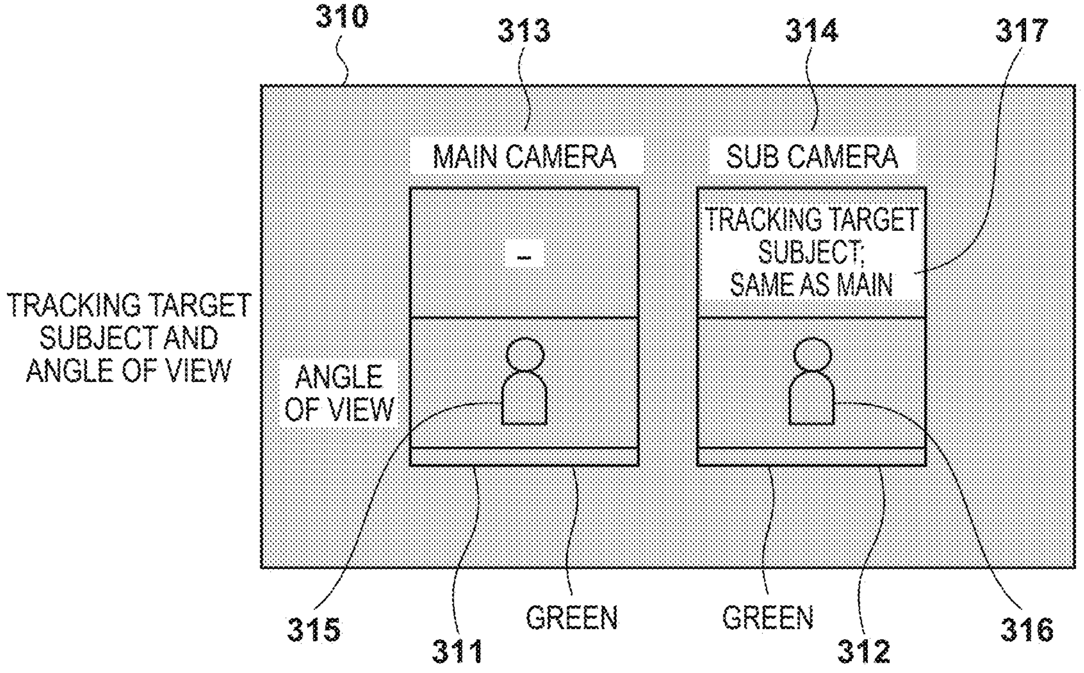

FIG. 31D shows an image equivalent to overhead image data generated in step S902 in the capture state of FIG. 31B. Rectangular frames that have colors associated with the identifications ID of the subjects are superimposed on the regions of the respective subjects. Also, an image indicating the identification information of the main camera 500 (characters “main camera”) is superimposed above the rectangular frame of the subject B A, which is the tracking target subject of the main camera 500. Furthermore, an image indicating the identification information of the sub camera 400 (characters “sub camera”) is superimposed above the rectangular frame of the subject C, which is the tracking target subject of the sub camera 400.

FIG. 31E shows an image equivalent to GUI image data generated in step S907 in the capture state of FIG. 31A. The rectangular frame 311 indicating the region corresponding to the main camera 500 and the rectangular frame 312 indicating the region corresponding to the sub camera 400 are rendered in the window 310. The rectangular frames 311 and 312 are rendered in the color associated with the identification ID of the tracking target subject of the corresponding cameras. Also, the identification information pieces 313 and 314 of the corresponding cameras are rendered above the rectangular frames 311 and 312. Information 317 indicating the content of control on the tracking target subject under the role currently set on the sub camera 400 is rendered in the upper part of the rectangular frame 312 corresponding to the sub camera 400. Also, indicators 315 and 316 indicating the capturing angles of view of the main camera 500 and the sub camera 400 are rendered in the lower parts of the rectangular frames 311 and 312. The indicators 315 and 316 have the same size.

Figure 31F:
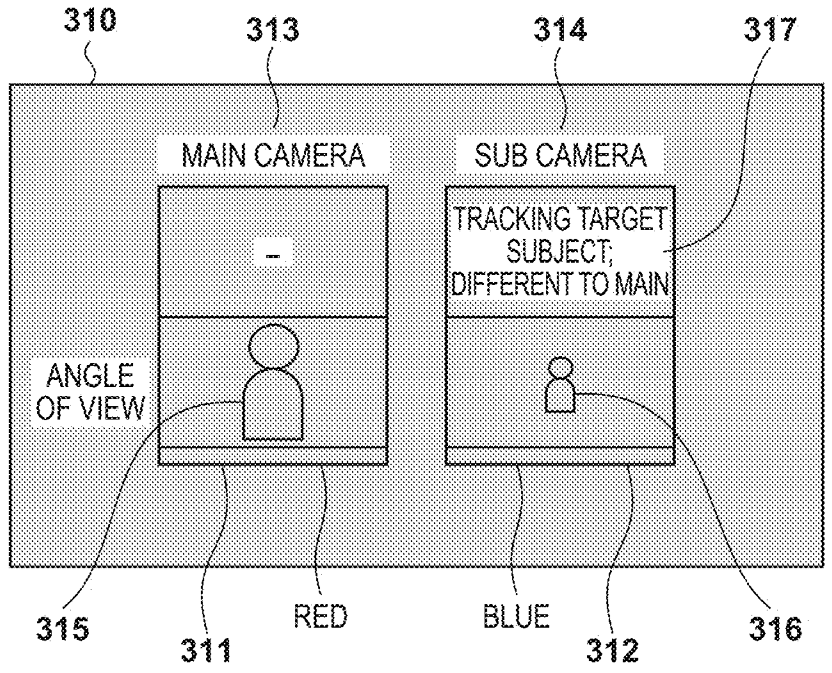

FIG. 31F shows an image equivalent to GUI image data generated in step S907 in the capture state of FIG. 31B. Compared to FIG. 31E, as the tracking target subjects are different, the colors of the rectangular frames 311 and 312 are different. Also, as the capturing angle of view of the main camera 500 is narrow and the capturing angle of view of the sub camera 400 is wide, the indicators 315 and 316 have different sizes. Furthermore, as the sub camera 400 has a different role, the content of the information 317 indicating the content of control on the tracking target subject is different.

Note that the color associated with an identification ID of a tracking target subject of a camera may be applied to an item other than a rectangle indicating a region corresponding to this camera. For example, the color may be applied to the background inside the region. Also, two images may be displayed in the same window by, for example, superimposing a GUI image on an overhead image on which capture information has been superimposed.

In the present embodiment, the content of control on a tracking target subject is presented as information related to a role of the sub camera 400. However, the name of the role of the sub camera 400 (e.g., “assist counter”) and identification information of the tracking target subject thereof (e.g., the name of the subject) may be presented in place of, or in addition to, the content of control.

According to the present embodiment, an image that presents capture information is generated separately from an overhead image; this makes it possible to check the capture information without being influenced by the overhead image, in addition to achieving the advantageous effects of the third embodiment, and the capture information can be understood more easily.

Note that although the third and fourth embodiments have been described using an example in which a user is provided with information that indicates the capture states of the main camera and the sub camera in a visualized manner, in a case where the main camera is operated by a photographer, it is possible that changes in the subject and the capturing angle of view of the main camera are determined in advance. In this case, as the subject and the capturing angle of view of the main camera can be grasped to some extent, a user may be provided with information that indicates the capture state of the sub camera in a visualized manner but does not indicate the capture state of the main camera in a visualized manner. Alternatively, a user may be capable of selecting whether to visualize the capture state of the main camera.

Furthermore, in a multi-camera image capture system including a large number of sub cameras, if a user is provided with information that indicates the capture state of every camera in a visualized manner, there is a risk that the user cannot accurately recognize the information because the volume of information is too large. In view of this, the user may be capable of selecting a camera(s) whose capture state is to be visualized among the cameras in the multi-camera image capture system. Note that providing the user with information that indicates the capture state of the main camera in a visualized manner but does not indicate the capture states of the sub cameras in a visualized manner has little effect in improving the convenience of the automatic image capture system; therefore, it is desirable to provide the user with information that indicates the capture state of at least one sub camera in a visualized manner. It is sufficient to allow these selection operations to be executed with use of the user input unit 804.

Other Embodiments

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2023-166225, filed on Sep. 27, 2023, which is hereby incorporated by reference herein in its entirety.

What is claimed is:

1. A display control apparatus used in an image capture system which includes a first image capture apparatus and a second image capture apparatus, wherein in the image capture system a subject that is a tracking target of the second image capture apparatus and an angle of view of the second image capture apparatus are controlled based on information related to the first image capture apparatus, the display control apparatus comprising:

one or more processors that execute a program stored in a memory and thereby function as:

a generation unit configured to generate an image for display that is different from an image captured by the first image capture apparatus and an image captured by the second image capture apparatus; and an output unit configured to output the image for display, wherein the generation unit generates, as the image for display, an image indicating the subject that is the tracking target of the second image capture apparatus and the angle of view of the second image capture apparatus, and wherein the generation unit generates the image by superimposing indicators, which indicate a subject of interest of the first image capture apparatus and the subject that is the tracking target of the second image capture apparatus, on an image captured by a third image capture apparatus which is included in the image capture system and which captures an entirety of captured areas of the first image capture apparatus and the second image capture apparatus.

2. The display control apparatus according to claim 1, wherein the generation unit generates, as the image for display, an image indicating a subject of interest of the first image capture apparatus, an angle of view of the first image capture apparatus, the subject that is the tracking target of the second image capture apparatus, and the angle of view of the second image capture apparatus.

3. The display control apparatus according to claim 1, wherein the indicators include an indicator in a form of a rectangular frame including a region of the subject of interest and an indicator in a form of a rectangular frame including a region of the subject that is the tracking target of the second image capture apparatus, in the image captured by the image capture apparatus that captures the entirety of the captured areas.

4. The display control apparatus according to claim 3, wherein each of the indicators in the forms of the rectangular frames has a color that has been determined in advance on a per-subject basis.

5. The display control apparatus according to claim 4, wherein the image for display includes an indicator indicating an angle of view of the first image capture apparatus, and at least a portion of the indicator indicating the angle of view of the first image capture apparatus has a color that is the same as a color of the indicator in the form of the rectangular frame including the region of the subject of interest.

6. The display control apparatus according to claim 5, wherein the indicator indicating the angle of view of the first image capture apparatus includes identification information of the first image capture apparatus.

7. The display control apparatus according to claim 4, wherein the image for display includes an indicator indicating the angle of view of the second image capture apparatus, and at least a portion of the indicator indicating the angle of view of the second image capture apparatus has a color that is the same as a color of the indicator in the form of the rectangular frame including the region of the subject that is the tracking target of the second image capture apparatus.

8. The display control apparatus according to claim 7, wherein the indicator indicating the angle of view of the second image capture apparatus includes identification information of the second image capture apparatus.

9. The display control apparatus according to claim 1, wherein in a case where a subject of interest of the first image capture apparatus and the subject that is the tracking target of the second image capture apparatus are different, the generation unit generates, as the image for display, an image includes an indicator indicating the subject of interest of the first image capture apparatus and an indicator indicating the subject that is the tracking target of the second image capture apparatus that are distinguishable from each other.

10. The display control apparatus according to claim 1, wherein the image for display includes an indicator that indicates an extent of the angle of view of the second image capture apparatus by its size.

11. The display control apparatus according to claim 1, wherein the image for display includes information related to a role set on the second image capture apparatus.

12. The display control apparatus according to claim 11, wherein the information related to the role includes one or more of a name of the role and content of control on the second image capture apparatus according to the role.

13. An image capture system, comprising:

a first image capture apparatus;

a second image capture apparatus;

a third image capture apparatus that captures an entirety of captured areas of the first image capture apparatus and the second image capture apparatus;

wherein in the image capture system a subject that is a tracking target of the second image capture apparatus and an angle of view of the second image capture apparatus are controlled based on information related to the first image capture apparatus; and a display control apparatus, wherein the display control apparatus comprises:

one or more processors that execute a program stored in a memory and thereby function as:

a generation unit configured to generate an image for display that is different from an image captured by the first image capture apparatus and an image captured by the second image capture apparatus; and an output unit configured to output the image for display, wherein the generation unit generates, as the image for display, an image indicating the subject that is the tracking target of the second image capture apparatus and the angle of view of the second image capture apparatus, and wherein the generation unit generates the image by superimposing indicators indicating a subject of interest of the first image capture apparatus and the subject that is the tracking target of the second image capture apparatus on an image captured by the third image capture apparatus.

14. The image capture system according to claim 13, further comprising a display apparatus that displays the image for display.

15. A display control method implemented in an image capture system which includes a first image capture apparatus and a second image capture apparatus, wherein in the image capture system a subject that is a tracking target of the second image capture apparatus and an angle of view of the second image capture apparatus are controlled based on information related to the first image capture apparatus, the display control method comprising:

generating an image for display that is different from an image captured by the first image capture apparatus and an image captured by the second image capture apparatus; and outputting the image for display, wherein the generating includes generating, as the image for display, an image indicating the subject that is the tracking target of the second image capture apparatus and the angle of view of the second image capture apparatus, and generating the image by superimposing indicators, which indicate a subject of interest of the first image capture apparatus and the subject that is the tracking target of the second image capture apparatus, on an image captured by a third image capture apparatus which is included in the image capture system and which captures an entirety of captured areas of the first image capture apparatus and the second image capture apparatus.

16. A non-transitory computer-readable medium that stores a program having instructions, wherein the instructions cause, when executed by one or more processors in an image capture system, the one or more processors to perform a display control method, wherein in the image capture system a subject that is a tracking target of a second image capture apparatus and an angle of view of the second image capture apparatus are controlled based on information related to a first image capture apparatus, the display control method comprising:

generating an image for display that is different from an image captured by the first image capture apparatus and an image captured by the second image capture apparatus; and outputting the image for display, wherein the generating includes generating, as the image for display, an image indicating the subject that is the tracking target of the second image capture apparatus and the angle of view of the second image capture apparatus, and generating the image by superimposing indicators, which indicate a subject of interest of the first image capture apparatus and the subject that is the tracking target of the second image capture apparatus, on an image captured by a third image capture apparatus which is included in the image capture system and which captures an entirety of captured areas of the first image capture apparatus and the second image capture apparatus.

* * * * *